United States Patent
Zhou

(10) Patent No.: US 9,086,571 B2
(45) Date of Patent: Jul. 21, 2015

(54) MEMS OPTICAL DEVICE

(71) Applicant: Tiansheng Zhou, Edmonton (CA)

(72) Inventor: Tiansheng Zhou, Edmonton (CA)

(*) Notice: Subject to any disclaimer, the term of this patent is extended or adjusted under 35 U.S.C. 154(b) by 12 days.

(21) Appl. No.: 13/908,023

(22) Filed: Jun. 3, 2013

(65) Prior Publication Data

US 2013/0258444 A1    Oct. 3, 2013

Related U.S. Application Data

(62) Division of application No. 13/540,844, filed on Jul. 3, 2012, now Pat. No. 8,472,105, and a division of application No. 12/789,863, filed on May 28, 2010, now Pat. No. 8,238,018.

(60) Provisional application No. 61/269,718, filed on Jun. 29, 2009, provisional application No. 61/217,256, filed on Jun. 1, 2009.

(51) Int. Cl.
*G02B 26/00* (2006.01)
*G02B 26/08* (2006.01)

(52) U.S. Cl.
CPC ............ *G02B 26/08* (2013.01); *G02B 26/0841* (2013.01)

(58) Field of Classification Search
CPC .......................... G02B 26/08; G02B 26/0841
USPC ......... 359/199.2, 200.6, 224.1, 290, 295, 298
See application file for complete search history.

(56) References Cited

U.S. PATENT DOCUMENTS

| | | |
|---|---|---|
| 4,772,786 A | 9/1988 | Langdon |
| 5,083,857 A | 1/1992 | Hornbeck |
| 5,146,435 A | 9/1992 | Bernstein |
| 5,202,785 A | 4/1993 | Nelson |
| 5,212,582 A | 5/1993 | Nelson |
| 5,233,456 A | 8/1993 | Nelson |
| 5,408,731 A | 4/1995 | Berggvist et al. |
| 5,452,268 A | 9/1995 | Bernstein |
| 5,490,220 A | 2/1996 | Loeppert |
| 5,583,688 A | 12/1996 | Hornbeck |
| 5,734,492 A | 3/1998 | Chung |
| 5,735,026 A | 4/1998 | Min |
| 5,739,941 A | 4/1998 | Knipe et al. |
| 5,760,947 A | 6/1998 | Kim et al. |
| 5,870,482 A | 2/1999 | Loeppert et al. |
| 6,012,335 A | 1/2000 | Bashir et al. |
| 6,028,690 A | 2/2000 | Carter et al. |
| 6,046,840 A | 4/2000 | Huibers |

(Continued)

FOREIGN PATENT DOCUMENTS

| | | |
|---|---|---|
| CA | 2 584 571 A1 | 10/2007 |
| EP | 1 292 171 A2 | 3/2003 |

(Continued)

*Primary Examiner* — William Choi

(74) *Attorney, Agent, or Firm* — Davis & Bujold, P.L.L.C.; Michael J. Bujold

(57) ABSTRACT

A micro-electro-mechanical-system (MEMS) micromirror array has an array of micromirrors on a support structure. Each micromirror is pivotally attached to the support structure by a resilient structure. The resilient structure defines a pivot axis. There is an array of electrostatic actuators for pivotally driving the array of micromirrors about the pivot axis. Each electrostatic actuator comprises a first part carried by the support structure, and a second part carried by the corresponding micromirror. An electrostatic sink is mounted to the support structure that shields at least one micromirror from spurious electrostatic actuation.

23 Claims, 43 Drawing Sheets

(56) References Cited

U.S. PATENT DOCUMENTS

| | | |
|---|---|---|
| 6,064,630 A | 5/2000 | Fersht et al. |
| 6,204,080 B1 | 3/2001 | Hwang |
| 6,272,926 B1 | 8/2001 | Fehrenbach et al. |
| 6,275,320 B1 | 8/2001 | Dhuler et al. |
| 6,459,845 B1 | 10/2002 | Lee et al. |
| 6,522,762 B1 | 2/2003 | Mullenborn et al. |
| 6,535,460 B2 | 3/2003 | Loeppert et al. |
| 6,552,469 B1 | 4/2003 | Pederson et al. |
| 6,581,465 B1 | 6/2003 | Waters et al. |
| 6,628,856 B1 | 9/2003 | Costello et al. |
| 6,654,473 B2 | 11/2003 | Collins |
| 6,694,072 B1 | 2/2004 | Neukermans et al. |
| 6,694,073 B2 | 2/2004 | Golub et al. |
| 6,732,588 B1 | 5/2004 | Mullenborn et al. |
| 6,744,173 B2 | 6/2004 | Behin et al. |
| 6,751,395 B1 | 6/2004 | Novotny et al. |
| 6,758,983 B2 | 7/2004 | Conant et al. |
| 6,760,145 B1 | 7/2004 | Taylor et al. |
| 6,763,116 B2 | 7/2004 | Barthel et al. |
| 6,778,728 B2 | 8/2004 | Taylor et al. |
| 6,780,180 B1 | 8/2004 | Goble et al. |
| 6,780,185 B2 | 8/2004 | Frei et al. |
| 6,781,231 B2 | 8/2004 | Minervini |
| 6,781,744 B1 | 8/2004 | Aksyuk et al. |
| 6,794,217 B2 | 9/2004 | Lee et al. |
| 6,816,295 B2 | 11/2004 | Lee et al. |
| 6,822,776 B2 | 11/2004 | Hah et al. |
| 6,829,131 B1 | 12/2004 | Loeb et al. |
| 6,829,814 B1 | 12/2004 | Freeman et al. |
| 6,838,738 B1 | 1/2005 | Costello et al. |
| 6,847,090 B2 | 1/2005 | Loeppert |
| 6,859,542 B2 | 2/2005 | Johannsen et al. |
| 6,876,810 B2 | 4/2005 | Morimoto et al. |
| 6,881,649 B2 | 4/2005 | Kouma et al. |
| 6,901,204 B2 | 5/2005 | Hong et al. |
| 6,914,711 B2 | 7/2005 | Novotny et al. |
| 6,915,061 B2 | 7/2005 | Li et al. |
| 6,934,439 B2 | 8/2005 | Mala et al. |
| 6,936,524 B2 | 8/2005 | Zhu et al. |
| 6,954,579 B2 | 10/2005 | Hsu |
| 6,963,679 B1 | 11/2005 | Novotny et al. |
| 6,965,468 B2 | 11/2005 | Huibers et al. |
| 6,968,101 B2 | 11/2005 | Miller et al. |
| 6,969,635 B2 | 11/2005 | Patel et al. |
| 6,970,281 B2 | 11/2005 | Huibers et al. |
| 6,972,891 B2 | 12/2005 | Patel et al. |
| 6,980,347 B2 | 12/2005 | Patel et al. |
| 6,980,727 B1 | 12/2005 | Lin et al. |
| 6,985,277 B2 | 1/2006 | Huibers et al. |
| 6,996,306 B2 | 2/2006 | Chen et al. |
| 7,023,066 B2 | 4/2006 | Lee et al. |
| 7,051,590 B1 | 5/2006 | Lemkin et al. |
| 7,053,981 B2 | 5/2006 | Bleeker |
| 7,071,109 B2 | 7/2006 | Novotny et al. |
| 7,091,057 B2 | 8/2006 | Gan et al. |
| 7,095,546 B2 | 8/2006 | Mala et al. |
| 7,110,635 B2 | 9/2006 | Miller et al. |
| 7,114,397 B2 | 10/2006 | Fortin et al. |
| 7,134,179 B2 | 11/2006 | Freeman et al. |
| 7,177,063 B2 | 2/2007 | Krylov et al. |
| 7,209,274 B2 | 4/2007 | Van Drieenhuizen et al. |
| 7,224,097 B2 | 5/2007 | Obi et al. |
| 7,296,476 B2 | 11/2007 | Fortin et al. |
| 7,305,889 B2 | 12/2007 | Fortin et al. |
| 7,357,874 B2 | 4/2008 | Moffat et al. |
| 7,386,201 B1 | 6/2008 | DiRuscio et al. |
| 7,535,620 B2 | 5/2009 | Zhou |
| 7,911,672 B2 | 3/2011 | Zhou |
| 2001/0050801 A1* | 12/2001 | Behin et al. ............... 359/298 |
| 2002/0106828 A1 | 8/2002 | Loeppert |
| 2004/0046111 A1 | 3/2004 | Swierkowski |
| 2004/0085606 A1 | 5/2004 | Valette |
| 2005/0061770 A1 | 3/2005 | Neumann et al. |
| 2005/0101047 A1 | 5/2005 | Freeman et al. |
| 2005/0280883 A1 | 12/2005 | Seo et al. |
| 2006/0008089 A1 | 1/2006 | Willems |
| 2006/0082251 A1* | 4/2006 | He et al. ............... 310/309 |
| 2006/0093170 A1 | 5/2006 | Zhe et al. |
| 2006/0093171 A1 | 5/2006 | Zhe et al. |
| 2006/0210238 A1 | 9/2006 | Ma et al. |
| 2007/0236775 A1 | 10/2007 | Miller et al. |
| 2007/0284964 A1* | 12/2007 | Chung et al. ............... 310/309 |
| 2010/0237737 A1* | 9/2010 | He et al. ............... 310/300 |

FOREIGN PATENT DOCUMENTS

| | | |
|---|---|---|
| FR | 861 432 | 2/1941 |
| WO | 2004/105428 A1 | 12/2004 |

* cited by examiner

DETAIL A

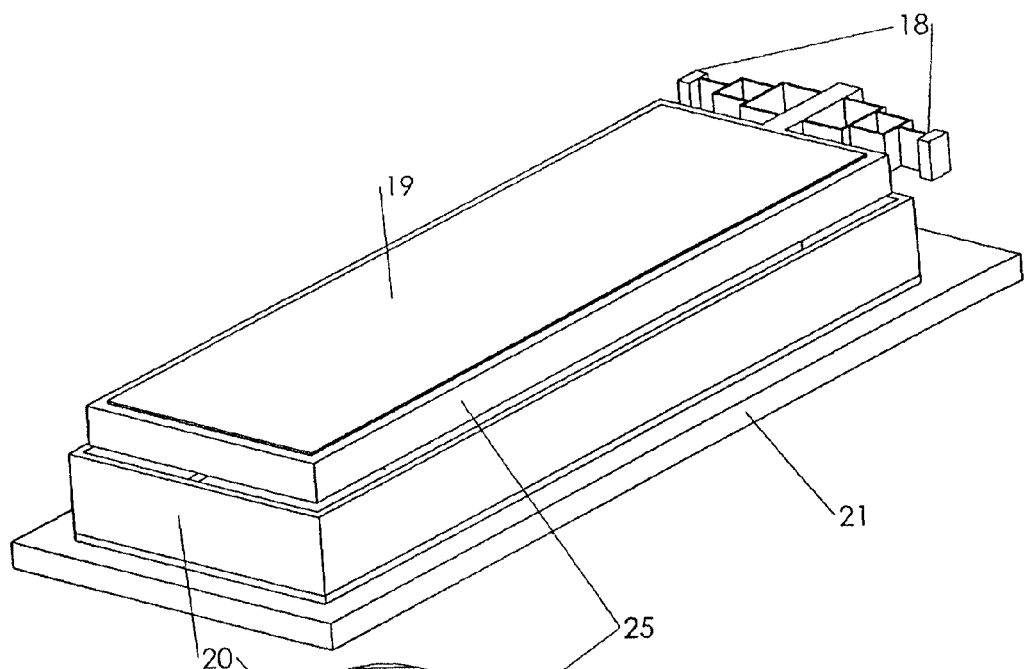
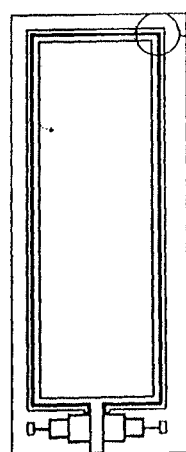
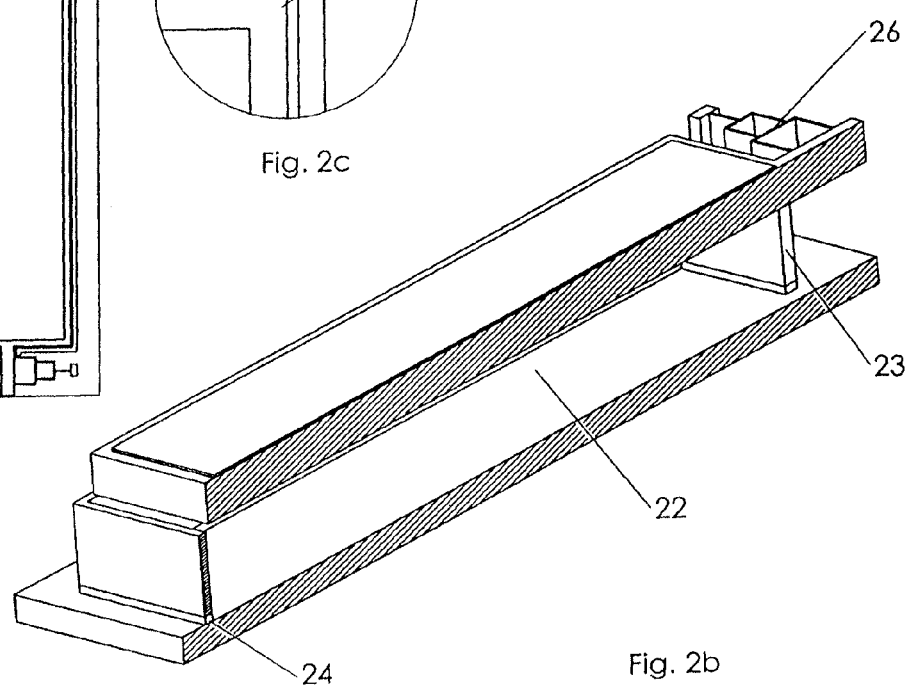
Fig. 2a
Fig. 2c
Fig. 2b

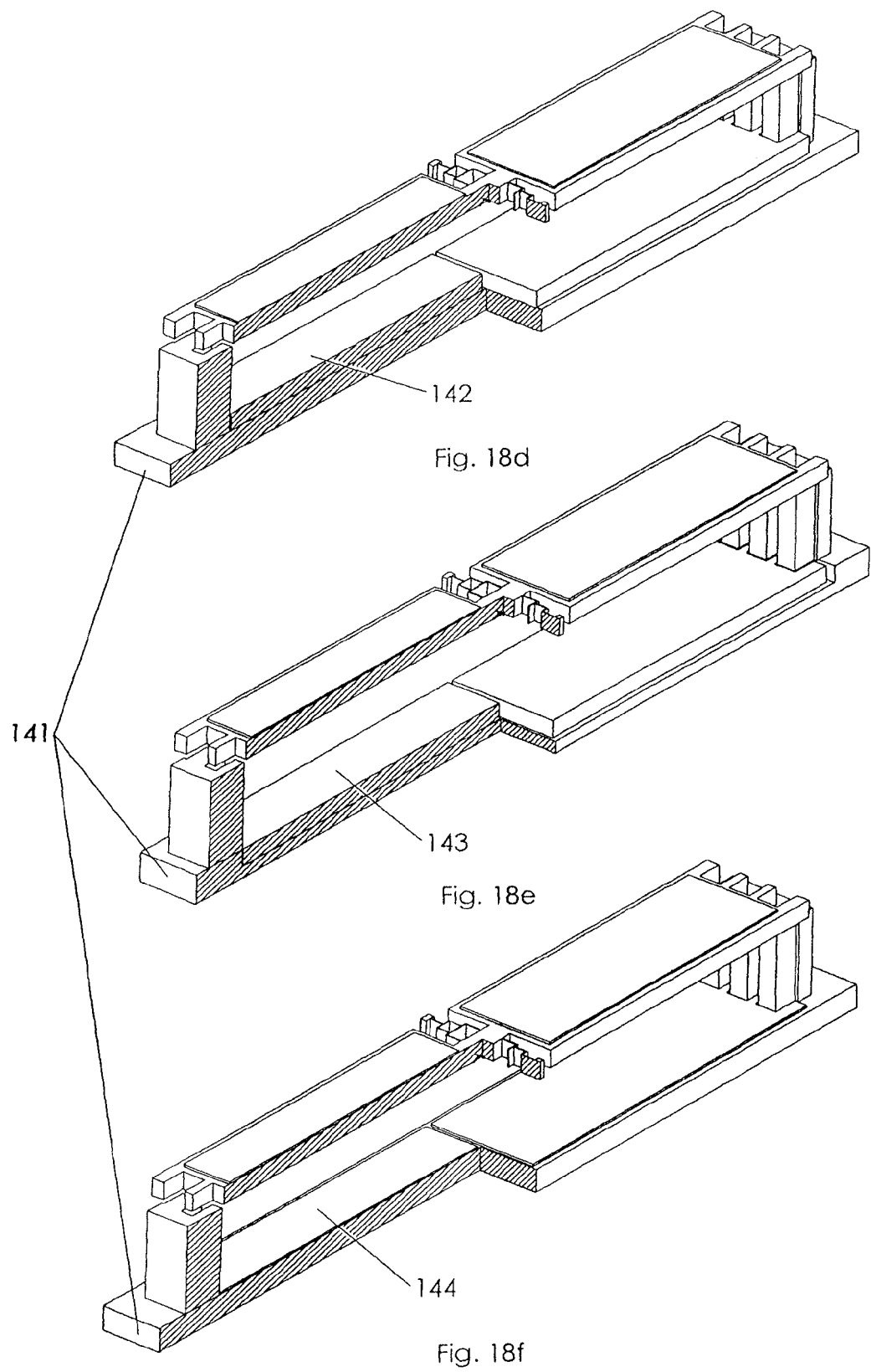

DETAIL D

160

161

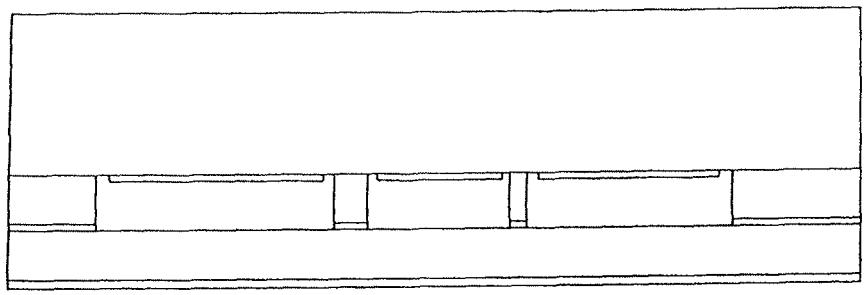
Fig.27e
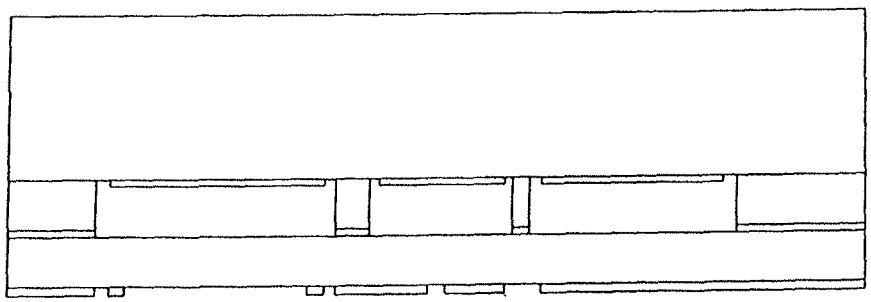
Fig.27f
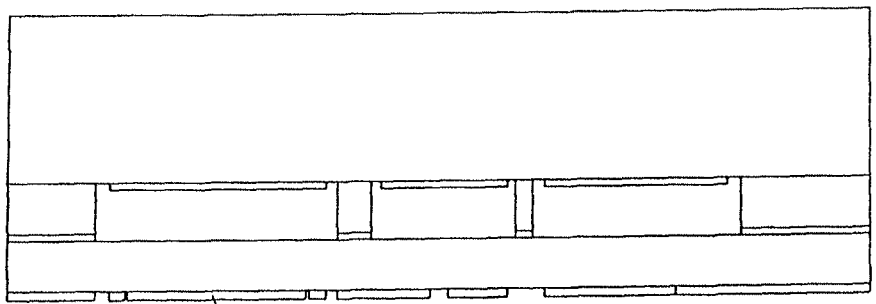
177  Fig.27g
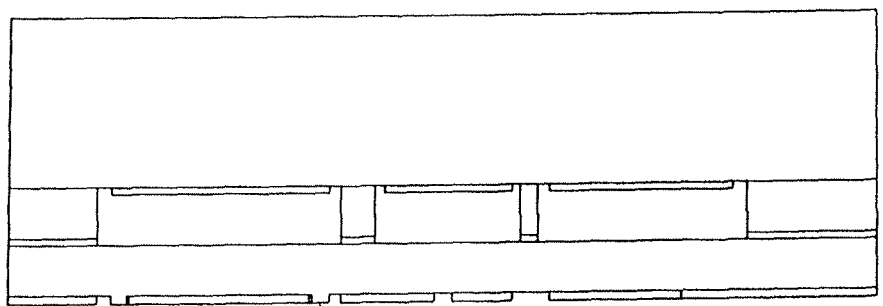
178  Fig.27h

DETAIL E

DETAIL F

DETAIL I

MEMS OPTICAL DEVICE

TECHNICAL FIELD

This relates to a MEMS (Micro-Electro-Mechanical System) micromirror used for one or two dimensional tilting micromirror arrays with a high fill factor.

BACKGROUND

The MEMS (Micro-Electro-Mechanical System) mirrors and mirror arrays have wide applications in the light process and fiber optic networks such as in optical cross-connect switches, attenuators, wavelength blocker, dynamic gain equalizer, configurable grating and tunable filter etc. The MEMS mirror arrays with high fill factors and one or two axes rotation have particular importance in the wavelength division multiplexing systems. The fill factor is generally defined as the ratio of the active area to the total area in an array. The high fill factor improves the shape of the optical channel and reduces the optical loss in the system. A micromirror with two axes of rotation can provide switching of the optical beam among the channels while avoiding undesirable optical transient cross-talk during switching, and achieving variable optical attenuations.

There are a number of actuation methods for the MEMS micromirror array such as electromagnetic actuation disclosed in U.S. Pat. No. 6,760,145 (Taylor et al.) entitled "Actuator for dual-axis rotation micromirror", thermal actuation disclosed in U.S. Pat. No. 7,091,057 (Gan et al.) entitled "Method of making a single-crystal-silicon 3D micromirror", and electrostatic actuation disclosed in U.S. Pat. No. 7,095,546 (Mala et al.) entitled "Micro-electro-mechanical-system two dimensional mirror with articulated suspension structures for high fill factor arrays". Electrostatic actuation is favored due to its low power consumption and relative simple structure and small footprint.

Existing micromirrors with electrostatic actuation fall into two categories: vertical combdrive type micromirrors and parallel plate type micromirrors. The drawback for conventional vertical combdrive type micromirrors is that is generally fails to form the high fill factor arrays due to its typical gimbaled and framed structure. Since it is difficult to reduce the gap between adjacent micromirrors, it is hard to form a mirror array with high fill factor. An example of this type of MEMS micromirrors is found in U.S. Pat. No. 6,822,776 (Hah et al.) entitled "Scanning micromirror for optical communication systems and method of manufacturing the same".

It is much easier to form high fill factor mirror arrays based on the parallel plate type of electrostatic actuators. The majority of existing high fill factor micromirror array designs use parallel plate type of electrostatic actuators, such as those taught in U.S. Pat. No. 7,095,546 (Mala et al.) entitled "Micro-electro-mechanical-system two dimensional mirror with articulated suspension structures for high fill factor arrays", U.S. Pat. No. 6,934,439 (Mala et al.) entitled "Plano MEMS micromirror", U.S. Pat. No. 6,694,073 (Golub et al.) entitled "Reconfigurable free space wavelength cross connect", U.S. Pat. No. 6,781,744 (Aksyuk) entitled "Amplification of MEMS motion", U.S. Pat. No. 6,778,728 (Taylor et al.) entitled "Micro-electro-mechanical mirror devices having a high linear mirror fill factor", U.S. Pat. No. 7,209,274 (Van Drieenhuizen et al.) entitled "High fill-factor bulk silicon mirrors" and U.S. Pat. No. 7,053,981 (Bleeker) entitled "Lithographic apparatus and device manufacturing method". The advantage of using a parallel plate electrostatic actuator is that no typical gimbaled structure or frame is required for the design. As such, the gap between the mirrors can be very small to form a high fill factor mirror array.

SUMMARY

According to an aspect, there is provided a micro-electro-mechanical-system (MEMS) micromirror array, comprising an array of micromirrors on a support structure, each micromirror being pivotally attached to the support structure by a resilient structure, the resilient structure defining a pivot axis. The MEMS micromirror array further comprises an array of electrostatic actuators for pivotally driving the array of micromirrors about the pivot axis, each electrostatic actuator comprising a first part carried by the support structure, and a second part carried by the corresponding micromirror. The MEMS micromirror array further comprises an electrostatic sink mounted to the support structure that shields at least one micromirror from spurious electrostatic actuation.

According to another aspect, the electrostatic sink may be one or more of an electrical ground, a physical barrier, an electrode on the support structure. The electrostatic sink may shield at least one micromirror from spurious actuation by an adjacent electrostatic actuator and may shield at least one micromirror from accumulated electrostatic charge on the support structure.

According to another aspect, the electrostatic actuator may be a vertical comb drive. One of the first part of the vertical comb drive or the second part of the vertical comb drive may comprise fingers that are enclosed within an outer perimeter of the other of the first part or the second part. The fingers may be carried by a carrier portion that is perpendicular to the pivot axis, the carrier portion being connected to an external portion that is outside the outer perimeter of the other of the first part and the second part. The fingers may be parallel to the pivot axis. The fingers may be angled relative to the pivot axis.

According to another aspect, each micromirror may be symmetrical about the pivot axis. The micromirrors in the array may be staggered perpendicularly to the pivot axis.

According to another aspect, there may be a cavity between the micromirrors and the support structure, and a physical barrier may separate adjacent cavities to prevent pneumatic actuation of adjacent micromirrors due to movement of an adjacent micromirror. The physical barrier may comprise an intermediate support structure.

According to another aspect, the micromirrors may be formed from a first layer of material, the electrostatic sink may be formed from a second layer of material, and the support structure may be formed from a third layer of material.

According to another aspect, at least one micromirror may comprise a second electrostatic actuator for pivoting the micromirror about a second pivot axis.

According to another aspect, the resilient structure may comprise a first portion having an I beam connected to a composite structure, and a second portion that is symmetrical to the first portion, the first and second portions defining the pivot axis. The composite structure may be one of one or more dual I beam structures, one or more V-shaped structures, and combinations thereof.

According to another aspect, there is provided a MEMS micromirror structure, comprising a micromirror mounted on a support structure by a resilient structure, and an electrostatic actuator for moving the micromirror relative to the support structure. The electrostatic actuator comprises a first part carried by the support structure, and a second part carried by the corresponding micromirror. A latch is mounted to the support structure by a movable portion that moves in response to an applied voltage between a latching position and a release position as the applied voltage is varied, wherein, in the latching position, the latch secures the micromirror in a desired position. The movable portion may be a thermal arched beam actuator. The movable portion may comprise first and second parallel thermal connectors that expand at different rates in response to the applied voltage.

According to another aspect, there is provided a MEMS micromirror structure, comprising a micromirror mounted on a support structure by a resilient structure; and an electrostatic actuator for pivotally driving the micromirror. The electrostatic actuator comprises a first part carried by the support structure, and a second part carried by the corresponding micromirror. The resilient structure comprises a first portion and a second portion that is symmetrical to the first portion. Each of the first portion and the second portion comprises an I beam connected to a composite structure. The composite structure may be one of one or more dual I beam structures, one or more V-shaped structures, and combinations thereof.

According to another aspect, there is provided a MEMS micromirror, comprising a micromirror mounted on a support structure by a resilient structure. The resilient structure permits movement along an axis that is perpendicular to the support structure and resists movement in any direction perpendicular to the axis. The MEMS micromirror further comprises an electrostatic combdrive actuator that has a first part mounted on the support structure, and a second part mounted on the micromirror. The first part and the second part provide an actuating force to the micromirror to move the micromirror along the axis. The electrostatic combdrive actuator may comprise more than one first and second parts spaced evenly about an outer perimeter of the micromirror. The resilient structure may comprise more than one resilient structures spaced evenly about an outer perimeter of the micromirror. The support structure may be formed from a first layer of material, the first part of the electrostatic combdrive may be formed from a second layer of material, and the micromirror, the second part of the electrostatic combdrive and the resilient structure may be formed from a third layer of material.

According to another aspect, there is provided a single micro-electro-mechanical-system (MEMS) micromirror and a MEMS micromirror used in high fill factor mirror arrays includes at least one moveable mirror, flexible hinges to connect the mirror to the fixed anchors, a wall structure surrounding the mirror, and supporting material to support the wall structure and anchors. The wall structures eliminate the electrical and mechanical crosstalk between any adjacent mirrors in the mirror array. The whole wall structure or parts of the wall structure are used as electrostatic actuation components. The wall structure is also working with actuation electrodes on the support material to form electrode gap with high aspect ration to reduce or eliminate the mirror tilting drifting caused by the charged dielectric materials within the gap.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1b is a detailed perspective view of Detail "A" in FIG. 1a.

FIG. 2a is a perspective view of a micromirror using wall structure surrounding the mirror.

FIG. 2b is a perspective view in section of a micromirror using wall structure surrounding the mirror.

FIG. 2c is a detailed view of a micromirror using wall structure surrounding the mirror.

FIG. 3a is a rear perspective view of high fill factor mirror array using the mirror show in FIG. 2a.

FIG. 6b is an enlarged perspective view of the trenching and refilling region on the mirror connector shown in Detail "C" of FIG. 6a.

FIG. 18d is a perspective view in section of a micromirror variation using an electrostatic vertical comb drive and an electrode structure and using the shielding effect of the electrode gap with high aspect ratio, and without the wall structure between two adjacent mirrors.

FIG. 18e is a perspective view in section of a micromirror using an electrostatic vertical comb drive and an electrode structure and using the shielding effect of the electrode gap with high aspect ratio, and without the wall structure between two adjacent mirrors.

FIG. 18f is a perspective view in section of a micromirror variation using an electrostatic vertical comb drive and an electrode structure and using the shielding effect of the electrode gap with high aspect ratio, and without the wall structure between two adjacent mirrors.

FIG. 22a is a perspective view of a micromirror array variation using the micromirror shown in FIG. 21a.

FIG. 24b is a perspective view of a micromirror variation using the micromirror shown in FIG. 23a.

FIG. 27a-27k are side elevation views in section of major process steps of the second fabrication method to fabricate a micromirror and micromirror array.

DETAILED DESCRIPTION

Figure 1A:
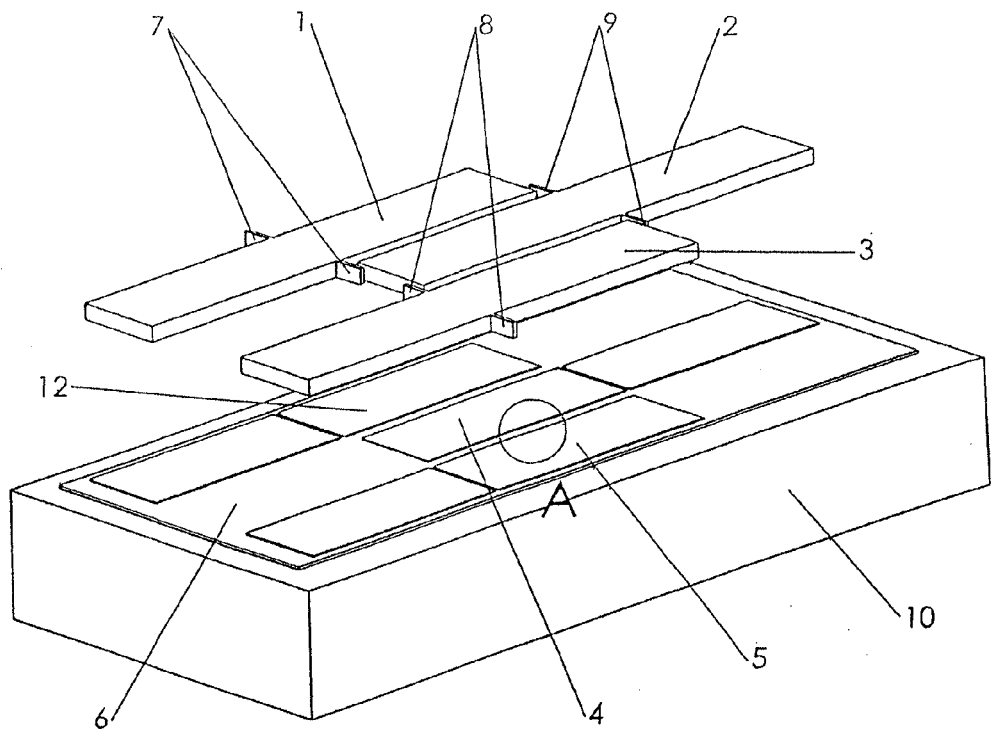
FIG. 1a is a perspective view of a prior art micromirror array using a conventional parallel plate type electrostatic actuator.

A micromirror with parallel plate type electrostatic actuators known in the prior art is shown in FIG. 1. The mirror 1, 2 and 3 are coated with optical reflective materials such as an optical reflective metal film, and is supported by hinges 7, 8 and 9 which are connected to their anchors. The fixed actuation electrodes 4, 5 and 12 are located below mirror 2, 3 and 1. Mirror 1, 2 and 3, hinges 7, 8 and 9 can be made of heavily doped electrically conductive silicon for good electrical conductivity. When the actuation voltage is applied between mirror 2 and electrode 4, the resulting electrostatic force between mirror 2 and electrode 4 will pull the mirror 2 towards electrode 4 and cause the deformation of hinges 8 and rotation of the mirror 4 around the hinges 8. When the electrostatic force is balanced with the mechanical restoring force of the deformed hinges 8, the mirror 2 will stabilize at a tilting angle.

There are some major disadvantages of such mirror array structures. One disadvantage is the electrical interference. The electrical field between mirror 2 and electrode 4 will interfere with the position/movement of adjacent mirror 1 and mirror 3. In other word, the electrical field generated by any mirror and its electrode will affect the position/movement of its adjacent mirrors. This electrical interference cause adjacent mirror position control difficult and complex.

Another disadvantage is mechanical interference. When the actuation voltage is applied between mirror 2 and electrode 4, the resulting electrostatic force between mirror 2 and electrode 4 will pull the mirror 2 towards electrode 4. The air between the movable mirror 2 and the fixed electrode 4 during this fast mirror tilting movement will be either compressed or decompressed. As such, the air flow will be formed. The air flow resulting from the switching of mirror 2 will therefore interfere with the adjacent mirror 1 and 3, and cause mirror 1 and 3 to change their positions.

A third disadvantage is the drift in the mirror tilting angle due to electrical charging in the dielectric materials. The electrodes 12, 4 and 5 are on top of a dielectric material 6 to provide electrical isolation. In order to have a larger controllable titling angle for the mirror, the gap between the fixed actuation electrode and the mirror has to be increased. This increased gap results in a higher actuation voltage, such as over 100V, to obtain a couple of degrees of mirror titling. This higher actuation voltage can cause electrical charging of the dielectric material 6 within the gap 11 between two electrodes 4 and 5. The amount of charging varies with the time and the applied actuation voltage as well as the packaging condition etc. The electrical field generated from these variable charges will in turn cause an undesired drift in the tilting angle of the mirror 2 and 3.

The disadvantages discussed above may lead to spurious mirror movement, or in other words, unintended and "false" movement of a mirror that may affect the operation of a device. This may include movement where there should be none, or reduced movement or lack of movement when actuated.

To overcome these disadvantages and reduce the effect of spurious mirror movement, a thin and electrically conductive wall structure around the mirror may be utilized. One example of the mirror with such a thin wall structure is shown in FIG. 2a-2c. The mirror 25 with optical reflective coating 19 is connected to the anchor 18 using hinge 26. The mirror 25, hinge 26 and anchor 18 can be made of electrically conductive material such as doped single crystal silicon. A thin and electrically conductive wall structure 20 is around the edge of the mirror 25 with a several microns gap between (FIG. 2c). The upper surface of the wall structure 20 can be either lower or higher than the lower surface of the mirror. The upper surface of the wall structure 20 being lower than the lower surface of the mirror is shown in FIG. 2. The wall structure 20 has to be several microns larger than the mirror 25 so that the mirror 25 can freely move inwards and outwards relative to the wall structure 20 (FIG. 2c). An electrically conductive supporting material 21 is located underneath the mirror 25. The thin and electrically conductive wall structure 20 can be either electrically connected to the electrically conductive support material 21, or electrically isolated with the electrically conductive support material through a thin layer of dielectric material 24. In FIG. 2, the thin and electrically conductive wall structure 20 and electrically conductive support material 21 are electrically isolated by a thin layer of dielectric material 24.

There are varieties of actuation schemes for the mirror device shown in FIG. 2. One of them is to use the sidewall structure as the actuation electrode. For example, the electrically conductive support material 21 and electrically conductive wall structure 20 may be connected to electrical ground. If an AC or DC voltage is applied on the mirror 25, there will be electrostatic forces. One electrostatic force is between the mirror 25 and the electrically conductive support material 21, and is a typical parallel plate type electrostatic actuator. The other electrostatic force is created between the mirror 25 and the wall structure 20, and is similar to a staggered vertical comb drive electrostatic actuator. The vertical comb drive electrostatic actuator has many advantages compared with the parallel plate type electrostatic actuator, such as no pull-in effects, higher actuation energy density, etc. These two electrostatic forces will pull the mirror into the wall structure towards the electrically conductive layer 21. The hinge 26 will be deformed. When the electrostatic forces are balanced with the mechanical restoring force of the deformed hinge 26, mirror 25 will stabilize at a tilting angle.

The other example of an actuation scheme is to keep the wall structure 20 at electrical ground, and apply an actuation voltage to the electrically conductive support material 21 and the mirror 25. The electrostatic force generated between the wall structure 20 and the mirror 25 will cause the mirror to tilt at a stable position.

The openings 23 (shown in FIG. 2b and FIG. 3a) on the wall structure 20 are used to release the squeezed air due to the movement of the mirror. The number of openings, the opening size and the location can be optimized on the wall structure to achieve the desired air damping for the mirror movement. Suitable air damping is desired for MEMS optical switches, MEMS VOA, etc. since it will help the mirror to achieve a stable position within a much shorter time using a simpler electrical control scheme.

Figure 3A:
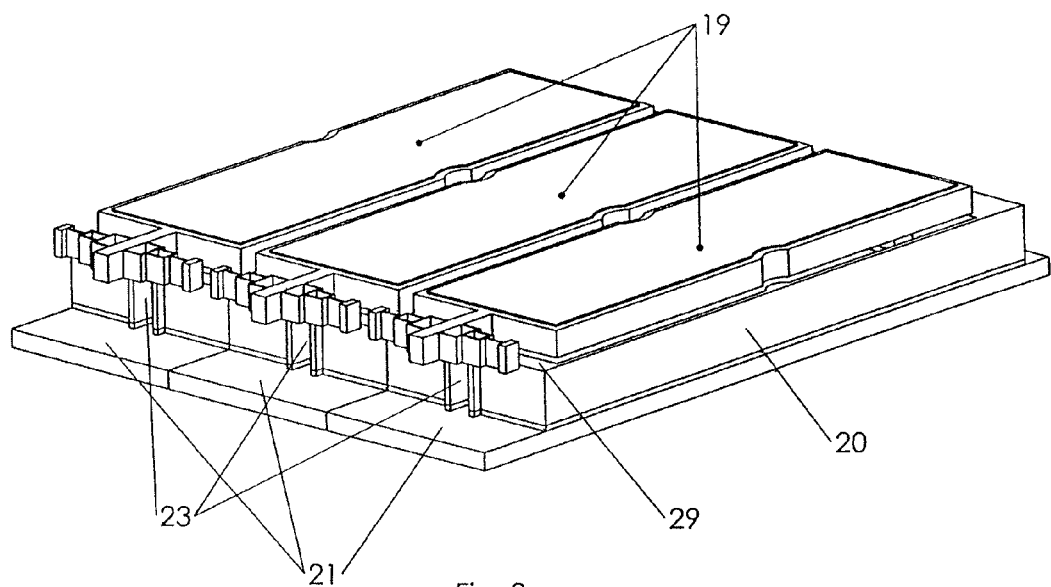
Figure 3B:
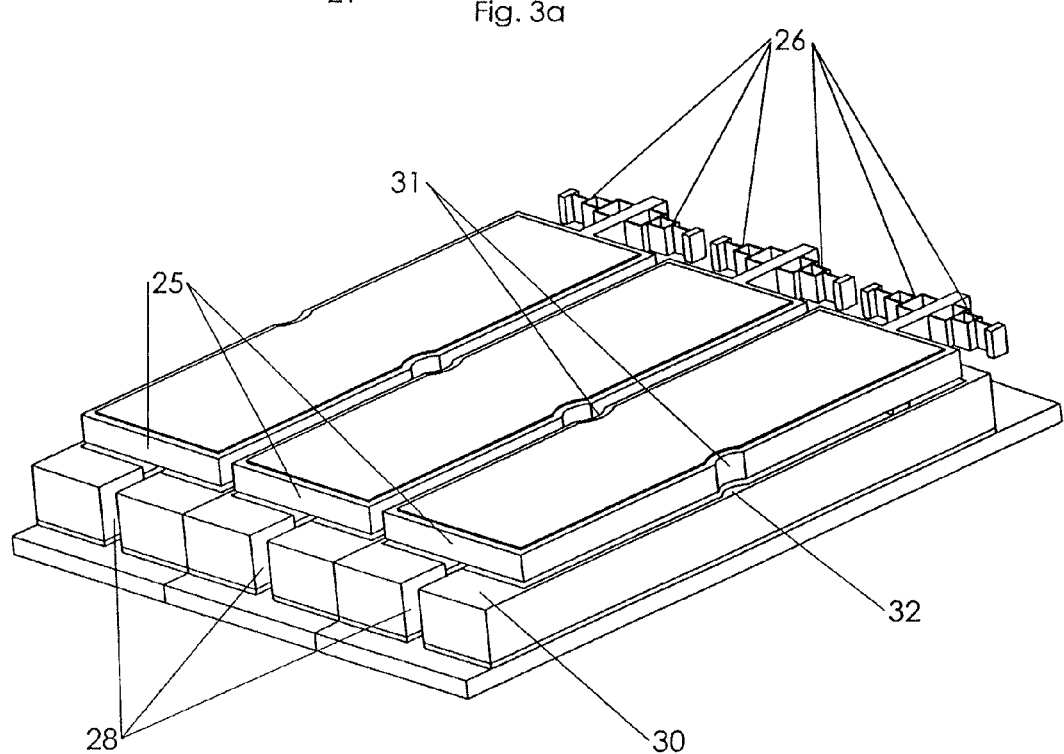
FIG. 3b is a front perspective view of high fill factor mirror array using the mirror show in FIG. 2.

Referring to FIGS. 3a and 3b, the mirror array can be formed using the mirror structure shown in FIG. 2a, FIG. 2b and FIG. 2c. If all the electrically conductive support material 21 is connected to electrical ground, and all the wall structures 20 are also connected to electrical ground, each mirror can be actuated independently be applying an actuation voltage to it.

The mechanical interference from a squeezed air film is eliminated by the walls between any two mirrors. The squeezed air film can be released or adjusted by the openings 23 and 28 on the wall structure. Since there are no exposed dielectric materials to the mirrors, no mirror tilting drifting will occur.

The interference of the electrical field to tilt the adjacent mirror will also be reduced or eliminated. The wall between any two mirrors provides an electrical shield between the two mirrors. The gap between the mirror edge and its surrounding wall is much smaller than the gap between the two mirrors; therefore, the electrostatic force between the mirror and its surrounding wall structure is much higher than the electrostatic force between the two mirrors. Sometimes, in order to increase the shielding effects, the top surface of the sidewall structure can be made at the same height as the mirror surface. FIGS. 2 and 3 only show the case where the top surface of the sidewall structure is lower than the mirror surface.

Referring to FIGS. 3a and 3b, in order to have a mirror array with a high fill factor, the part of the wall structure between two mirrors is very thin. To improve the strength of this part of wall structure, the small recesses 31 on both sides of the mirror 25 are made to give some space to add a structural post 32 to the wall structure. The recesses 31 are preferably small enough that no optical reflective surface area of metal coating 19 is sacrificed. Also, the extended portion 30 and 29 of the wall structure will be used to improve the strength of the wall structure.

Figures 4A, 4B:
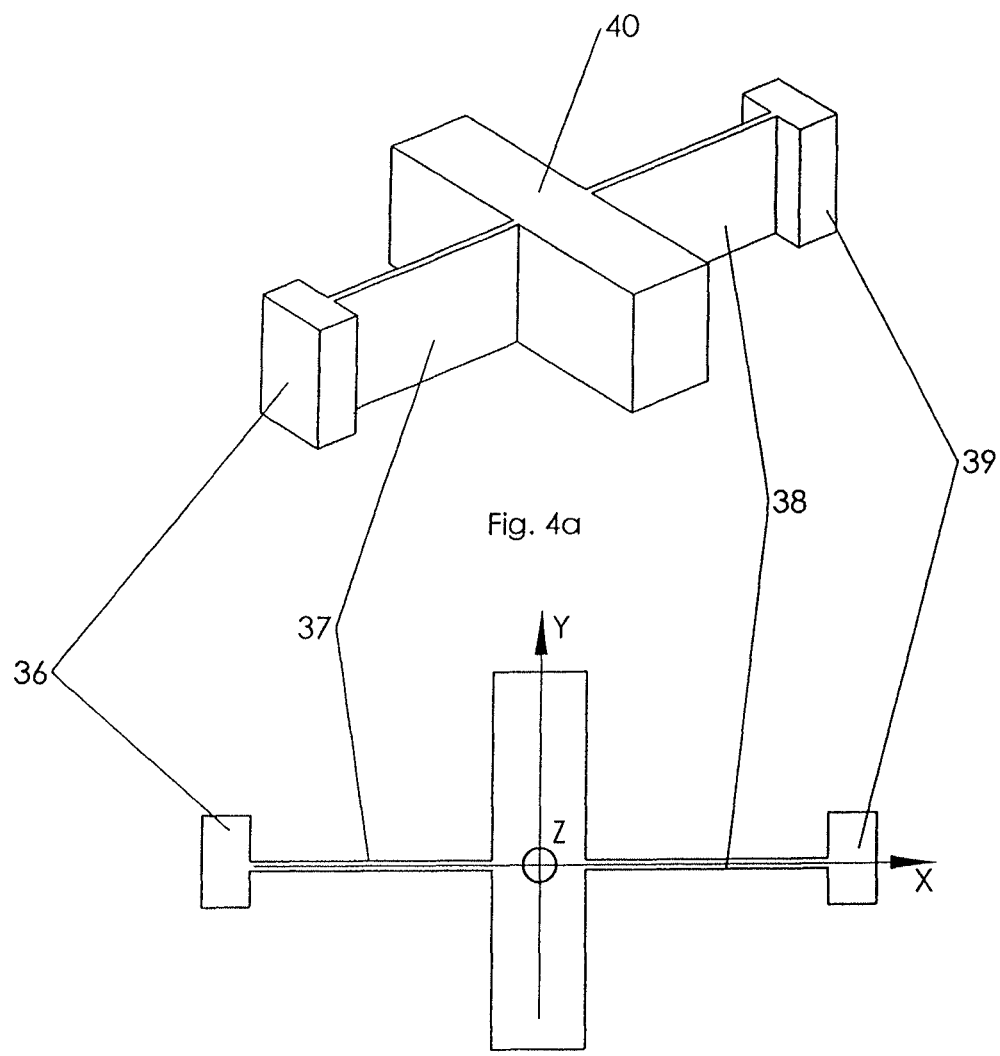
FIG. 4a is a perspective view of a single I beam hinge.
FIG. 4b is a top plan view of the single I beam hinge.

The possible undesired sideways movement of the mirror can be prevented by using a properly designed hinge shape. FIGS. 4a and 4b show a simple short I beam shape hinges 37 and 38 with a mirror connector 40 that connects to a mirror supported by fixed anchors 36 and 39 through the hinges 37 and 38. The possible undesired sideways movement of the mirror can result from different factors. One factor is the alignment error in the lithography process, where the gaps between the mirror's two long edges and the surrounding wall structure are not equal. Once an electrical potential is applied between the mirror and its surrounding wall structure, the gap offset results in the unbalanced electrostatic forces on the two long edges of the mirror. As a result, the mirror will not only tilt around the x-axis and move inwards to its surrounding wall structure, but also, the unbalanced electrostatic force on the two mirror long edges will force the mirror rotate around the z-axis. This rotation around the z-axis is undesirable since it causes electrical shorting once the mirror is contacting the surrounding wall structure.

Figure 5A:
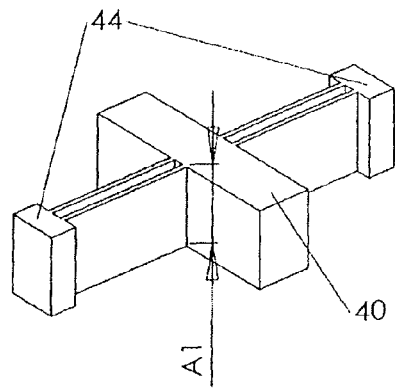
FIG. 5a is a perspective view of a double I beam hinge.
Figure 5B:
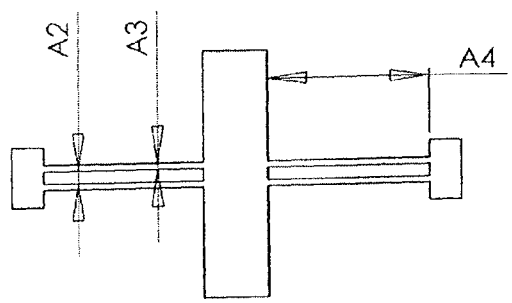
FIG. 5b is a top plan view of the double I beam hinge.
Figure 22A:
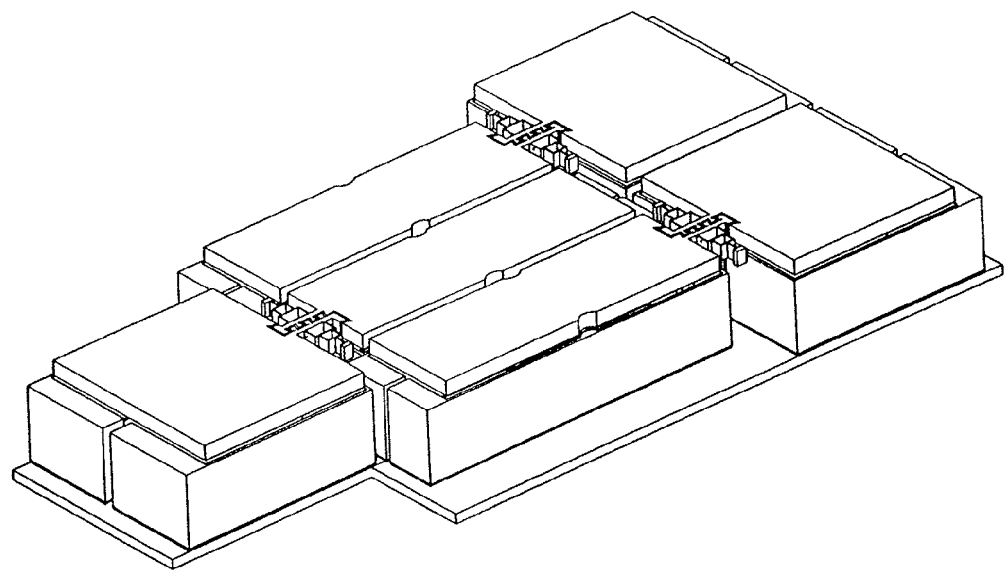
Figure 22B:
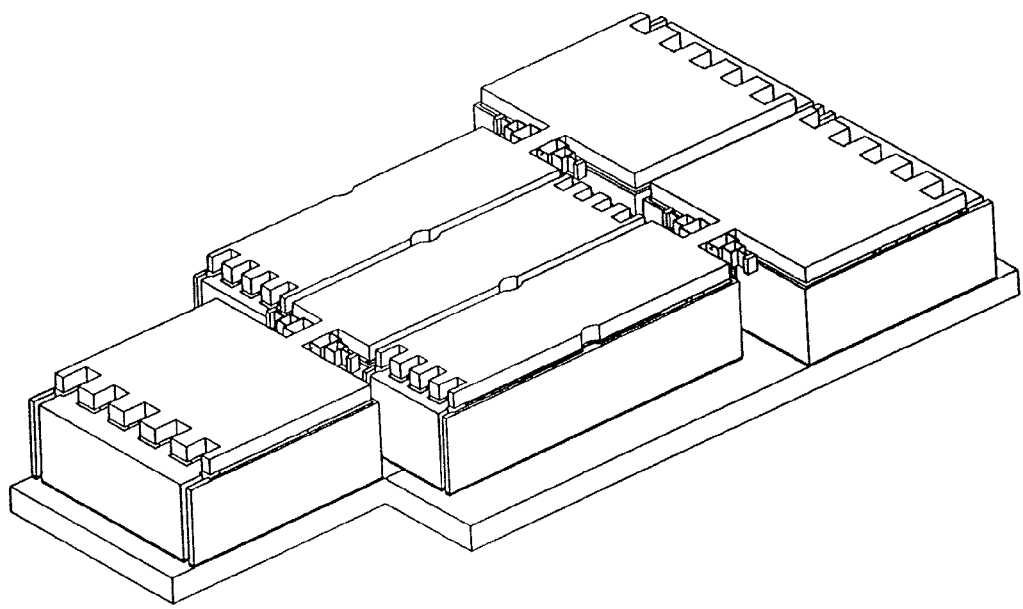
FIG. 22b is a perspective view of a micromirror array variation using the micromirror shown in FIG. 21b.
Figure 22C:
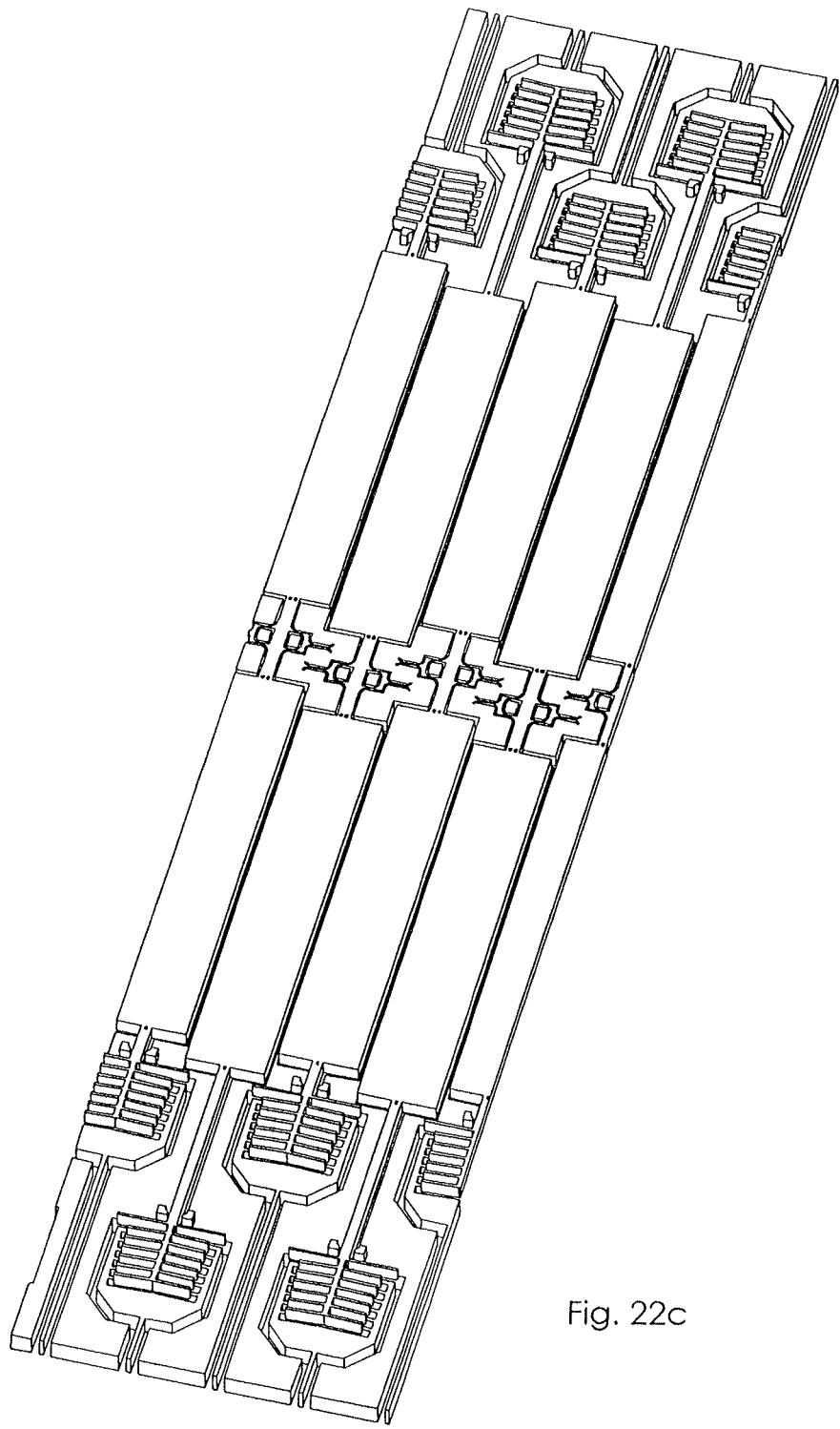
FIG. 22c is a perspective view of a micromirror array variation using the micromirror shown in FIG. 21c.
Figure 22D:
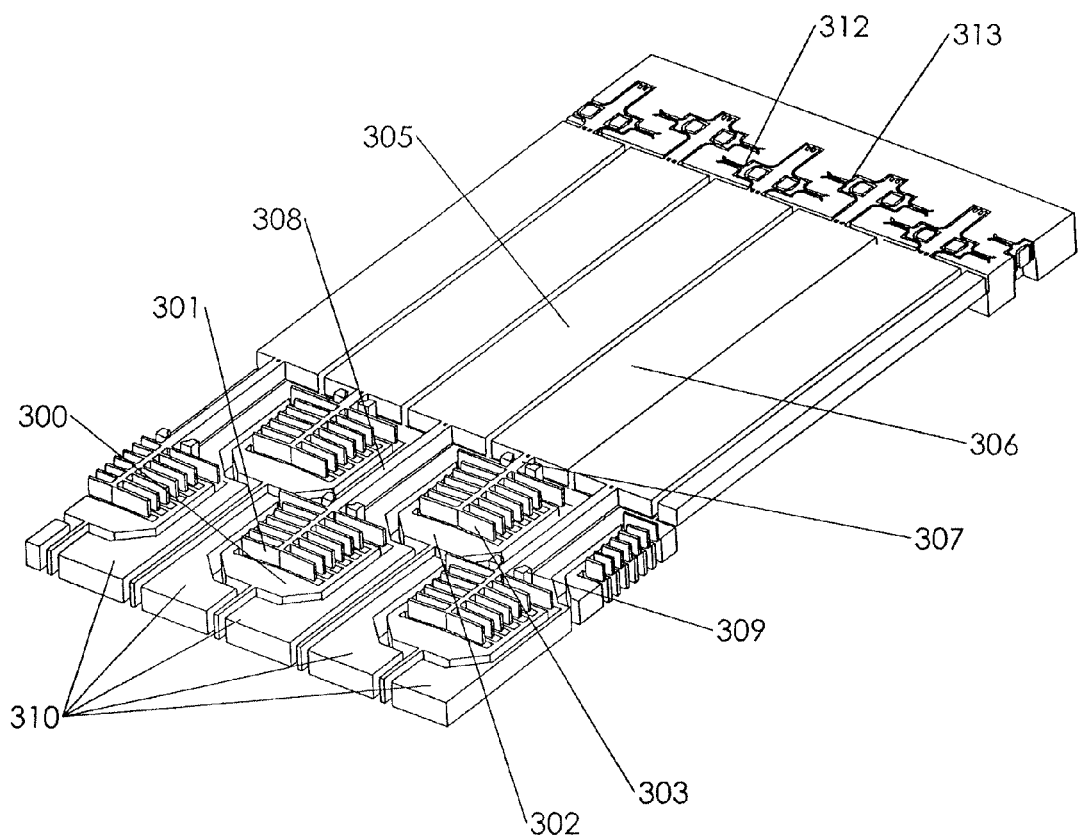
FIG. 22d is a perspective view of a simplified micromirror array using the micromirror shown in FIG. 22c.

Referring to FIGS. 22c and 22d, a mechanical stop 309 may be used to prevent further mirror rotation around the z-axis and prevent electrical shorting. It is very important to design the hinges so that they have not only good flexibility to allow desirable rotation around the x-axis, but also the strong stiffness to reduce or eliminate any possible undesirable rotation around the z-axis. In FIG. 5a, the mirror connector is supported by anchors 44 with double parallel I beams. The hinge with double parallel I beams design has better rotation flexibility/stiffness control on X and Z axes. The design parameters are A1 (I beam height), A2 (the gap between two I beams), A3 (I beam width) and A4 (I beam length). The rotation stiffness around Z axis will be increased if A2 (the gap between two I beams) is increased.

Figure 5C:
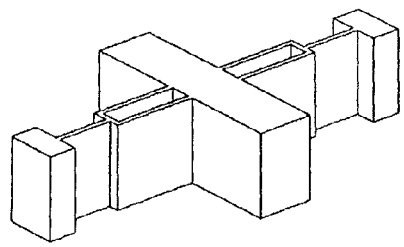
FIG. 5c is a perspective view of a hinge with a combination of a single I beam and double I beam.
Figure 5D:
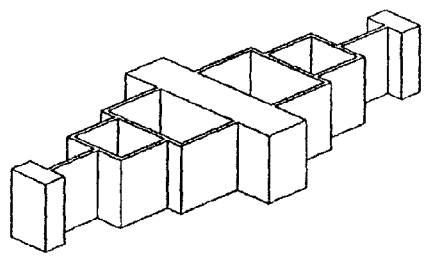
FIG. 5d is a perspective view of a hinge with a combination of a single I beam and two cascaded double I beams.
Figure 5E:
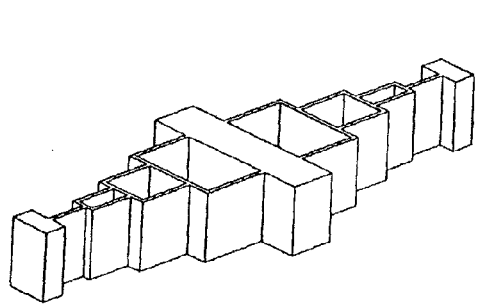
FIG. 5e is a perspective view of a hinge with a combination of a single I beam and three cascaded double I beams.

The hinge designs can be optimized by using combinational of single I beam and single double parallel I beams as shown in FIG. 5c, single I beam and two or more cascaded double parallel I beams as shown in FIG. 5d through 5e. For cascaded double parallel I beam structure, the double parallel I beam with larger gap A2 is towards to the mirror connector, while the double parallel beams with smaller gap A2 is towards to the anchor. The design parameters A1, A2, A3 and A4 can be varied for each single I beam and double parallel I beams. The hinge designs with other I beam combination variations are not limited to what is shown and described herein. For example, single I beam with more than three cascaded double parallel I beams, multiple cascaded double parallel I beams, part of the hinges consisting of cascaded double parallel I beams or multiple cascaded double parallel I beams etc.

Figure 5F:
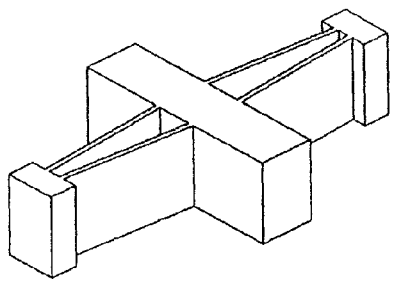
FIG. 5f is a perspective view of a V shaped hinge.
Figure 5G:
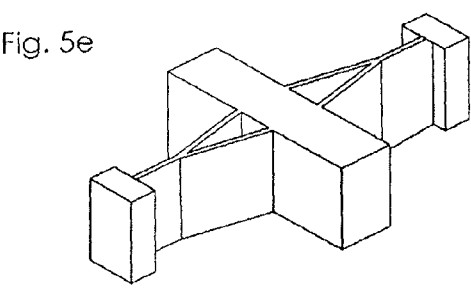
FIG. 5g is a perspective view of a hinge with a combination of a single I beam and a V shaped hinge

The V shaped hinge design shown in FIG. 5f can also be used since it has good flexibility to allow desirable rotation around X axis, but also the strong stiffness to reduce or eliminate any possible undesirable rotation around Z axis. Again, this is not only limited to single V shape hinge, it also includes the cascaded multiple V shape hinges, a single I beam with a cascaded V shape hinge as shown in FIG. 5g, or combination of V shape hinges and double parallel I beam hinges.

Figure 6A:
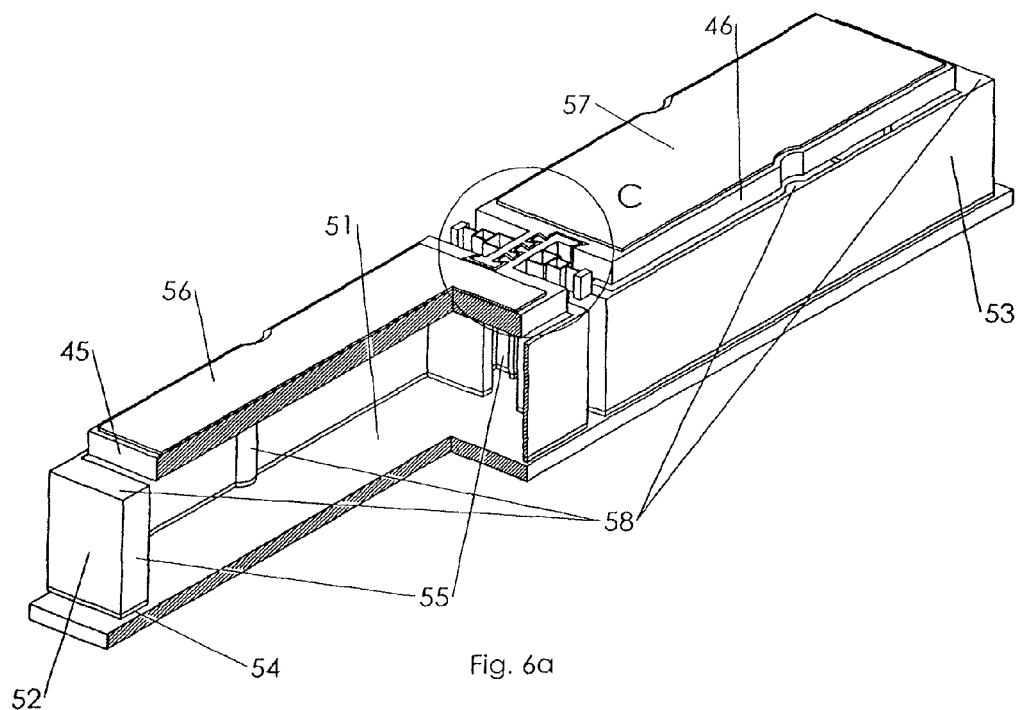
FIG. 6a is a perspective view of the micromirror device with a trenching and refilling region on the mirror connector.
Figure 6B:
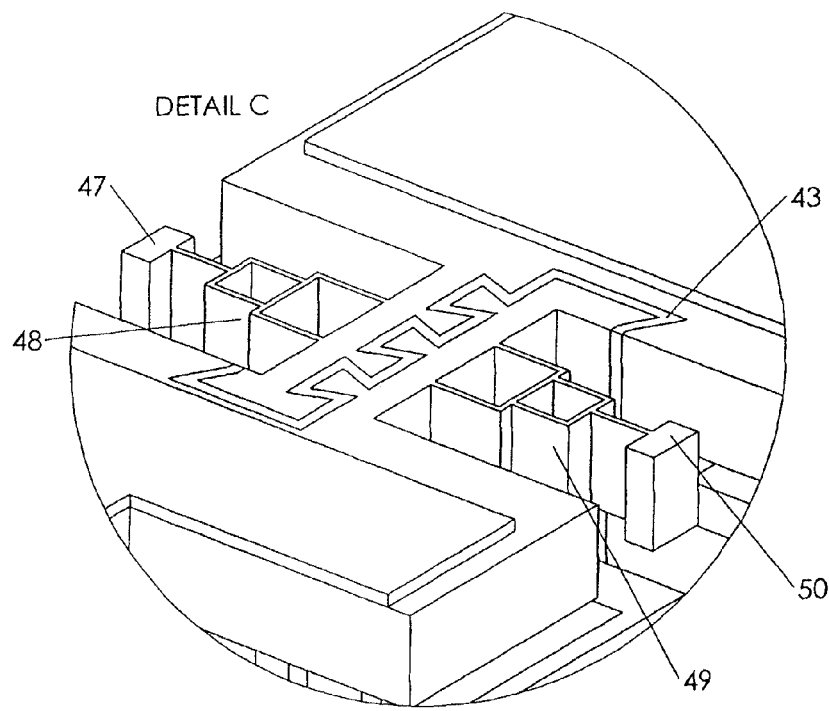

In FIG. 2 and FIG. 3, the mirror can tilt only in one direction. FIG. 6 shows a mirror structure which can have the two rotation directions around the x-axis defined by the hinge. The mirrors 45 and 46, wall structures 52 and 53, anchors 47 and 50, hinges 48 and 49 and supporting material 51 are electrically conductive, and may be made of, for example, typical doped single crystal silicon. The air release openings 55 are on the wall structure. The reflective metal costing 56 and 57 are on the top surface of mirror 45 and 46 respectively. The wall structural supports and expanded portions 58 are also shown in FIG. 6a. The electrical isolation layer 54 can be, for example, a silicon oxide layer, which electrically isolates the wall structure 52 and 53 with the electrically conductive supporting layer 51. The mirror connector has a trenching and refilled region 43, which mechanically connects but electrically isolated mirror 45 and 46. The anchor 47, hinge 48 and mirror 46 are electrically connected, as are the anchor 50, hinge 49 and mirror 45.

When the electrically conductive supporting layer 51, wall structure 52 and 53 are connected to electrical ground, if the anchor 47 is connected to electrical ground and anchor 50 is connected to an electrical potential, the resulting electrostatic forces between mirror 45 and wall structure 52 as well as electrically conductive supporting material 51 will pull the mirror 45 towards to the electrically conductive material 51 while the mirror 46 moves away from the electrically conductive layer 51. If the anchor 50 is connected to electrical ground and the anchor 47 is connected to an electrical potential, the resulting electrostatic forces between the mirror 46 and the wall structure 53 as well as the electrically conductive supporting material 51 will pull the mirror 46 towards to the electrically conductive layer 51 while the mirror 45 move away from the electrically conductive layer 51. Other actuation schemes also can be used to tilt the mirrors about an axis in two directions.

Figure 7:
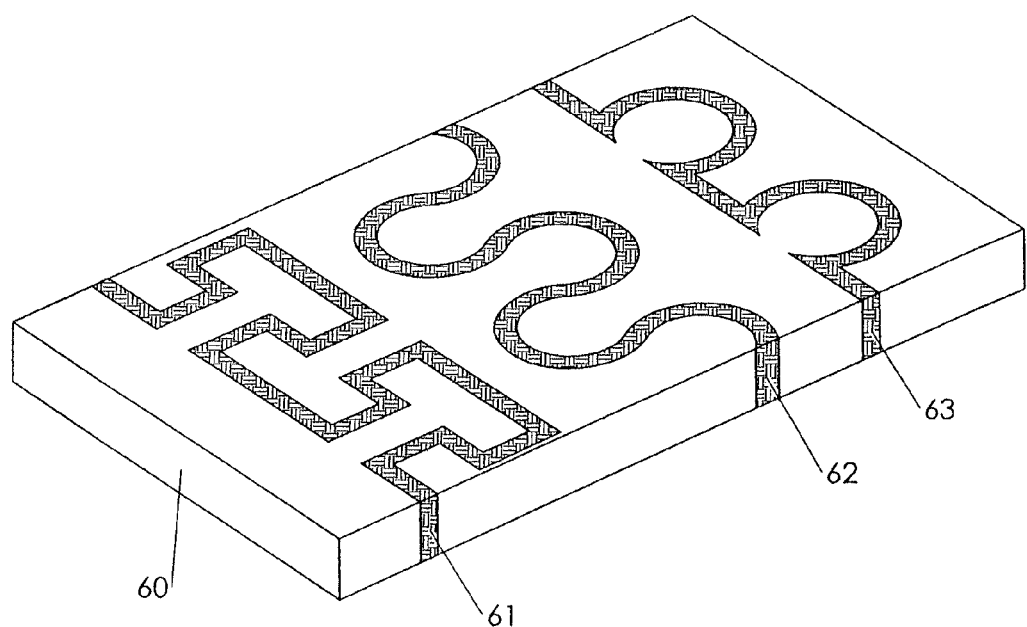
FIG. 7 is a perspective view of pattern variations of the trenching and refilling regions.

A trenching and dielectric material refilling method is used on single crystal silicon to form the electrically isolated but mechanically connected regions, examples of which are shown in FIG. 7. The Deep Reactive Ion Etching (DRIE) of silicon is often utilized to create a hollow trench that is a couple of microns wide formed on the single crystal silicon layer 60. Sometimes, some very narrow silicon structures (about 1 um thick, for example), such as narrow silicon beams or meshing structures, are kept to connect the intended electrical isolated silicon regions crossing the hollow trenches. These narrow silicon structures will keep the intended electrically isolated silicon parts together during the whole process. A single trench or multiple parallel trenches should be formed in order to have good electrical isolation and mechanical strength. The processed wafer is then sent to the thermal oxidation furnace for wet or dry oxidation, the oxidation will occur on the sidewalls of the hollow trench. The oxide formed from both sidewalls of the trench will meet each other to close or almost close the trench after a certain period of thermal oxidation. Also, if very narrow silicon structures are used, these tiny silicon structures, such as narrow silicon beams, will also change into oxide structures after thermal oxidation. These very narrow silicon oxide structures will mechanically join two electrical isolated silicon regions. The subsequent CMP (Chemical and Mechanical Polish) may be performed to remove excess oxide on the both top and bottom side surfaces of the silicon wafer. There are many other options to do the trench etching and dielectric material refilling. For example, instead of filling the trench with very thick oxide alone, LPCVD (Low Pressure Chemical Vapor Deposition) or PECVD (Plasma Enhanced Chemical Vapor Deposition) polysilicon can be used to fill most of the hollow trenches after initial thin thermal oxide growth. The choice of the trench etching method and refilling materials depends on the requirements of the micromirror and associated process cost. FIG. 7 shows three different trenching and refilling pattern shapes 61, 62 and 63, each of which has very good mechanical strength to connect two electrically isolated silicon pieces on their right and left sides.

Figure 8:
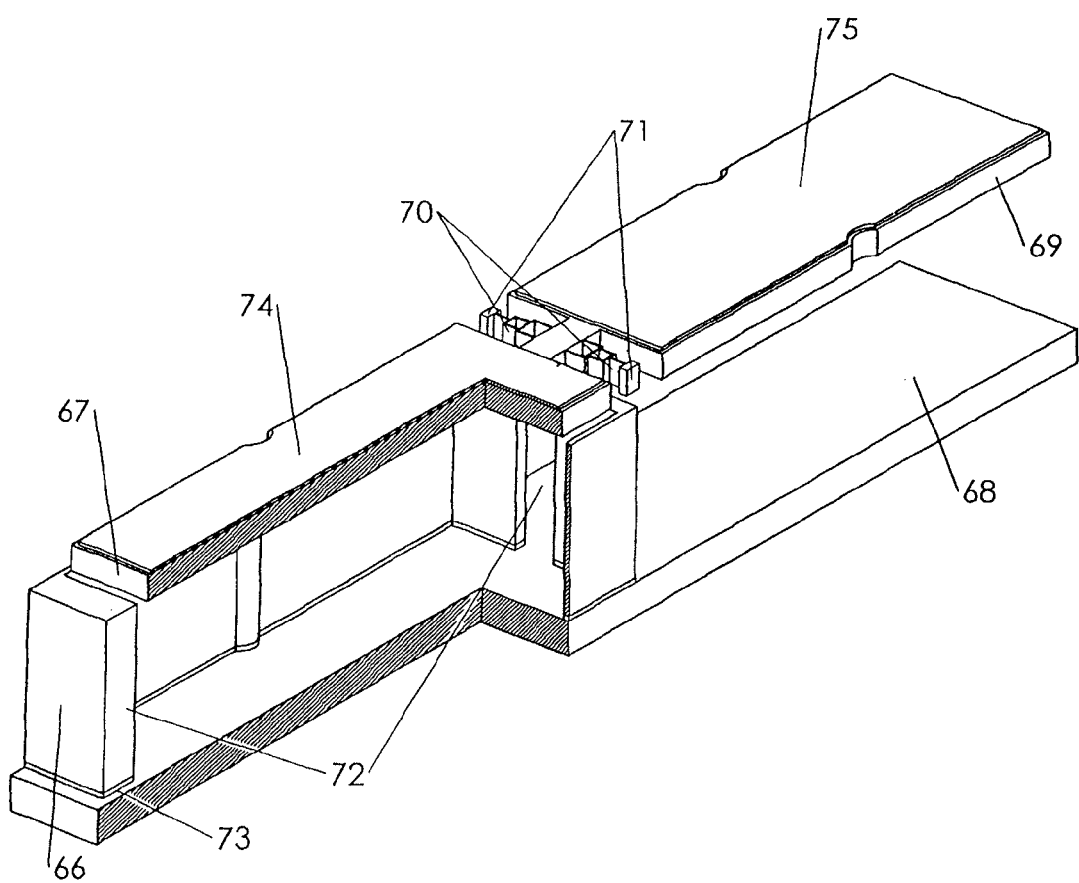
FIG. 8 is a perspective view of micromirror device with the wall structure surrounding only one of the two mirrors.

The mirror structures shown in FIGS. 6 and 8 have a higher mechanical stability if they are subject to shocking and vibration environments compared with the mirror structure shown in FIGS. 2 and 3. In FIG. 8, the anchors 71, hinges 70, and mirrors 67 and 69 are mechanically and electrically connected. Reflective metal coatings 74 and 75 are on the tops of mirrors 67 and 69, respectively. A layer of electrical isolation material 73 is used to electrically isolate the wall structure 66 and electrically conductive supporting material 68. Squeezed air releasing opening 72 is on the wall structure 66.

There are two mirrors 67 and 69 on the both side of the hinge 70, as shown in FIG. 8. If the device is subject to the shock force, the resulting inertia force from mirror 67 and 69 will be balanced out; no tilting around the hinge, e.g., the x-axis, will be expected. When the wall structure 66 and electrically conductive supporting material 68 are connected to the electrical ground, and the wall height is intentionally increased to the extent that the electrostatic force between wall structure 66 and mirror 67 is dominant compared with the electrostatic force between the electrically conductive layer 68 and mirror 75, any applied voltage on the mirrors 67 and 69 will cause the mirror 67 to move towards the electrically conductive supporting material 68 and the mirror 69 to move away from the electrically conductive layer 68.

Figure 9A:
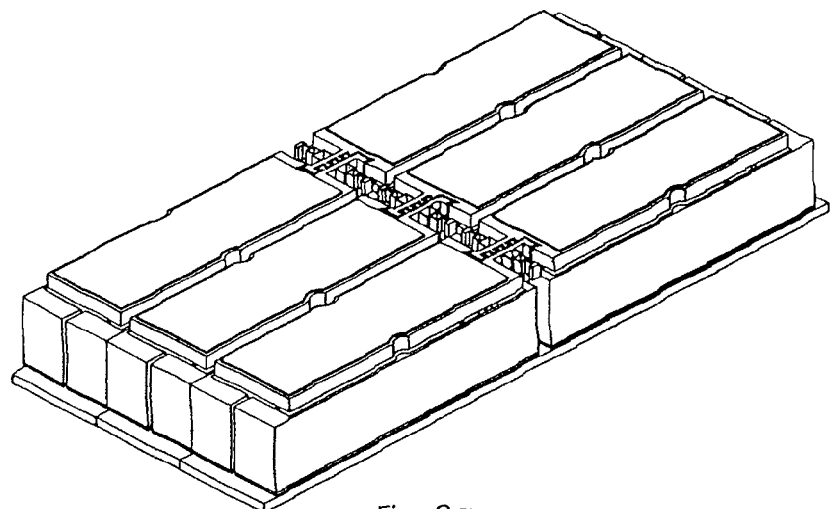
FIG. 9a is a perspective view of micromirror array device using the micromirror shown in FIG. 6.
Figure 9B:
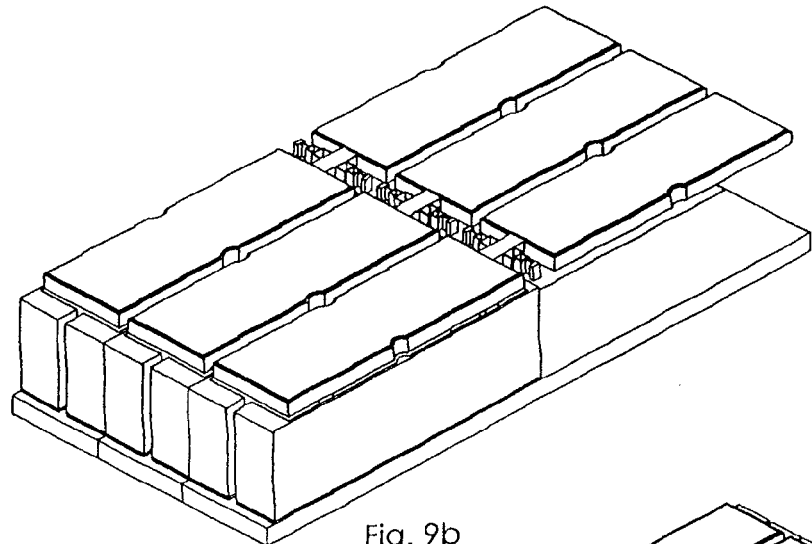
FIG. 9b is a perspective view of micromirror array device using the micromirror shown in FIG. 8.
Figure 9C:
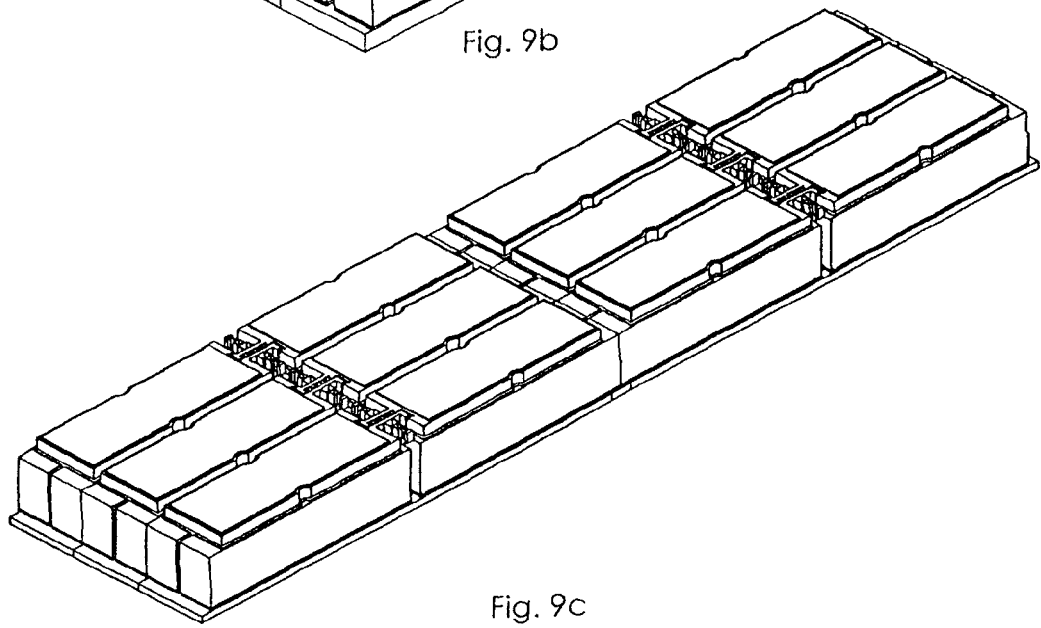
FIG. 9c is a perspective view of micromirror array device using the micromirror shown in FIG. 6.

The mirror structures shown FIG. 6 and FIG. 8 can be used in a mirror array with a high fill factor. FIG. 9*a* shows a row of a mirror array made by arranging the mirror structure shown in FIG. 6 side by side. FIG. 9*b* shows a row of a mirror array made by arranging the mirror structure shown in FIG. 8 side by side. FIG. 9*c* shows two rows of a mirror array made by arranging the mirror structure shown in FIG. 6 side by side.

Figure 10A:
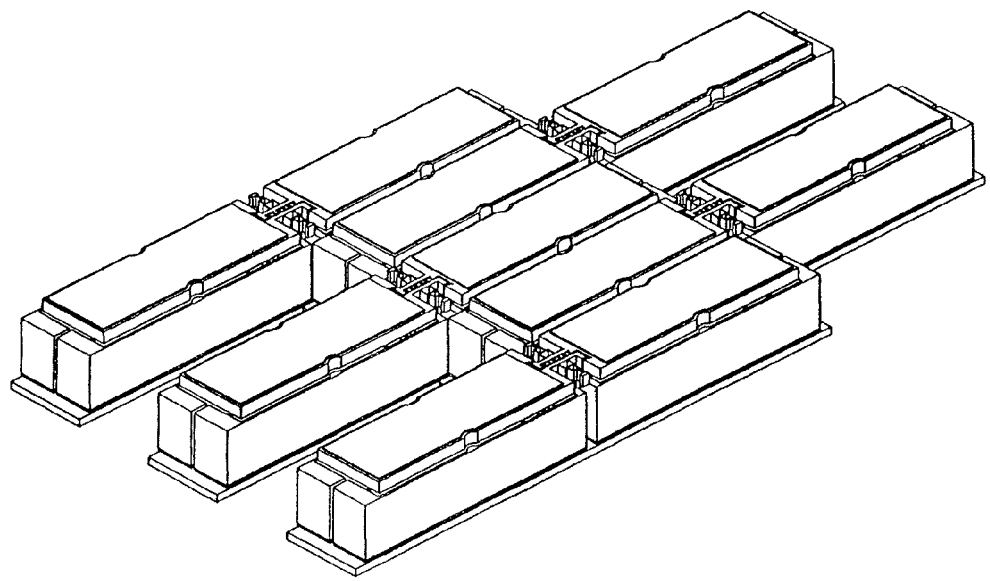
FIG. 10a is a perspective view of a micromirror array device using the micromirror shown in FIG. 6.
Figure 10B:
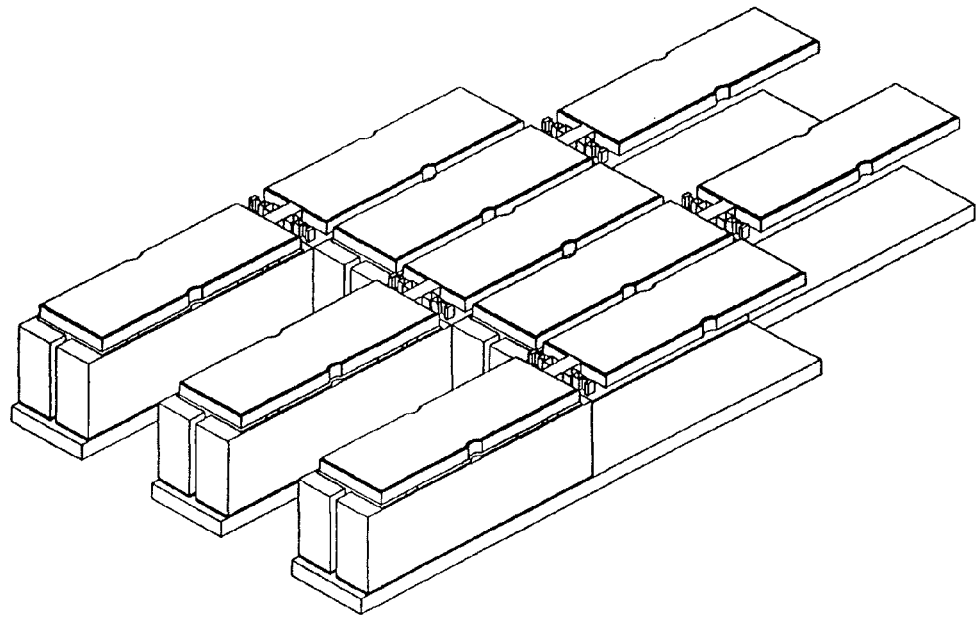
FIG. 10b is a perspective view of micromirror array device using the micromirror shown in FIG. 8.

Alternatively, the mirror array configurations with high fill factor may use mirror devices, such as those shown in FIG. 6 and FIG. 8, in a staggered or offset array as shown in FIG. 10. Both array configurations use only one of two mirror devices shown in FIG. 6 and FIG. 8 to form the mirror array in FIG. 10*a* and FIG. 10*b*.

Figure 11:
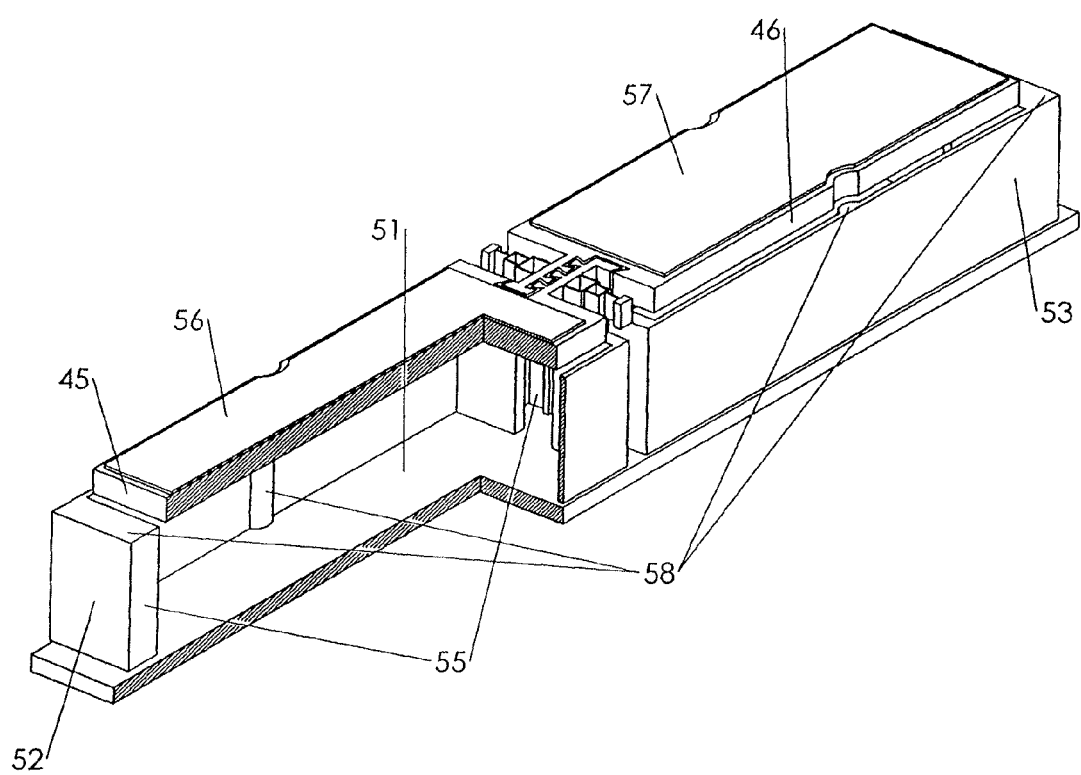
FIG. 11 is a perspective view of a micromirror device.

In the mirror device and mirror array structure shown in FIGS. 2, 3, 6, 8, 9 and 10, the wall structure and electrically conductive supporting material underneath are shown with an electrical isolation material between. However, depending on the process and material choice, as well as the desired mirror array structure and performance, the wall structure (e.g. wall structure 52 in FIG. 6*a*) and a layer of electrically conductive supporting material (e.g. supporting material 51 in FIG. 6*a*) can be formed from the same material, for example, a doped single crystal silicon. Therefore, no electrical isolation material layer (e.g. 54 in FIG. 6*a*) is required between the wall structure and the electrically conductive supporting material layer. The microfabrication process becomes simplified, and actuation control schemes are also simplified. The corresponding electrically conductive mirror (e.g. mirrors 45 and 46 in FIG. 6*a*) will be used as the control address electrode for the mirror tilting/rotation around the mirror hinges (e.g. hinges 48 and 49 in FIG. 6*b*). The mirror structure shown in FIG. 6 with no isolation material 54 is shown in FIG. 11.

Figure 1B:
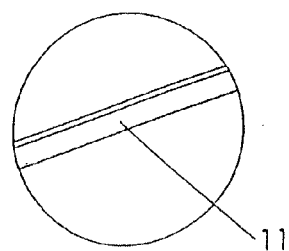
Figure 12:
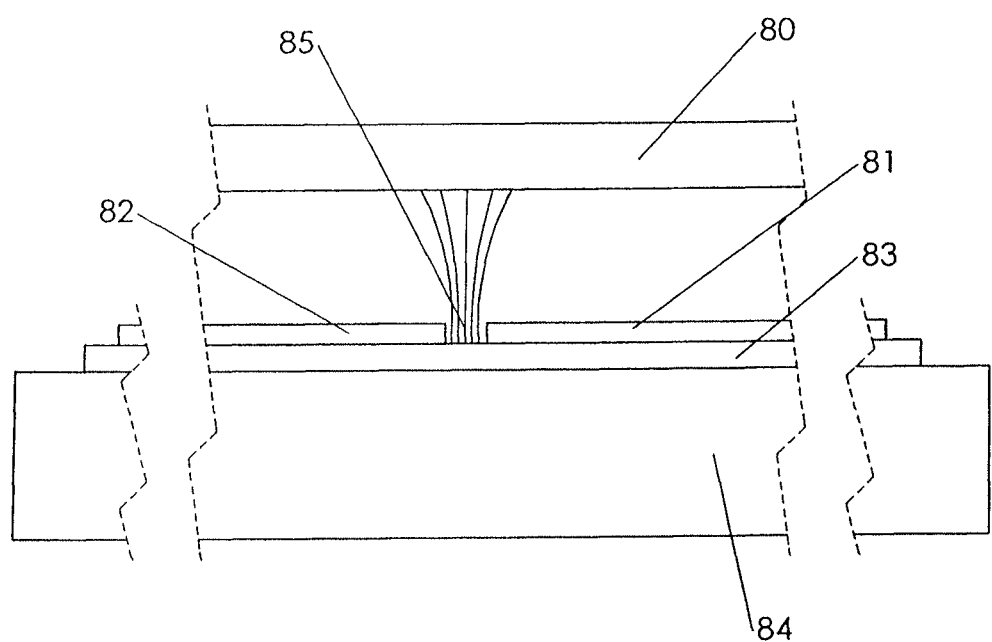
FIG. 12 is a side elevation view in section of the interference of charged dielectric material within the electrode gap.

In order to add more actuation controllability for the mirror tilting, some electrically conductive materials as actuation electrodes are often used underneath the mirror, for example, the fixed actuation electrode 4 shown in FIG. 1*b*. However, the fixed actuation electrode is often made of a thin layer of metal film. In FIG. 12, the fixed actuation electrodes 81 and 82 are on top of the dielectric material 83, which is on the support material 84. Due to very thin structure of the electrode 81 and 82, the electrical filed resulting from the electrical charging of the dielectric material 83 in the gap 85 between electrode 81 and 82 will affect the tilting of the mirror 80, resulting in spurious movement of the mirror.

Figure 13A:
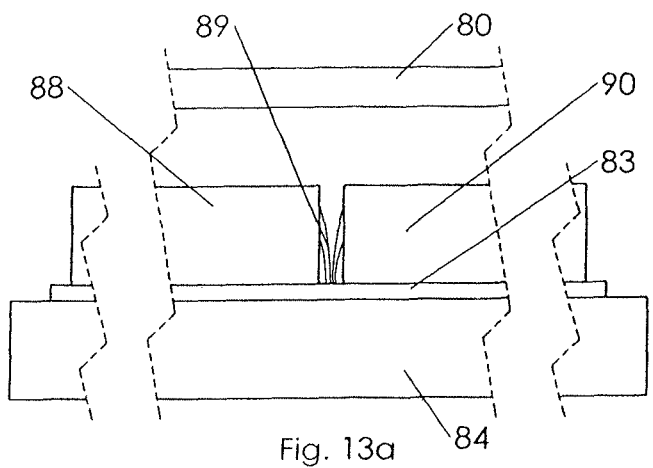
FIG. 13a is a side elevation view in section of the shielding effect of an electrode gap with high aspect ratio.

One method to shield the undesirable electrical field from the charged dielectric material and reduce spurious movement is to use the electrode structure with the high aspect ratio between the electrode thickness and electrode gap. In FIG. 13*a*, the electrode 88 and 90 are very thick compared with the gap 89 between them. Once the ratio between the electrode thickness and electrode gap is high enough, e.g. over 10, then the electrical field from the charged dielectric material can be significantly shielded. Therefore, the undesirable interference of the mirror tilting can be significantly minimized.

Figure 13B:
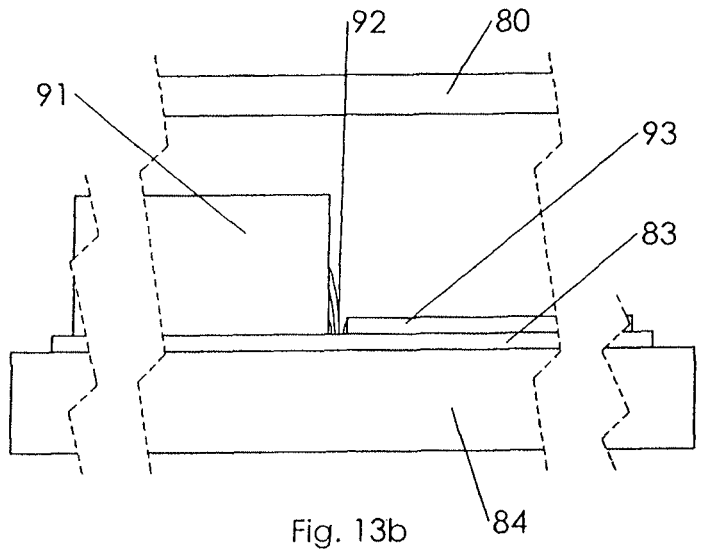
FIG. 13b is a side elevation view in section of the shielding effect of an electrode gap variation with high aspect ratio.

FIG. 13*b* shows another implementation, where electrode 91 is very thick, but electrode 93 is relative thinner. Once the gap 92 is small enough, sufficient shield results can be achieved.

Figure 13C:
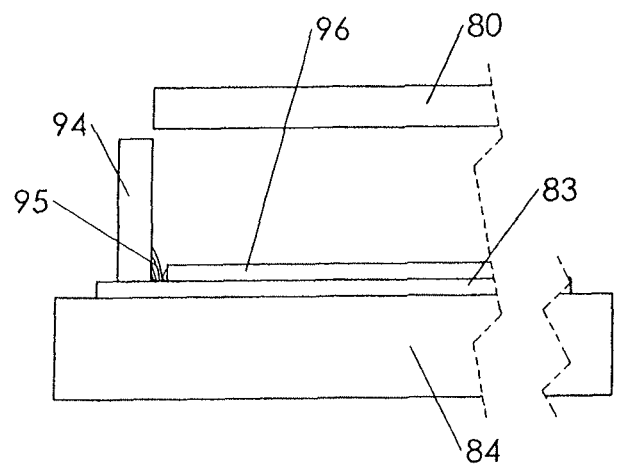
FIG. 13c is a side elevation view in section of the shielding effect of an electrode gap variation with high aspect ratio.

FIG. 13*c* shows a structure that is very similar to the mirror device with a surrounding electrically conductive wall structure. The electrode 94 represents the electrically conductive wall structure, and electrode 96 is fixed on the dielectric material 83 and is relatively thin. But with a fairly small electrode gap 95, sufficient shield results can be achieved.

Figure 14A:
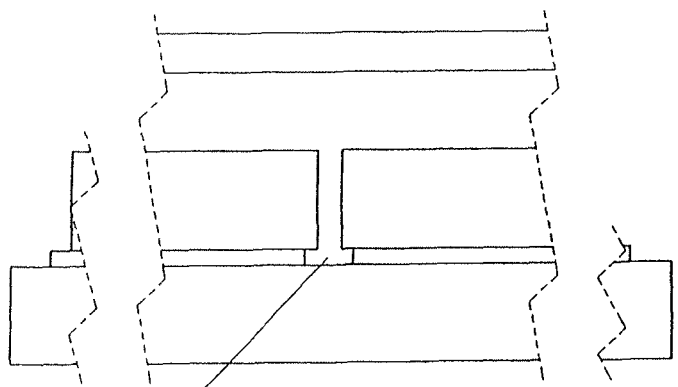
FIG. 14a is a side elevation view in section of the shielding effect of an electrode gap with high aspect ratio and removed dielectric material within the gap.
Figure 14B:
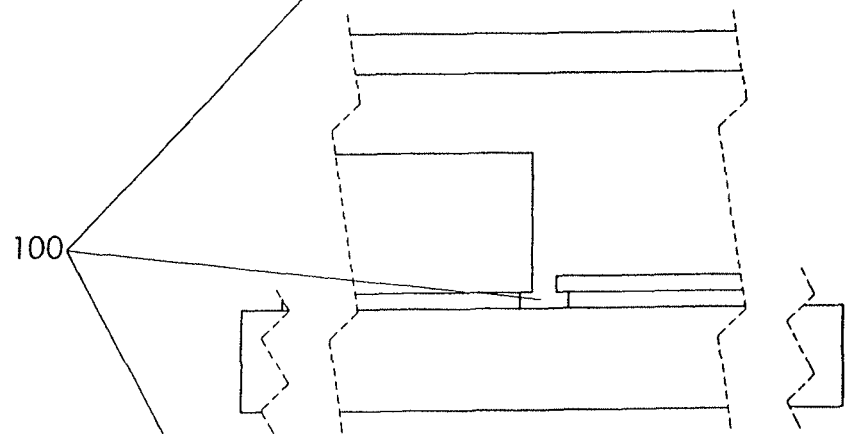
FIG. 14b is a side elevation view in section of the shielding effect of an electrode gap variation with high aspect ratio and removed dielectric material within the gap.
Figure 14C:
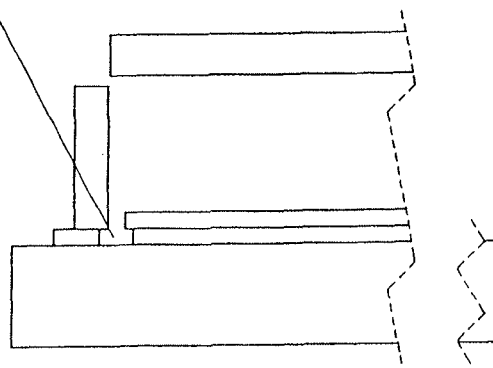
FIG. 14c is a side elevation view in section of the shielding effect of an electrode gap variation with high aspect ratio and removed dielectric material within the gap.

The shielding effects of undesirable electrical field from charged dielectric material can be even improved significantly if the dielectric material in the electrode gap region 100 can etched away so that over hanging electrodes are achieved, as shown in FIGS. 14*a*, 14*b* and 14*c*.

Figure 15A:
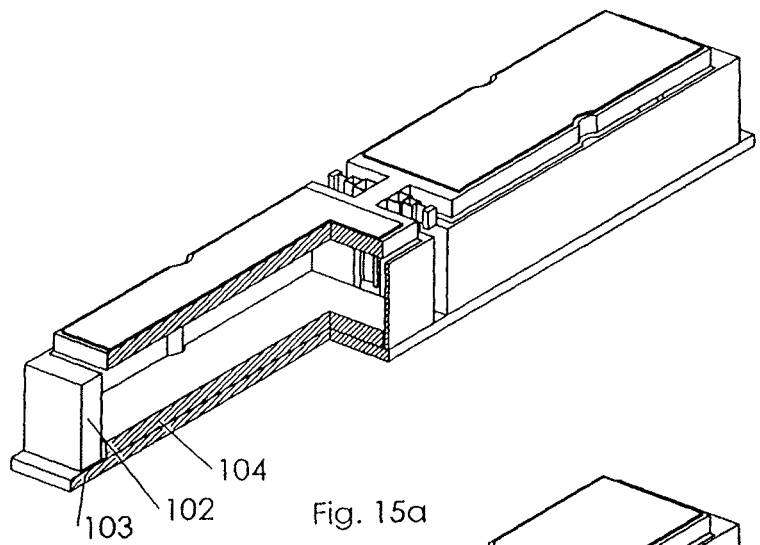
FIG. 15a is a perspective view in section of the micromirror using shielding effect of the electrode gap with high aspect ratio.
Figure 15B:
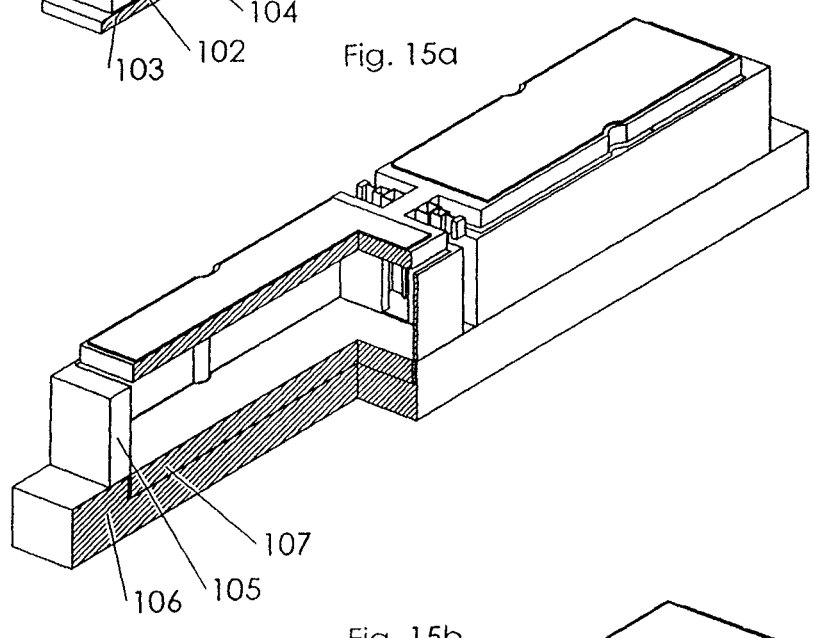
FIG. 15b is a perspective view in section of the micromirror variation using shielding effect of the electrode gap with high aspect ratio.
Figure 15C:
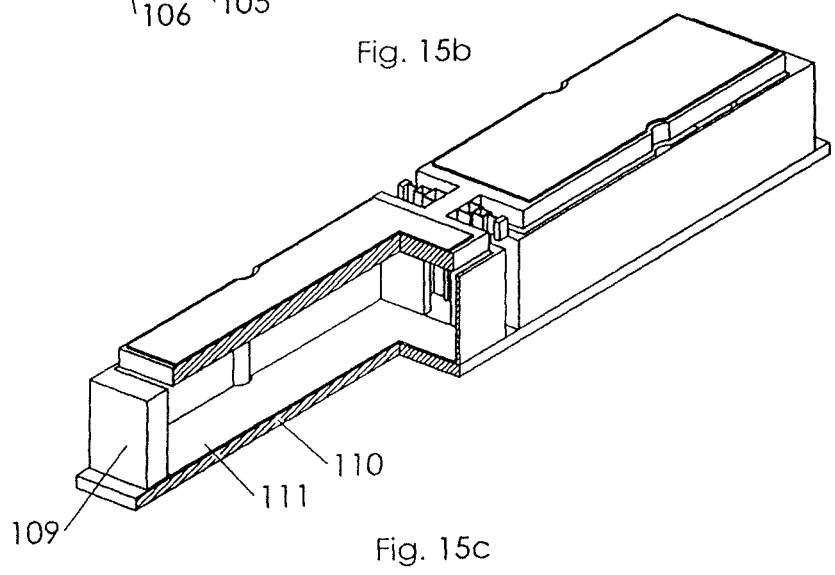
FIG. 15c is a perspective view in section of a micromirror variation using shielding effect of the electrode gap with high aspect ratio.

FIGS. 15*a*, 15*b* and 15*c* show the mirror devices with electrode structures that shield the undesirable electrical fields from charged dielectric material. In FIG. 15*a*, the electrically conductive wall 102 has very small gap with the thick electrically conductive electrode 104, which is on top of the dielectric material 103. In FIG. 15*b*, the wall structure 105 is on top of the dielectric material 106, and a relatively thick electrode 107 is inserted in the dielectric material 106. The gap between wall structure 105 and electrode 107 is very small, and the dielectric material in the gap region is etched away. In FIG. 15*c*, the wall structure 109 and the relatively thin electrode 111 are on top of the dielectric material 110, with a small gap between the wall structure 109 and the thin electrode 111.

Figure 16A:
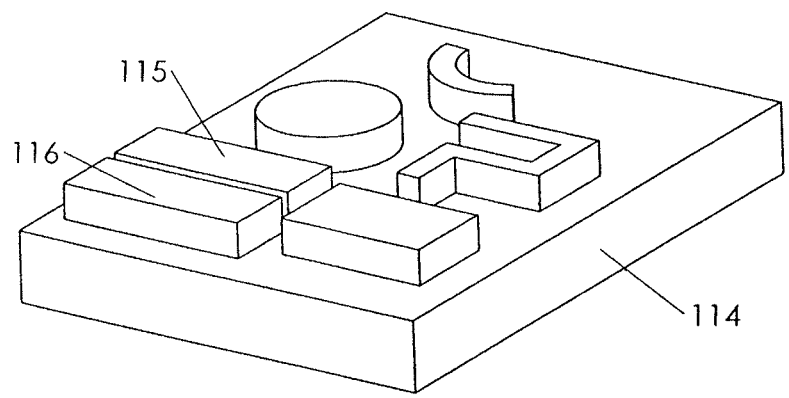
FIG. 16a is a perspective view of a glass plate with electrode structure using shielding effect of the electrode gap with high aspect ratio.

The structures of the electrodes 104, 107 and 111 shown in FIG. 15 may be fabricated or directly purchased from the commercial vendors. The substrate 114 shown in FIG. 16a may be Pyrex glass. The thick electrodes 115 and 116 can be electroplated on the top of the glass plate 114 with a small gap. Furthermore, various different shapes of the electrodes can be electroplated on the glass plate 114.

Figure 16B:
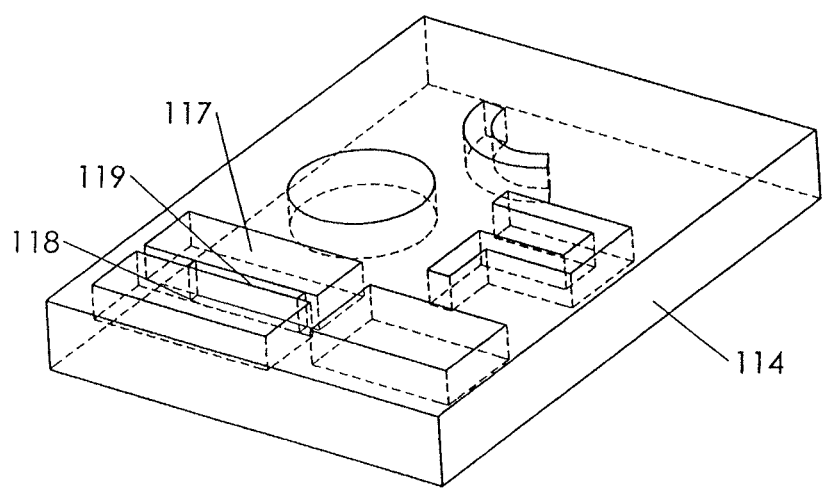
FIG. 16b is a perspective view of the glass plate with electrode structure using shielding effect of the electrode gap with high aspect ratio.

The customized silicon inserts in the glass plate can be purchased from the commercial supplier. The shape of the thickness and the properties (doping, etc.) of the silicon insets can be specified. In FIG. 16b, the silicon inserts 117 and 118 are heavily doped, and can be used as actuation electrodes. The gap between silicon insets 117 and 118 is very small. The glass in the area 119 of the gap region is etched away for the better shielding effects using high aspect ratio electrode gap structure.

Figure 16C:
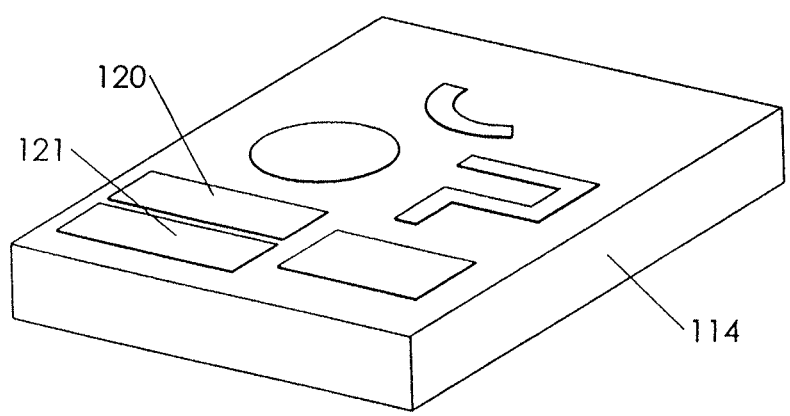
FIG. 16c is a perspective view of the glass plate with electrode structure using shielding effect of the electrode gap with high aspect ratio.

The conventional thin film metallization, lithography and metal film etching are used to form the electrodes shown in FIG. 16c. The processes are done on the flat surface of the glass substrate 114, such that the gap between electrode 121 and 120 can be made very small.

Figure 17A:
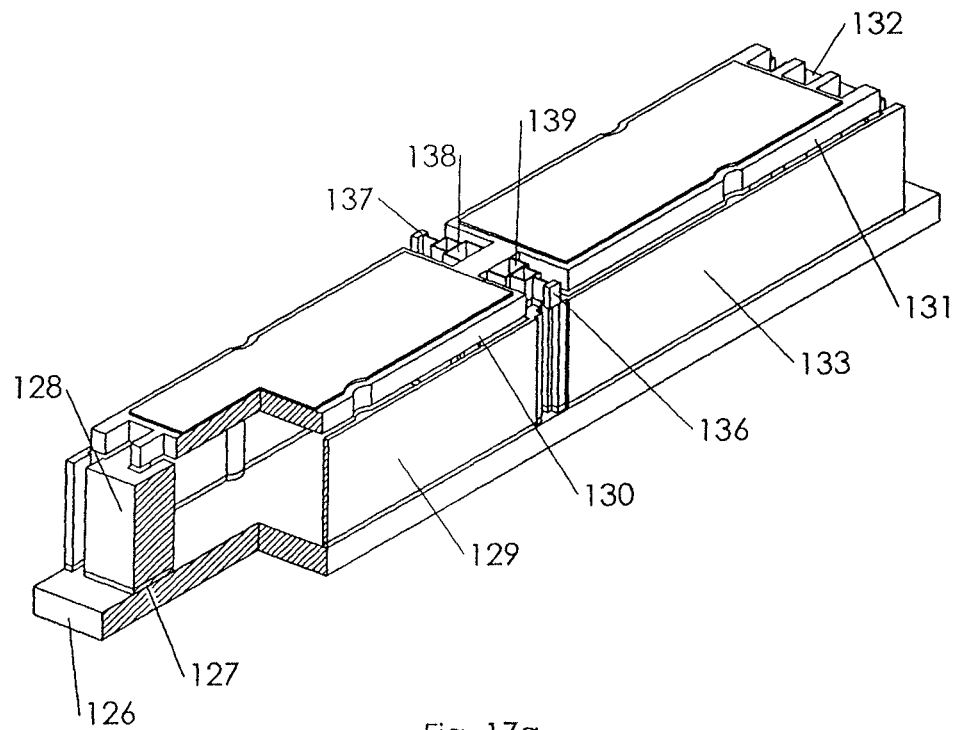
FIG. 17a is a perspective view in section of the micromirror using an electrostatic vertical comb drive.
Figure 17B:
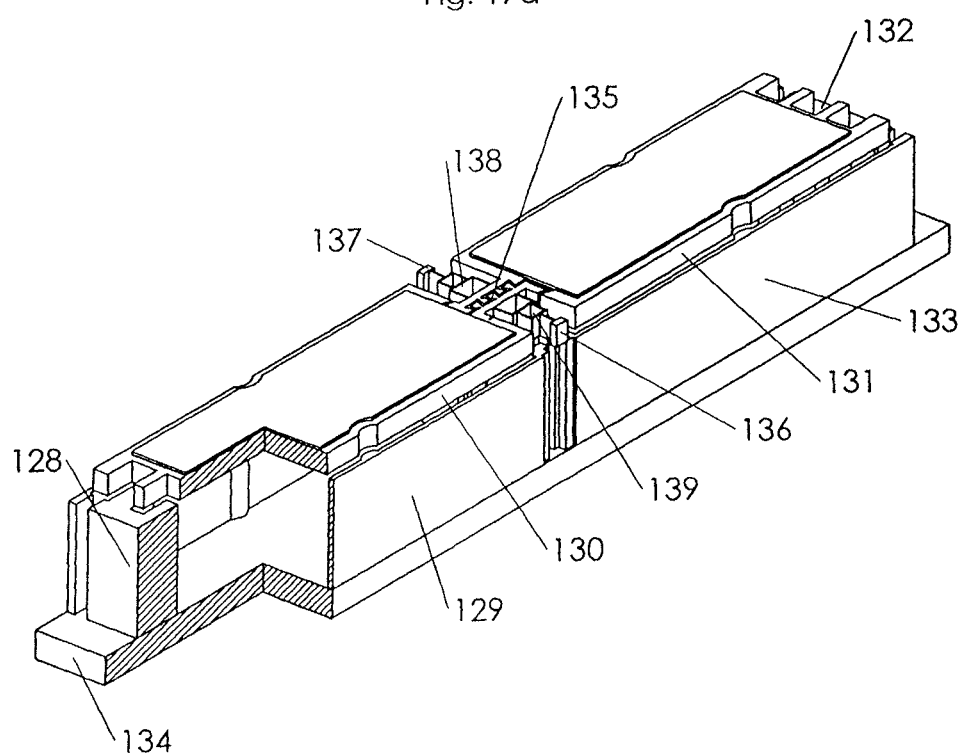
FIG. 17b is a perspective view in section of the micromirror using an electrostatic vertical comb drive and a trenching and refilling region on its mirror connector.

In order to increase the actuation effects between the mirror and the wall structure for larger actuation forces, some part of the wall structure of the mirror devices described previously, such as those shown in FIGS. 2, 3, 6, 8, 9, 10, 11 and 15, is made into a comb drive structure. FIG. 17a and FIG. 17b show the comb finger structures on the wall structure part 128 and 132, where the comb finger structures are also made on the mirror edges corresponding to the comb drive structures on the wall structure part 128 and 132. The comb finger structures on the wall structures and on the mirror edges forms a typical vertical electrostatic comb drive. These vertical comb drives have advantages of simple structure, easy fabrication and larger resulting electrostatic force.

In FIG. 17a, the supporting material 126 is made from electrically conductive material, such as heavily doped single crystal silicon. The wall structures 128, 129, 133 and 132 are also made from electrically conductive material, and they are electrically isolated from the electrically conductive supporting material 126 using dielectric material 127, which can be any suitable dielectric material, such as silicon oxide. The anchors 136 and 137, hinges 138 and 139, mirrors 130 and 131 are also made of the electrically conductive material. The reflective metal coatings are on the top of mirrors 130 and 131. The wall structures 128 and 132 with comb finger structures are mechanically and electrically separated from the remaining wall structures 129 and 133. There are a variety of actuation methods of the device shown in FIG. 17a. One of the actuation methods is described below.

The anchors 136 and 137, hinges 138 and 139, mirrors 130 and 131, wall structures 129 and 133 are connected to the electrical ground. If the comb drive of the wall structure 132 is connected to the electrical ground and an electrical voltage is applied to the comb drive of the wall structure 128, the resulting electrostatic force between the comb structures of wall structure 128 and mirror 130 will pull the mirror 130 to tilt in one direction around the hinges 137 and 139 towards the supporting material 126. The tilting will also cause the deformation of the hinges of 138 and 139. When the mechanical restoring force of the hinges 138 and 139 is balanced by the electrostatic force, the mirrors 130 and 131 will remain in the tilted position. If the comb drive of the wall structure 128 is connected to the electrical ground and an electrical voltage is applied to the comb drive of the wall structure 132, the resulting electrostatic force between the comb structures of wall structure 132 and mirror 131 will pull the mirror 131 to tilt in another direction around the hinges 137 and 139 towards the supporting material 126. The tilting will also cause the deformation of the hinges of 138 and 139. When the mechanical restoring force of the hinges 138 and 139 is balanced by the electrostatic force, the mirrors 130 and 131 will stay in another tilted position.

If the supporting material 126 in FIG. 17a is not an electrically conductive material, but instead a non-electrically conductive material, such as Pyrex glass, then a lay of electrically conductive materials (shown in FIG. 15) should be applied on the top of the supporting material 126 and under the mirrors to avoid electrical charging effects of the non conductive supporting material.

FIG. 17b shows another implementation with vertical comb drive. The supporting material 134 is an electrically conductive material. The wall structures 128, 129, 133 and 132 are made of the electrically conductive material, and they are electrically connected to the electrically conductive supporting material 134. The anchors 136 and 137, hinges 138 and 139, mirrors 130 and 131 are also made of the electrically conductive materials. The reflective metal coatings are on the top of mirror 130 and 131. The trenching and refilling region 135 is on the mirror connector between the hinges 138 and 139. The region 135 mechanically connects but electrically isolates the separated mirror connector, so the mirror 130 and mirror 131 are mechanically connected but electrically isolated. There are a variety of actuation methods of the device shown in FIG. 17b. One of the methods is described below.

If the wall structures 128, 129, 132 and 133, supporting material 134, anchor 137, hinge 138 and mirror 131 are all connected to the electrical ground, and an electrical voltage is applied to the anchor 136, hinge 139 and mirror 130, the resulting electrostatic force between the comb finger structures of wall structure 128 and mirror 130 will pull the mirror 130 to tilt in one direction around the hinges 137 and 139 towards the supporting material 134. The tilting will also cause the deformation of the hinges of 138 and 139. When the mechanical restoring force of the hinges 138 and 139 is balanced by the electrostatic force, the mirrors 130 and 131 will stay in a tilted position. If the wall structures 128, 129, 132 and 133, supporting material 134, anchor 136, hinge 139 and mirror 130 are all connected to the electrical ground, and an electrical voltage is applied to the anchor 137, hinge 138 and mirror 131, the resulting electrostatic force between the comb finger structures of wall structure 132 and mirror 131 will pull the mirror 131 to tilt in another direction around the hinges 137 and 139 towards the supporting material 134. The tilting will also cause the deformation of the hinges of 138 and 139. When the mechanical restoring force of the hinges 138 and 139 is balanced by the electrostatic force, the mirrors 130 and 131 will stay in another tilted position.

If the supporting material 134 in FIG. 17b is not electrically conductive material, such as doped silicon, but a non-electrically conductive material such as Pyrex glass, then a lay of electrically conductive materials (shown in FIG. 15) should be applied on the top of the supporting material 134 and under the mirrors to avoid electrical charging effects of the non conductive supporting material.

Figure 17C:
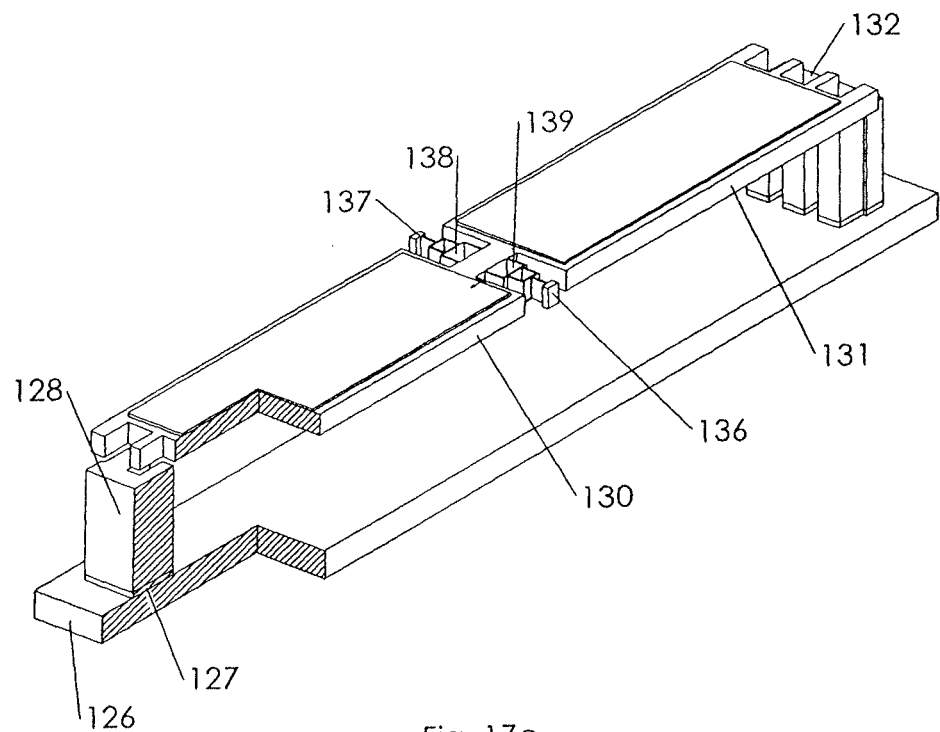
FIG. 17c is a perspective view in section of the micromirror using an electrostatic vertical comb drive without the wall structure between two adjacent mirrors.
Figure 17D:
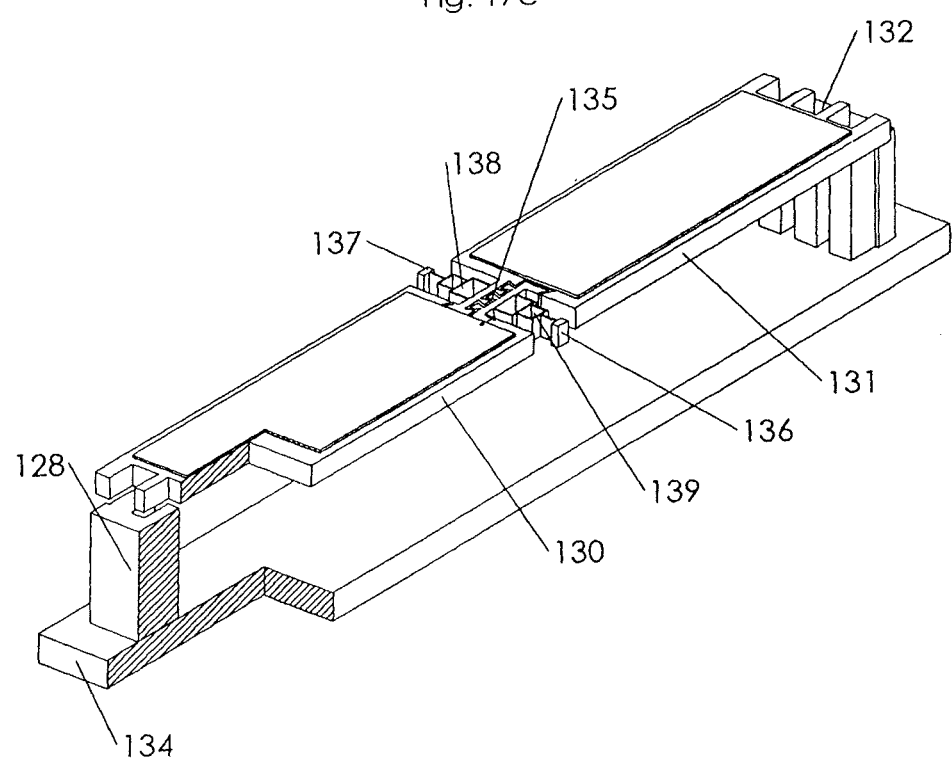
FIG. 17d is a perspective view in section of the micromirror using an electrostatic vertical comb drive and a trenching and refilling region on its mirror connector, and without the wall structure between two adjacent mirrors.

Sometimes, it is important to have a higher fill factor for the mirror array. In this case, the whole or part of wall structure 129 and 133 between two adjacent mirrors can be removed to reduce the gap between any two adjacent mirrors. FIG. 17c and FIG. 17d show the mirror devices shown in FIGS. 17a and 17b without wall structure 129 and 133 between two mirrors respectively. Vertical comb dive electrostatic actuators in 128 and 132 in FIGS. 17a, 17b, 17c and 17d are the dominant actuators.

There are varieties of actuation methods of the device shown in FIG. 17c. One of the actuation methods is described below.

The anchors 136 and 137, hinges 138 and 139, mirrors 130 and 131 are connected to the electrical ground. If the comb drive of the wall structure 132 is connected to the electrical ground, and an electrical voltage is applied to the comb drive of the wall structure 128, the resulting electrostatic force between the comb finger structures of wall structure 128 and mirror 130 will tilt the mirror 130 in one direction around the hinges 137 and 139 towards the supporting material 126. The tilting will also cause the deformation of the hinges of 138 and 139. When the mechanical restoring force of the hinges 138 and 139 is balanced by the electrostatic force, the mirrors 130 and 131 will stay in a tilted position. If the comb drive of the wall structure 128 is connected to the electrical ground, and an electrical voltage is applied to the comb drive of the wall structure 132, the resulting electrostatic force between the comb finger structures of wall structure 132 and mirror 131 will pull the mirror 131 to tilt in another direction around the hinges 137 and 139 towards the supporting material 126. The tilting will also cause the deformation of the hinges of 138 and 139. When the mechanical restoring force of the hinges 138 and 139 is balanced by the electrostatic force, the mirrors 130 and 131 will stay in another tilted position.

If the supporting material 126 in FIG. 17c is not an electrically conductive material such as doped silicon, but an electrical non-conductive material such as Pyrex glass, then a lay of electrically conductive materials (shown in FIG. 15) should be applied on the top of the supporting material 126 and under the mirrors to avoid electrical charging effects of the non conductive supporting material.

Figures 18A, 18B, 18C:
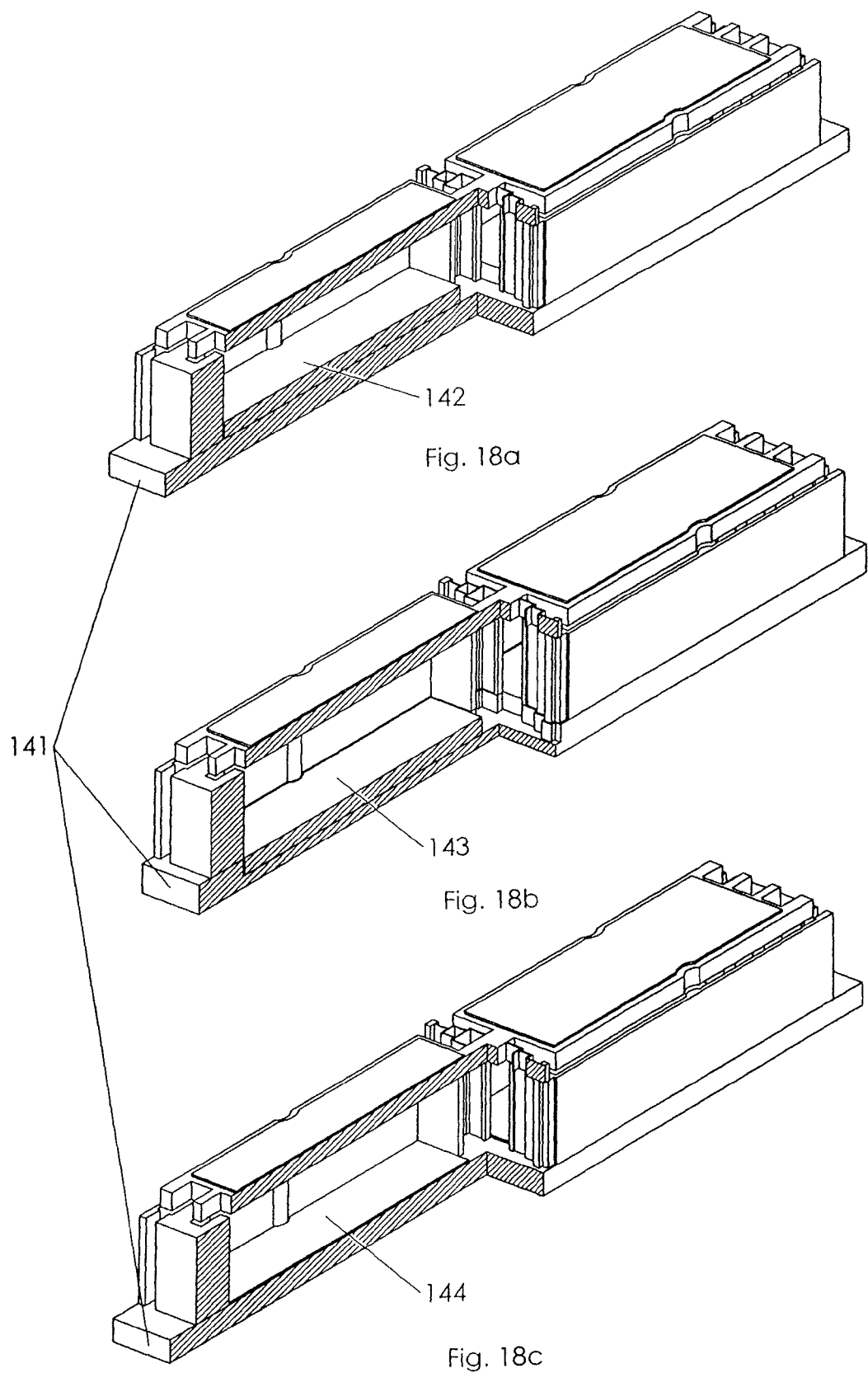
FIG. 18a is a perspective view in section of the micromirror using an electrostatic vertical comb drive and an electrode structure using the shielding effect of the electrode gap with high aspect ratio.
FIG. 18b is a perspective view in section of the micromirror variation using an electrostatic vertical comb drive and an electrode structure and using the shielding effect of the electrode gap with high aspect ratio.
FIG. 18c is a perspective view in section of a micromirror variation using an electrostatic vertical comb drive and an electrode structure and using the shielding effect of the electrode gap with high aspect ratio.

The mirror devices with more actuation flexibilities and lower actuation voltage are shown in FIGS. 18a, 18b and 18c. These mirror devices have three actuation components, general wall structures between two mirrors, and comb structures on the part of wall structure and bottom electrodes on the supporting material. The three actuation components can be used at the same time, can be used with any two components, or can be used independently. The trenching and refilling regions are not shown on the mirror devices in FIGS. 18a, 18b and 18c, but can be implemented in all three mirror devices. The supporting materials 141 in FIGS. 18a, 18b and 18c can be a dielectric material, such as Pyrex glass. The electrodes 142, 143 and 144 form high aspect ratio gaps with the wall structures. These high aspect ratio gaps have very good electrical shielding effects to the electrical field of the charged dielectric materials which are exposed to the mirrors. The etching away or removal of the dielectric material within the gaps (shown in FIGS. 14a, 14b and 14c) can further increase the shielding effects and reduce the undesired charging effects.

Sometimes, it is important to have a higher fill factor for the mirror array. In this case, all or part of general wall structure between two adjacent mirrors should be removed to reduce the gap between any two adjacent minors. FIGS. 18d, 18e and 18f shows the mirror devices shown in FIGS. 18a, 18b and 18c without general wall structure between two adjacent mirrors respectively.

Figure 19A:
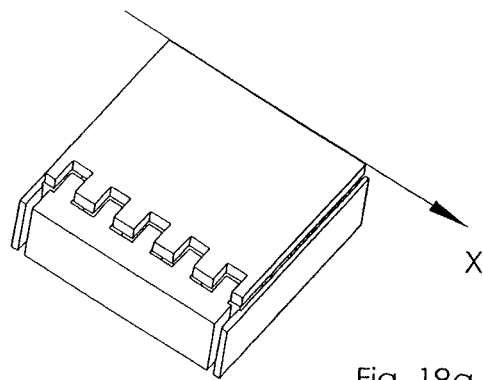
FIG. 19a is a perspective view of a comb finger design.
Figure 19B:
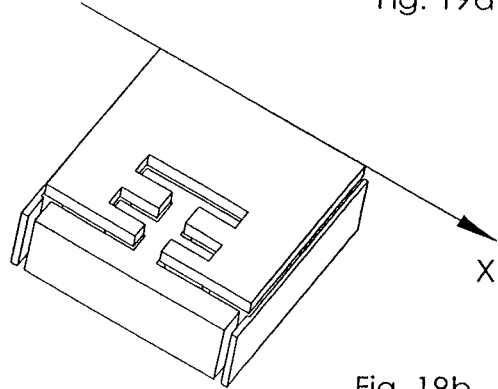
FIG. 19b is a perspective view of a comb finger design variation.
Figure 19C:
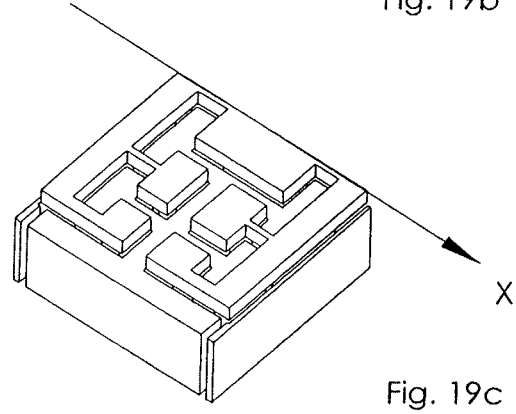
FIG. 19c is a perspective view of a comb finger design variation.
Figure 19D:
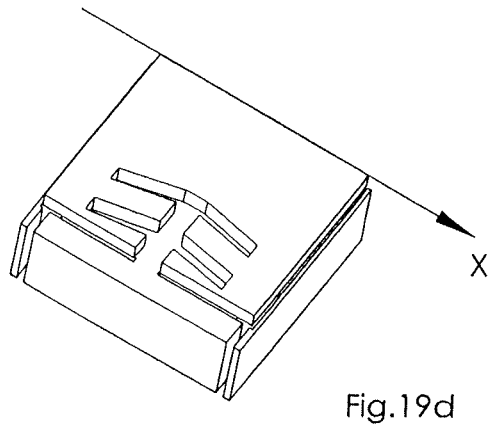
FIG. 19d is a perspective view of a comb finger design variation.

The comb drive structures on the mirror edges or on the part of wall structures form vertical electrostatic comb drives. There are many comb finger configurations of such vertical comb drive actuators. FIG. 19 shows four different comb drive finger configurations. The comb fingers are perpendicular to the tilting x-axis in FIG. 19a, and the comb fingers are parallel to the tilting x-axis in FIG. 19b. The comb fingers may also have a small angle with the tilting axis X as shown in FIG. 19d. The comb finger configuration has many variations besides the above-mentioned three comb finger configurations. For example, the comb fingers can be a curved beam, multiple curved beams or multiple straight beams, as long as the effective comb finger has very small angle with the tilting x-axis. In addition, combinations of the above three comb finger configurations can also be used. FIG. 19c shows the combination of comb finger configurations in FIGS. 19a and 19b.

Figure 20A:
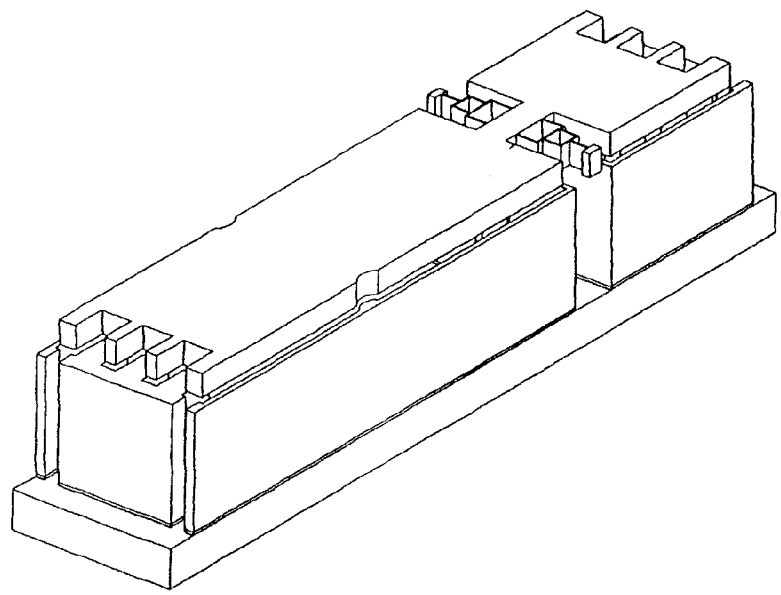
FIG. 20a is a perspective view of a micromirror variation using an electrostatic vertical comb drive to increase mirror tilting angle.
Figure 20B:
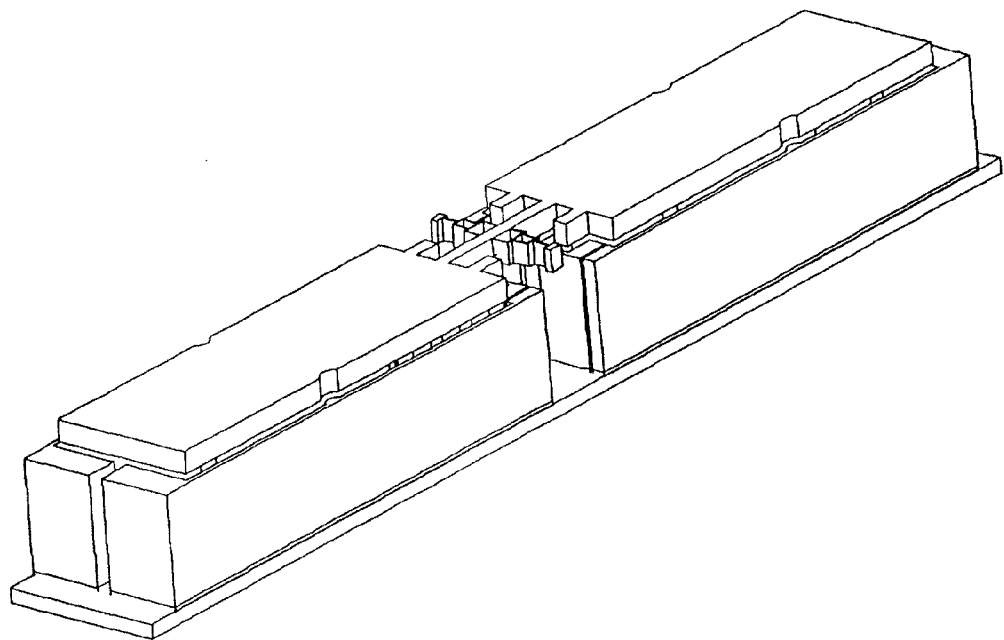
FIG. 20b is a perspective view of a micromirror variation using an electrostatic vertical comb drive to increase mirror tilting angle.

For the purposes of having different tilting angle and structure strength as well as convenience to form the mirror array with high fill factor, the electrostatic vertical comb drives are arranged at such locations shown in FIGS. 20a and 20b. There are two vertical comb drives in FIG. 20a. One is close to the tilting hinges, and the other is spaced from the tilting hinges. When the vertical comb drive close to the hinge is used, a larger mirror tilt can be expected. The two vertical comb drives are all close to the tilting hinges shown in FIG. 20b, therefore when any one of the actuators works, a larger mirror tilt can be expected.

All the mirror structure shown in FIGS. 17a-18f, 20a and 20b can be used to form the high fill factor mirror arrays shown in FIG. 9 and FIG. 10.

Figure 21A:
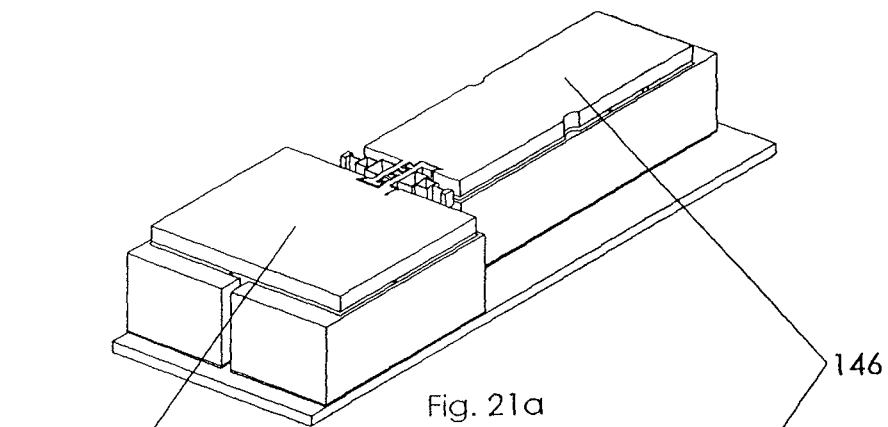
FIG. 21a is a perspective view of a micromirror variation using a trenching and refilling region to reduce the mirror array die size.
Figure 21B:
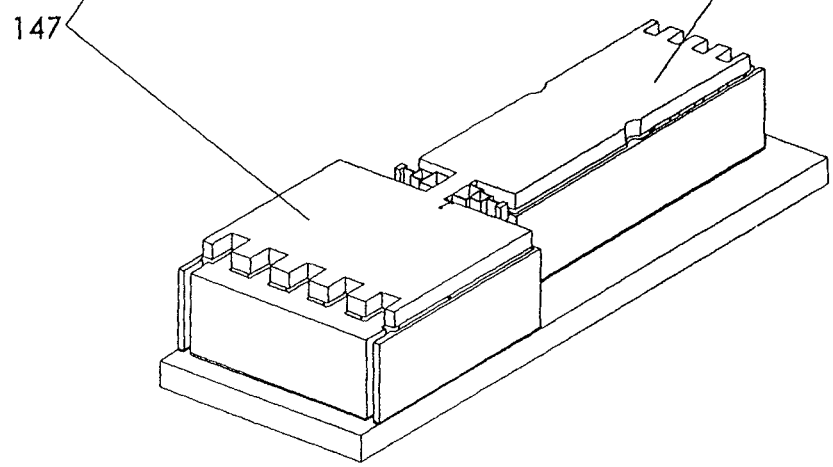
FIG. 21b is a perspective view of a micromirror variation using an electrostatic vertical comb drive to reduce the mirror array die size.

The mirror device can also be designed in such way that the mirror 146 in FIG. 21 used for optical switching, etc. is on one side of the hinges, while the shorter and wider part 147 in FIG. 21 is on the other side of hinged as a weight balance mirror. These mirror structures have many advantages, such as forming a smaller footprint mirror array. The purpose of part 147 is to keep the mirror 146 in the stable positions if the whole mirror device is subjected to the shock and vibration environments. Since part 147 is not used as an optical mirror, it can be designed using shorter and wider shapes. FIG. 21a shows a mirror device with a retrenching and refilling region on the mirror connector. FIG. 21b shows a mirror device that has comb fingers on the mirror edges and a weight balanced mirror edge. If the actuation electrodes underneath the mirror 146 and weight balanced mirror 147 are required, the high aspect ratio electrode gap with electrical field shielding effect should be used in all these mirror devices.

In order to have a mirror array with an even higher fill factor, the whole or part of the wall structure between two adjacent mirrors in FIGS. 21a and 21b can be removed.

Figure 21C:
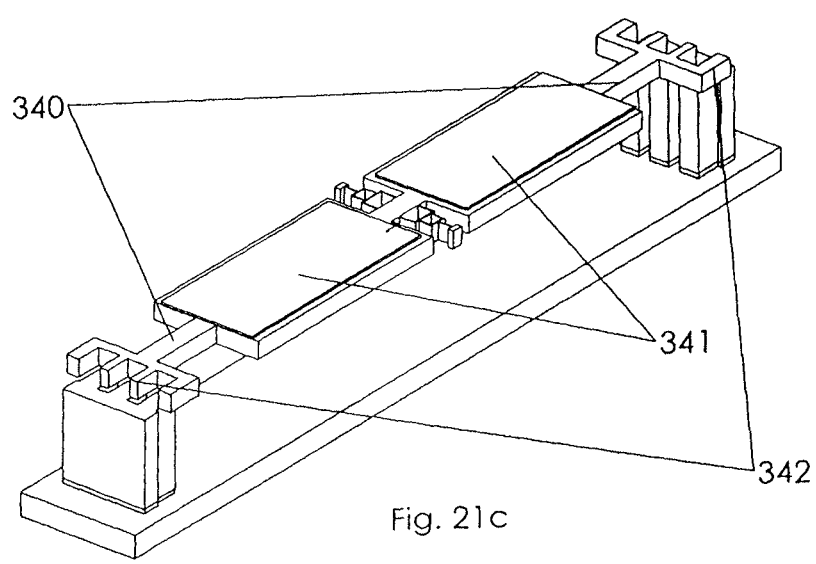
FIG. 21c is a perspective view of a micromirror variation using electrostatic vertical comb drive and extension beams.

FIG. 21c shows the comb finger structures 342 connected to the mirrors 341 through extension beams 340. The purpose of extension beam is to form higher fill factor mirror arrays when the mirror pitch is getting smaller while wider space is required for these comb finger structure.

The high fill factor mirror array shown in FIG. 22a can be formed using mirror device shown in FIG. 21a, while the mirror array in FIG. 22b can be formed using mirror device shown in FIG. 21b. Both mirror arrays have smaller foot prints. The mirror array shown in FIGS. 22a and 22b can be also formed with the mirror devices shown in FIGS. 21a and 21b without a wall structure between two adjacent mirrors.

The high fill factor mirror array shown in FIG. 22c can be formed using the mirror device shown in FIG. 21c. FIG. 22d shows a simplified version of the mirror array shown in FIG. 22c in order to reduce the die size and cost. The wall structure between two adjacent mirrors can be partly or totally removed depending on the requirements of mirror filling factor. In FIGS. 22d and 22c, the hinges 312 and 313 of adjacent mirrors 305 and 306 are staggered in order to accommodate the wider hinge for the mirror array with smaller mirror pitch, where the mirror pitch is the distance between two adjacent mirror centers. The comb finger structures 301 and 303 are connected to the mirrors 305 and 306 using extension beams 308 and 307, respectively. The fixed comb finger structures 300 and 302 are separated by DRIE trenches and conductive electrical shielding traces 310. The mechanical stop 309 is used to prevent the excess undesirable side way movement of the mirror.

Figure 23A:
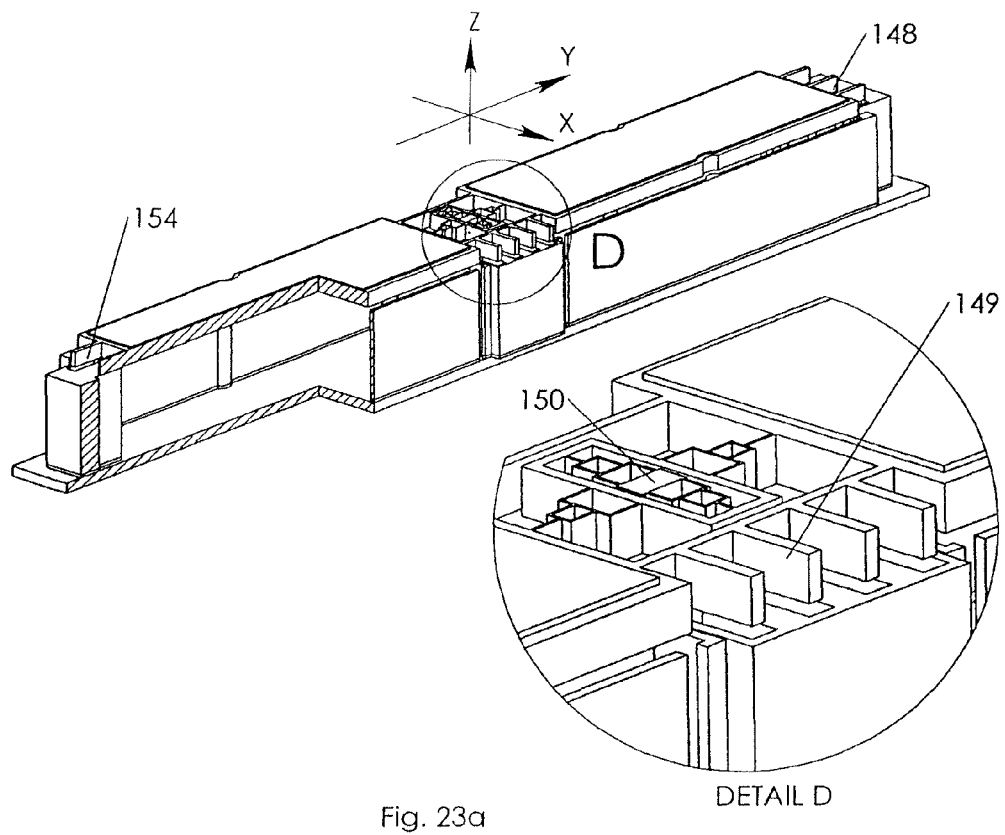
FIG. 23a is a perspective view in section of a micromirror using vertical comb drive for two axes tilting with a detailed view of Detail "D".

The mirror device shown in FIG. 23 has the ability to tilt around both X and Y axes. In FIG. 23a, the anchor 150 is fixed and within a gimbal hinge structure formed by the combination of single I beam and cascaded double I beams. The vertical comb drive 148 is used to tilt the mirrors in one direction around axis X, while the vertical comb drive 154 is used to tilt the mirrors in another direction around axis X. The vertical comb drive 149 is used to tilt the mirrors in one direction around axis Y.

Figure 23B:
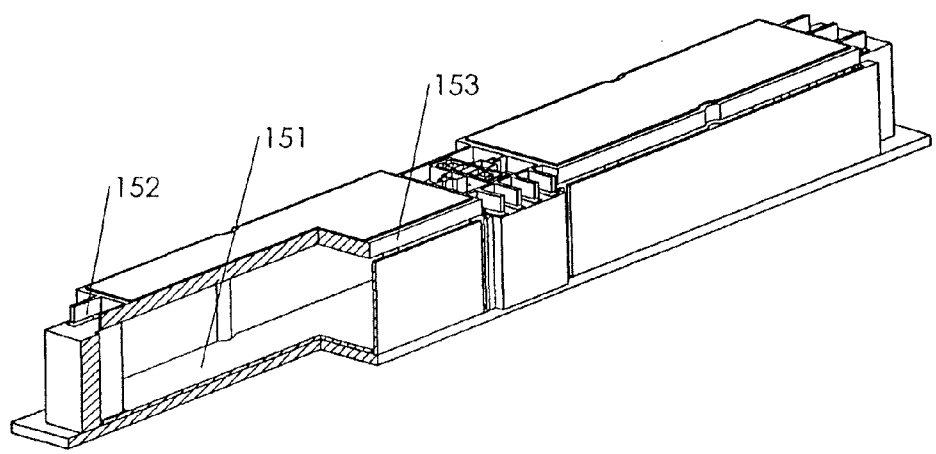
FIG. 23b is a perspective view in section of a micromirror variation using a vertical comb drive for two axes tilting.

In FIG. 23b, the actuation electrodes on the supporting material are used to increase the actuation ability. The electrode 151 can work with vertical comb drive 152 to pull the mirror 153 toward itself. For both devices shown in FIGS. 23a and 23b, again the general wall structure between two adjacent mirrors can be partly or totally removed to increase the mirror fill factor.

Figure 24A:
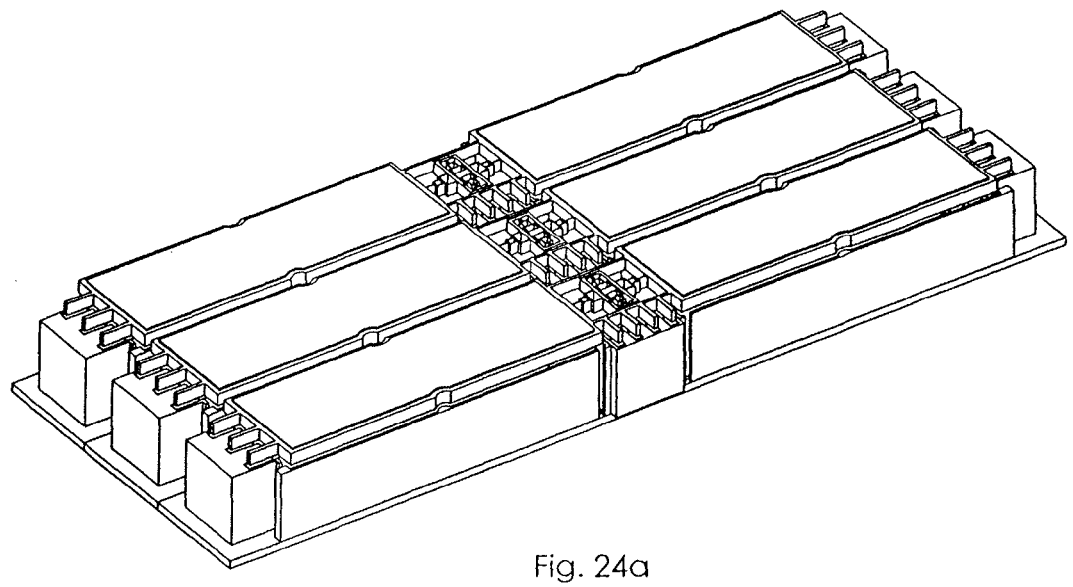
FIG. 24a is a perspective view of a micromirror variation using the micromirror shown in FIG. 23b.
Figure 24B:
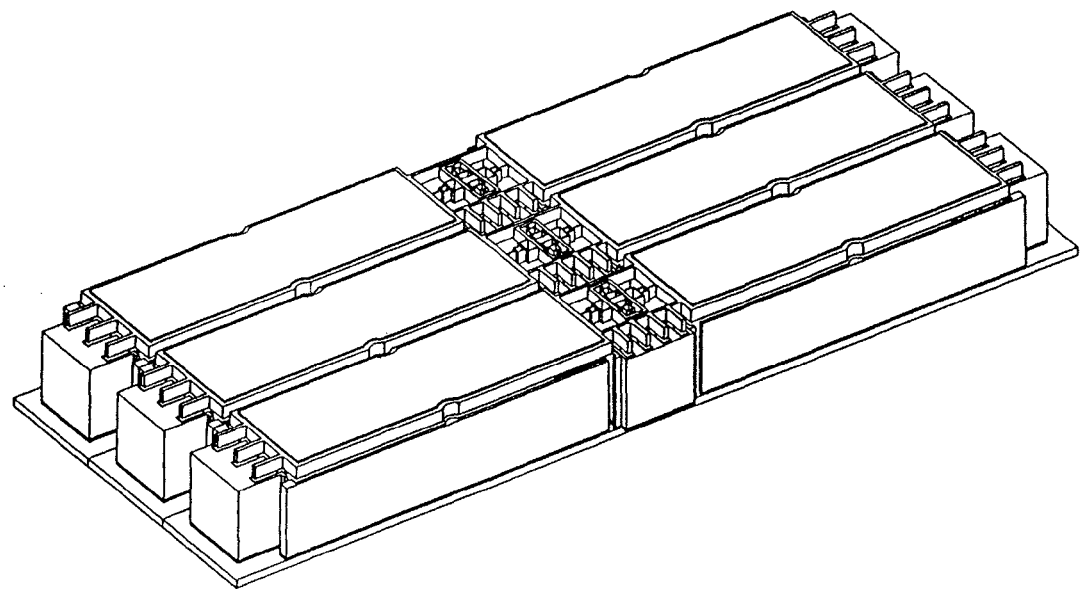
Figure 25:
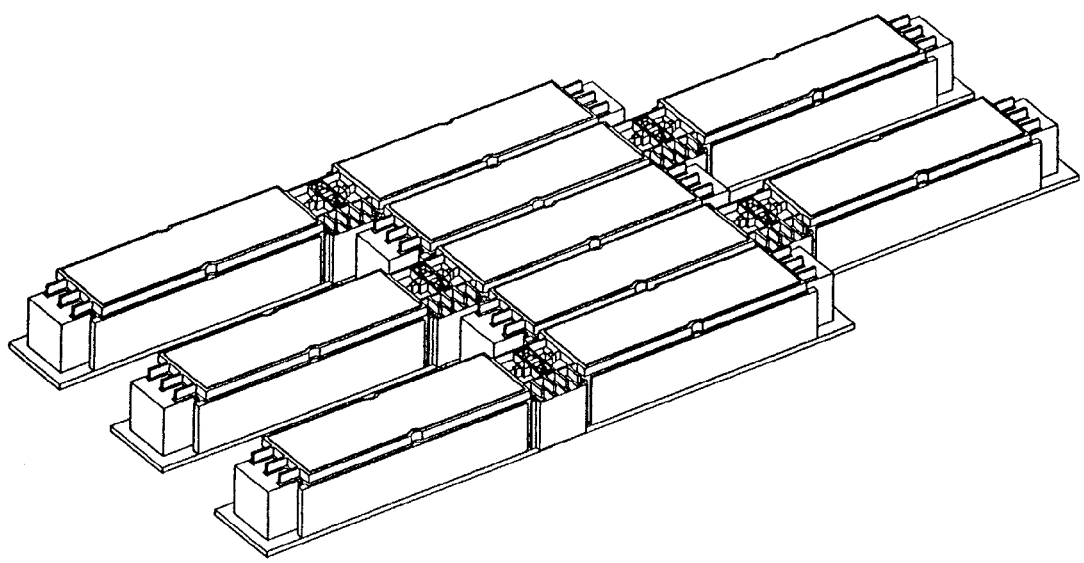
FIG. 25 is a perspective view of a micromirror variation using the micromirror shown in FIG. 23a or FIG. 23b.

The high fill factor mirror array shown in FIG. 24a can be formed using mirror device shown in FIG. 23b, while the mirror array in FIG. 24b can be formed using mirror device shown in FIG. 23a. Both mirror devices can be also configured to form the high fill factor mirror array shown in FIG. 25. Again, the mirror array shown in FIG. 24 and FIG. 25 can be formed by the mirror devices shown in FIG. 15, 17, 18, 20, 21 or 23, while the general wall structures between two adjacent mirrors of these mirror devices may be partly and totally removed to increase the mirror fill factor. Also, these mirror device may use extension beams to connect the comb drive fingers to the mirror for the mirror array with smaller mirror pitches, the mirror pitch is the distance between two adjacent mirror centers.

Many microfabrication methods and materials can be used to make the micromirrors and micromirror arrays described herein. Two microfabrication process flows and corresponding materials will be described in the following paragraphs. Only major process steps are described. The process methods and materials are not limited to what is described in these two microfabrication methods.

The first process flow shown in FIG. 26 gives a very simple process flow. The purpose of this process flow is for making a lower budget 1×2 WSS micromirror array, VOA, optical switch etc. A SOI (Silicon on Insulator) wafer (shown in FIG. 26a) is used as the starting material. It has thin oxide layer 155, silicon device layer 158, which is heavily doped to increase the electrical conductivity, buried oxide layer 156 and handle silicon wafer 157. The trenching and refilling regions can also be made in the silicon device layer 158. The trenching and refilling regions are not shown in the process flow. Such SOI wafer can be custom made by silicon wafer vendors.

Figure 26A:
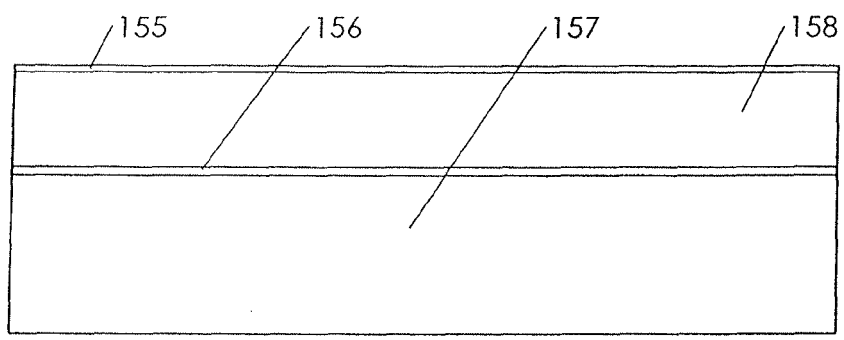
FIG. 26a-26k are side elevation views in section of major process steps of the first fabrication method to fabricate a micromirror and micromirror array.
Figure 26B:
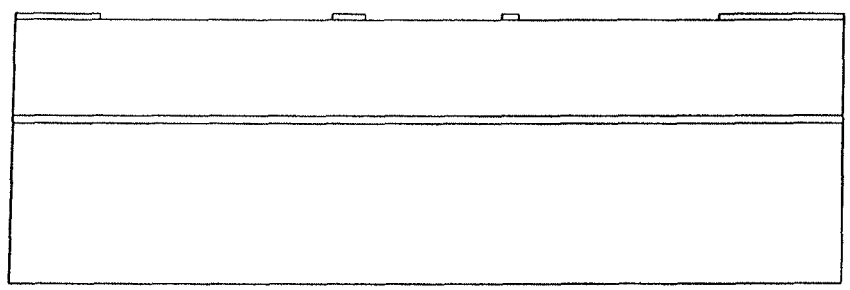
Figure 26C:
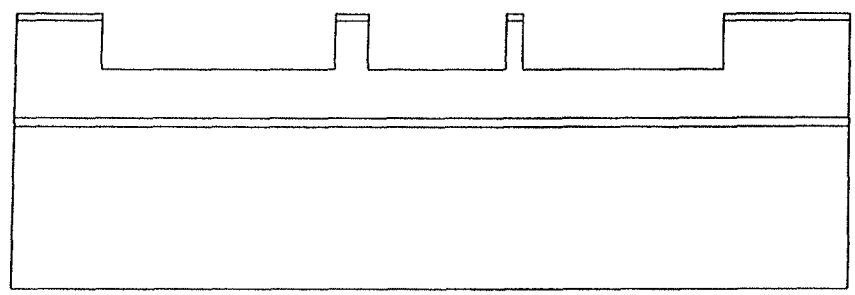
Figure 26D:
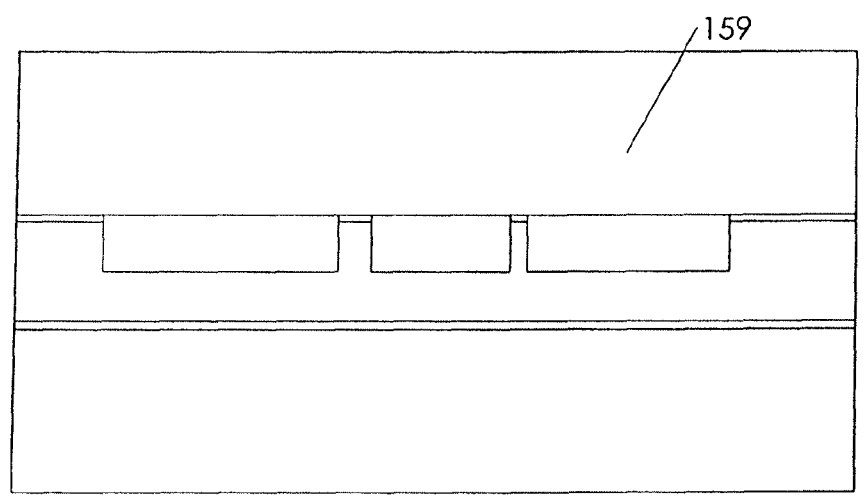
Figure 26E:
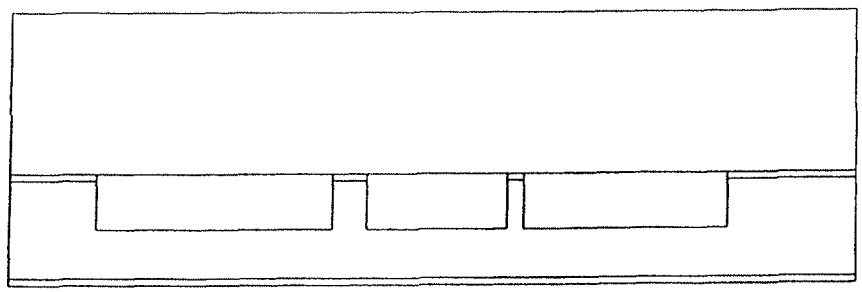
Figure 26F:
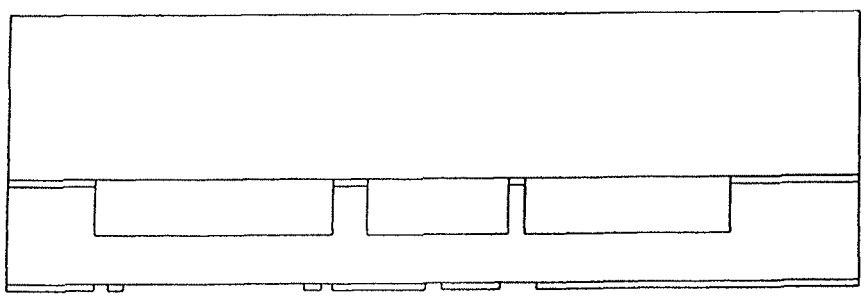
Figure 26G:
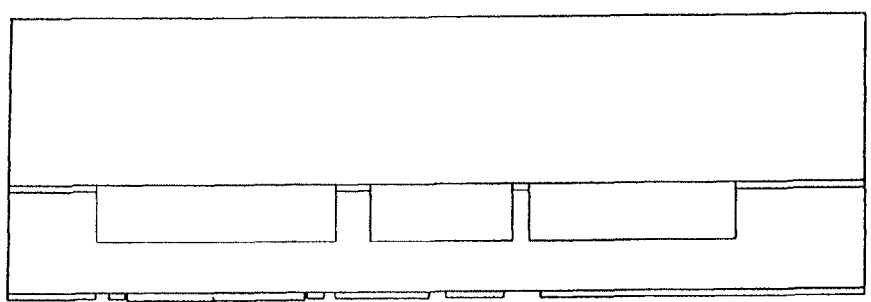
Figure 26H:
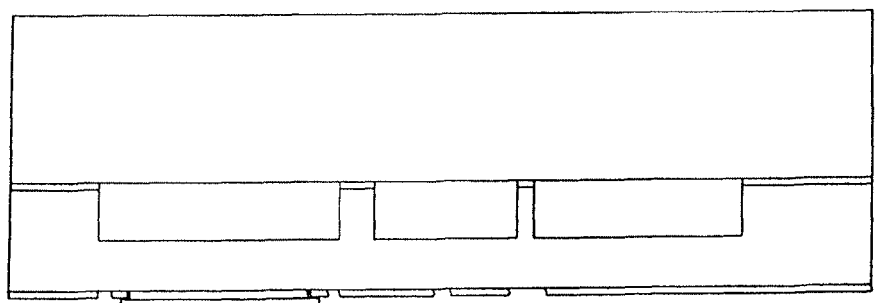
Figure 26I:
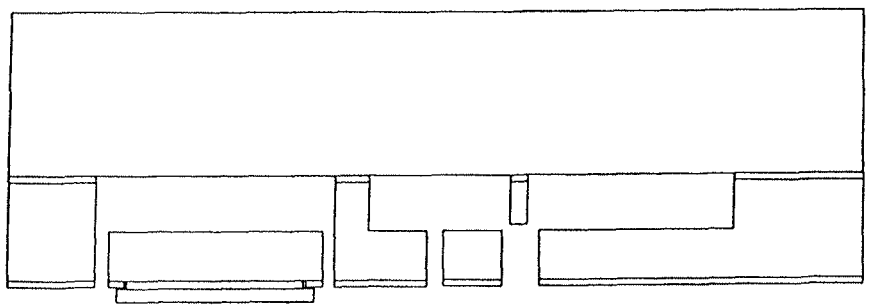
Figure 26J:
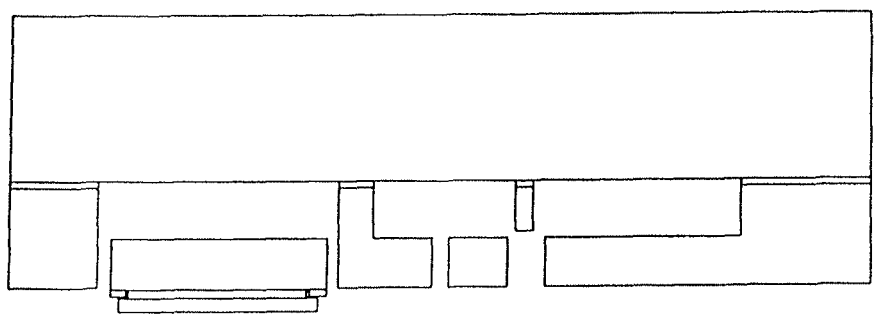
Figure 26K:
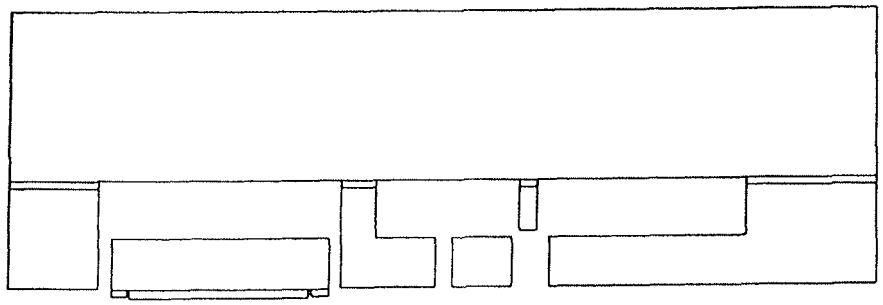

The first lithography and subsequent oxide RIE (Reactive Ion Etching) are used to pattern the oxide layer 155 (FIG. 26b). The patterned oxide layer serves as the electrical isolation layer between silicon device layer and supporting silicon 159. The cavities are created using silicon DRIE on silicon device layer 158 (FIG. 26c). A heavily doped silicon wafer 159 used as supporting material and is bonded with the SOI wafer using wafer bonding (FIG. 26d) such as fusion bonding, eutectic bonding etc. The handle silicon wafer 157 of the SOI wafer is removed using chemical wet etching or silicon CMP (Chemical and Mechanical Polishing) (FIG. 26e). The second lithography and subsequent oxide RIE (Reactive Ion Etching) are used to pattern the buried oxide layer 156 (FIG. 26f). The patterned oxide layer serves as the subsequent silicon DRIE etching mask. The thin film metallization is applied to the wafer using E-beam evaporation or sputtering. The third lithography and metal etching or liftoff are utilized to create the reflective metal coating (160) on the mirror, the metal bonding pads and electrical interconnection traces (FIG. 26g). A layer of photoresist 161 is coated and patterned to cover all the metal patterns in order to protect them during subsequent silicon DRIB and oxide RIE (FIG. 26h). A silicon DRIE is used to release the mirrors and create the hinges etc. (FIG. 26i). An oxide RIE removes the remaining buried oxide used as DRIB etching mask (FIG. 26j). The last photoresist ashing process clears away the protection photoresist layer 161.

There are many process variations to the above process method. For example, a regular doped single crystal silicon wafer may be used as the starting and supporting material. After thermal oxidation and cavity formation using silicon DRIE, it is bonded with second doped single crystal silicon wafer, which will be used to form the mirrors and hinges etc. There may be an electrical isolation oxide between the two wafers. After thinning of the second silicon wafer to the right thickness using CMP, the similar process steps (FIG. 26e-26k) can be used to fabricate the mirror and micromirror array.

Another variation of the first process flow is used to maintain the accurate mirror, hinge thickness, cavity depth as well as comb finger heights. In this process variation, a SOI wafer is used as a starting material, its device silicon thickness is same as the cavity depth. At the process step shown in FIG. 26c, the DRIE etching will etch the device silicon all the way to the buried oxide 156 to form the lower comb drive fingers and cavities underneath the mirrors, such that all the exposed buried oxide 156 within the opened comb finger cavities and cavities underneath the mirrors will be etched away. So the starting SOI wafer becomes a supporting wafer. The wafer 159 in this process variation could be a second SOI wafer, whose doped device silicon layer has accurate desired thickness required for the mirrors, hinges and upper comb fingers. After wafer bonding and handle wafer removal of the second SOI wafer, the process steps shown in FIGS. 26e to 26k will be performed on the device layer of the second SOI wafer.

The first process flow only needs three or four masks to fabricate the mircromirror or micromirror array devices. The production yield could be very high and the cost could be very lower.

The second process flow provides a more flexible design of micromirror and micromirror array.

Figure 27A:
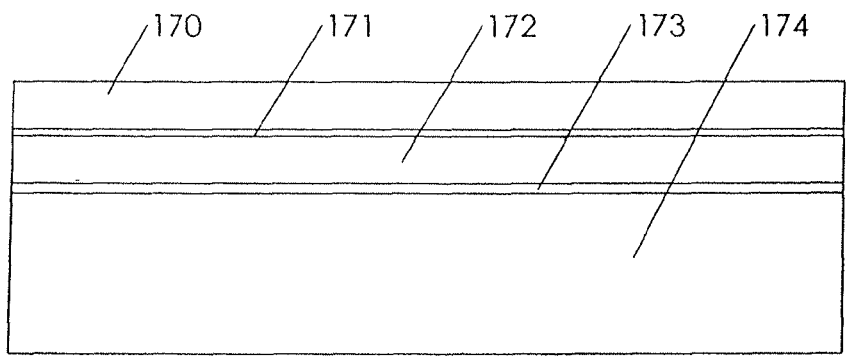

A double SOI (Silicon on Insulator) wafer (shown in FIG. 27a) is used as the starting material. It has a first silicon device layer 170, which is heavily doped to increase the electrical conductivity, a first buried oxide layer 171, a second silicon device layer 172, which is heavily doped to increase the electrical conductivity, a second buried oxide layer 173, and a handle silicon wafer 174. The trenching and refilling regions can also be made in the silicon device layer 172. The trenching and refilling regions are not shown in the process flow. Such double SOI wafer can be custom made by silicon wafer vendors.

Figure 27B:
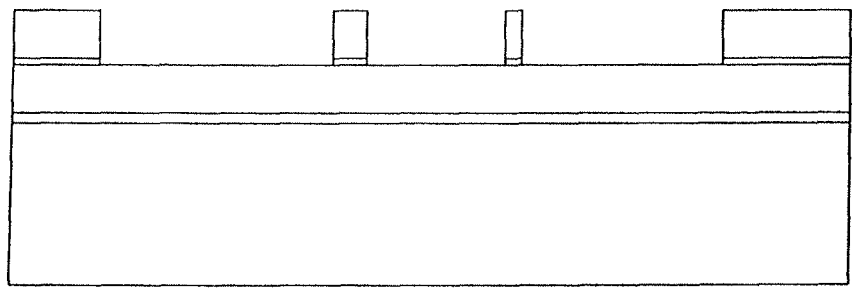

The first lithography and subsequent silicon DRIB (Reactive Ion Etching) are used to create the cavities underneath the mirrors and lower comb fingers in the silicon layer of 170 (FIG. 27b). The first buried oxide in the bottom of the cavities is etched away either by oxide RIB or oxide wet etching.

Figure 27C:
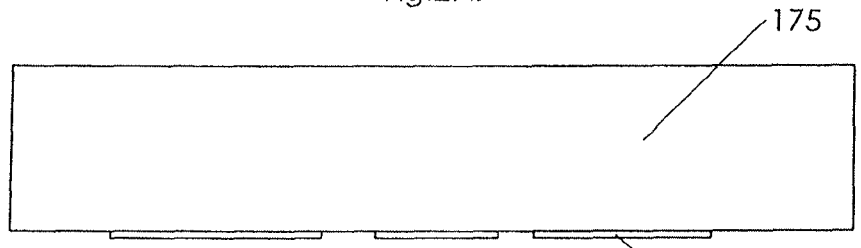
Figure 27D:
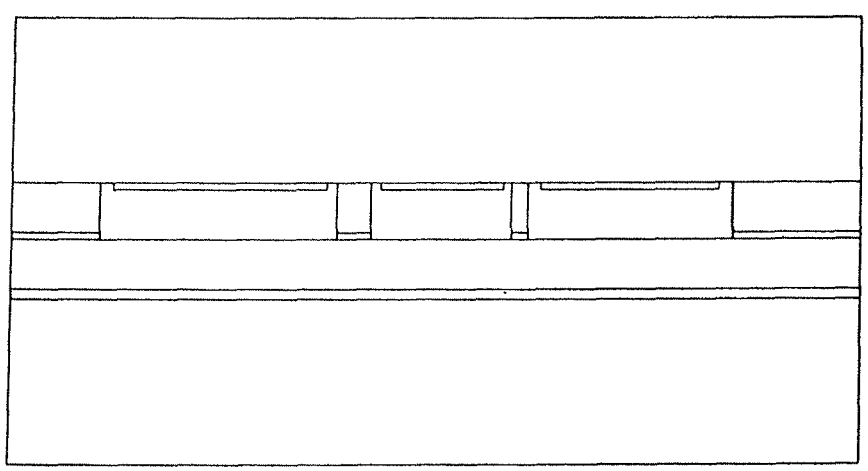

A Pyrex glass wafer 175 with metal patterns (176) on its one side will be anodic bonded with the double SOI wafer (FIGS. 27c and 27d). The metal pattern and structures can be any one of configurations shown in FIGS. 16a, 16b and 16c. For the purpose of simple description, only thin film metal pattern is shown in the process flow.

Figure 27I:
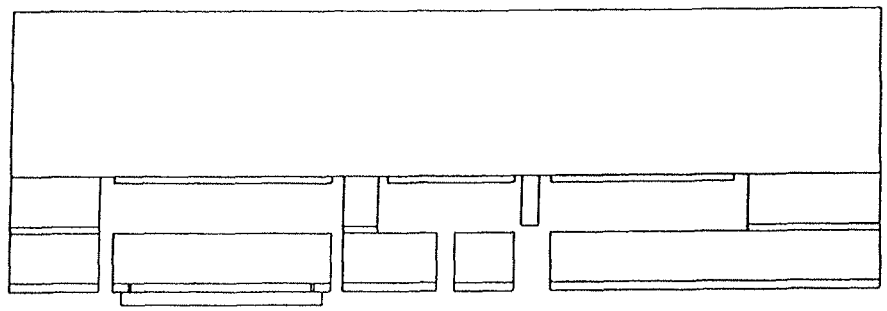
Figure 27J:
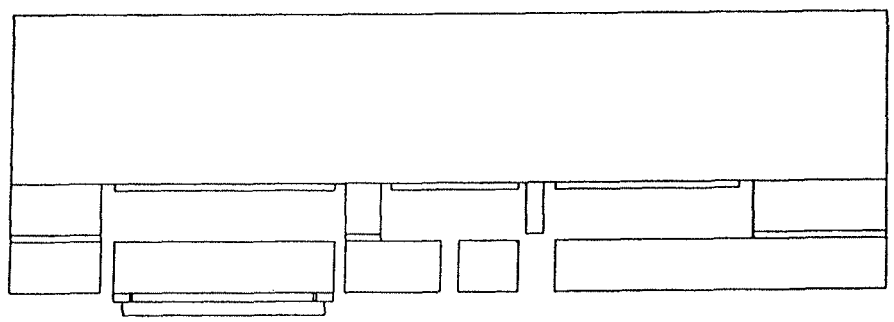
Figure 27K:
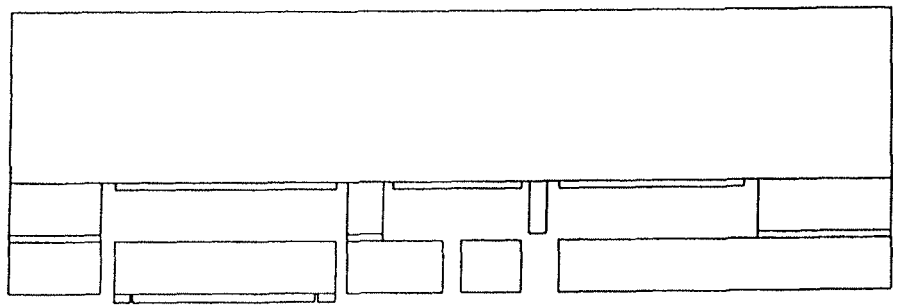

After anodic bonding of double SOI wafer and the Pyrex wafer (FIG. 27d), the handle silicon wafer 174 of the double SOI wafer is removed using chemical wet etching or silicon CMP (Chemical and Mechanical Polishing) (FIG. 27e). Lithography and subsequent oxide RIE (Reactive Ion Etching) are used to pattern the buried oxide layer 173 (FIG. 27f). The patterned oxide layer serves as the subsequent silicon DRIB etching mask. The thin film metallization is applied to the wafer using E-beam evaporation or sputtering. Another lithography and metal etching or liftoff step is used to create the reflective metal coating (177) on the silicon mirror, and the metal bonding pads and electrical interconnection traces (FIG. 27g). A layer of photoresist 178 is coated and patterned to cover all the metal patterns and other silicon surfaces in order to protect them during subsequent silicon DRIB and oxide RIE (FIG. 27h). A silicon DRIE is used to release the mirrors, create upper comb fingers, the hinges, etc. (FIG. 27i). An oxide RIB removes the remaining buried oxide used as DRIB etching mask (FIG. 27j). The last photoresist ashing process clears away the protection photoresist layer 178.

Figure 28:
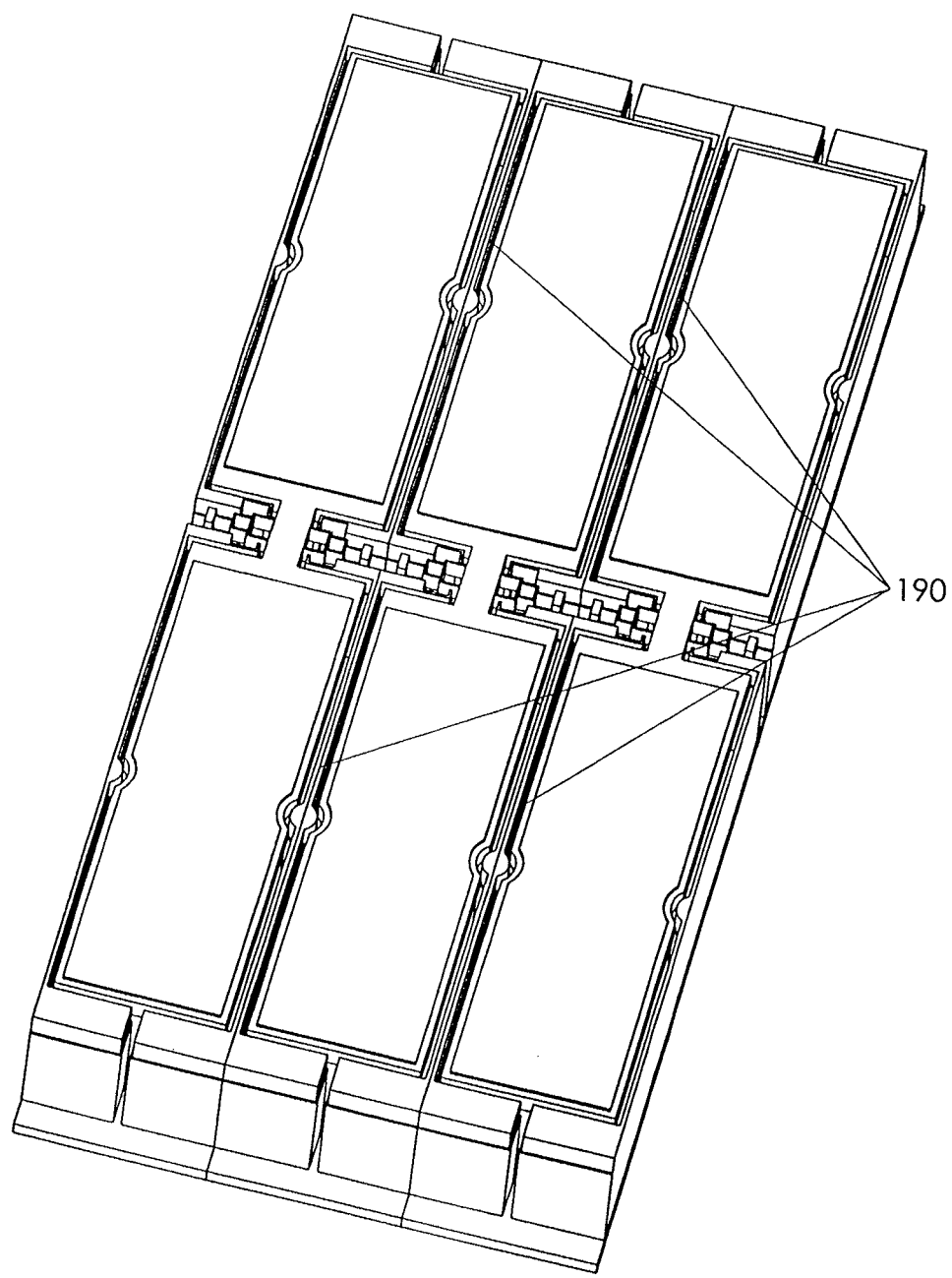
FIG. 28 is a perspective view of a micromirror array device using micromirrors with thin and tall mechanical walls between adjacent mirrors to prevent the electrical and mechanical crosstalk.

Using the fabrication flow described in FIG. 27a-FIG. 27k, if the silicon layer 172 and buried oxide layer 171 (FIG. 27a) between the adjacent mirrors are etched away, then we will have similar micromirror array structures (shown in FIG. 18). In order to further reduce the mechanical crosstalk and electrical interference between adjacent micromirrors, a thin mechanical wall between adjacent two micromirrors as high as up to the mirror surface may be used. FIG. 28 shows the micromirror array devices with thin wall structure as high as up to the mirror surface between adjacent two micromirrors. Ideally, the thin wall material should be electrically conductive. Using the fabrication flow described in FIG. 26a-FIG. 26k and FIG. 27a-FIG. 27k, we will have similar micromirror array structures (shown in FIG. 28) with a thin electrically conductive silicon wall (190 in FIG. 28) between any two adjacent mirrors. In order to prevent or reduce the optical reflection from the top surface of the thin wall, the wall structure can be very thin, or its top surface has many some etched thin and fine structures such as lines, meshes etc. for reducing the optical reflection.

Figure 29A:
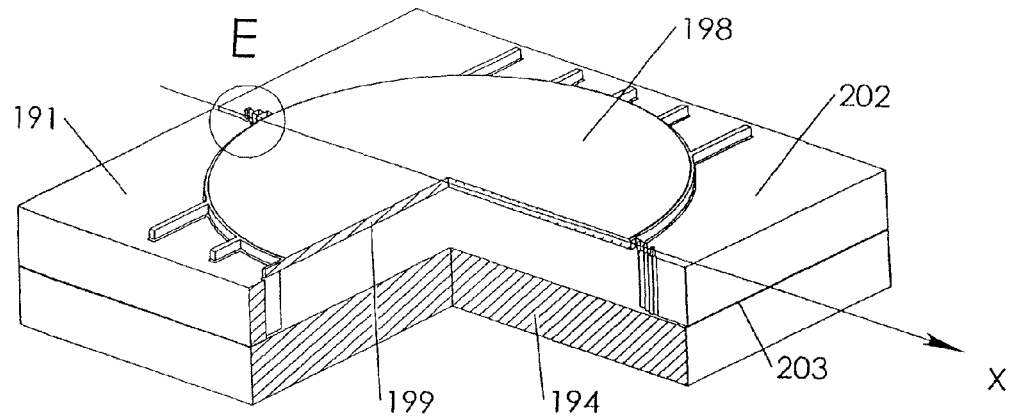
FIG. 29a is a perspective view of a single tilting micromirror device using the actuation structures and fabrication method with a detailed view of Detail "E".
Figure 29A:
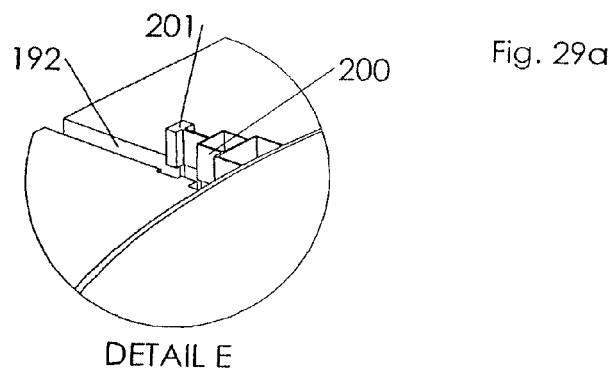
Figure 29B:
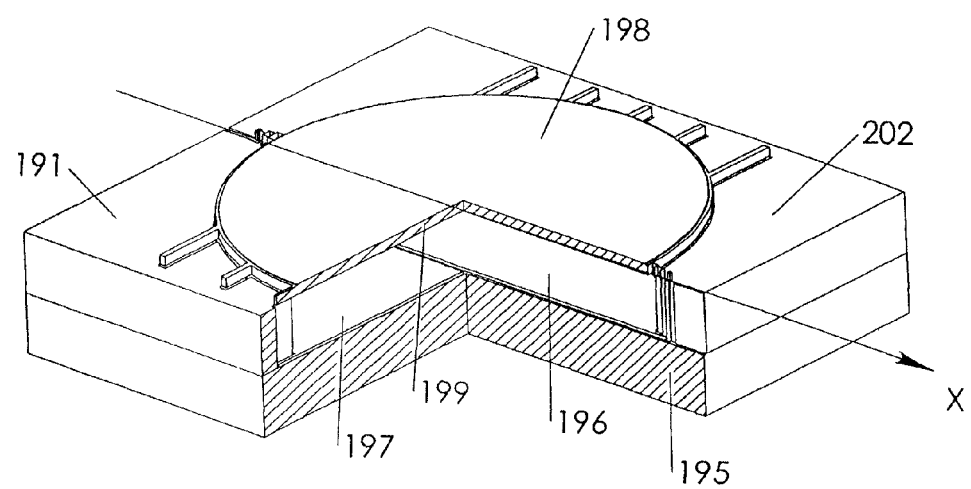
FIG. 29b is a perspective view of a single tilting micromirror device using the actuation structures and fabrication method with two electrically isolated bottom electrodes under the titling mirror.

The same design and microfabrication methods may be used to make the single larger titling mirror devices which have applications for optical switches, optical attenuators, etc. FIGS. 29a and 29b show examples of larger tilting mirrors. In FIGS. 29a and 29b, the mirror 199 has the reflective coating 198 on its top surface. The mirror 199 is connected to anchor 201 using hinges with combinations of single I beam and cascade double I beams. The comb fingers are on the mirror edge, which is far from the mirror tilting axis X. In other implementations, the outside mirror edge without comb fingers can be used as electrostatic actuation components working with the wall. Mirror 199, hinges 200, anchor 201 and comb fingers are all made of electrically conductive material such as doped single crystal silicon. The wall structures 202 and 191 are made of electrically conductive material such as doped single crystal silicon. They are mechanically and electrically separated by etching cut 192.

In FIG. 29a, the supporting material 194 is made of electrically conductive material such as doped single crystal silicon. It is electrically isolated from the wall structure 202 and 191 using dielectric material 203 which can be silicon dioxide. There are many actuation methods which can be utilized. When the mirror 199 with its comb fingers and the comb fingers of the wall structure 191 are connected to the electrical ground, if the comb fingers of the wall structure 202 is connected to electrical potential, the mirror will rotate around the x-axis in one direction under the electrostatic force between the mirror comb fingers and the comb fingers of the wall structure 202. When the mirror 199 with its comb fingers and the comb fingers of the wall structure 202 are connected to the electrical ground, if the wall structure 191 is connected to electrical potential, the mirror will rotate around the x-axis in the other direction under the electrostatic force between the its comb fingers and the comb fingers of the wall structure 191.

In FIG. 29b, the supporting material 195 is made of dielectric material such as Pyrex glass. It has two electrically isolated metal electrodes 196 and 197 on its top surface. There are many actuation methods that may be used. When the mirror 199 with its comb fingers and the comb fingers of the wall structure 191 and the metal electrode 197 are connected to the electrical ground, if the comb fingers of the wall structure 202 and metal electrode 196 are connected to an electrical potential, the mirror will rotate around the x-axis in one direction under the electrostatic force between the mirror comb fingers and the comb fingers of the wall structure 202, as well as the electrostatic force between the mirror and the electrode 196. When the mirror 199 with its comb fingers and the comb fingers of the wall structure 202 are connected to the electrical ground, if the comb fingers of the wall structure 191 and metal electrode 197 are connected to an electrical potential, the mirror will rotate around the x-axis in the other direction under the electrostatic force between the mirror comb fingers and the comb fingers of the wall structure 191, as well as the electrostatic force between the mirror and the electrode 197.

Figure 29C:
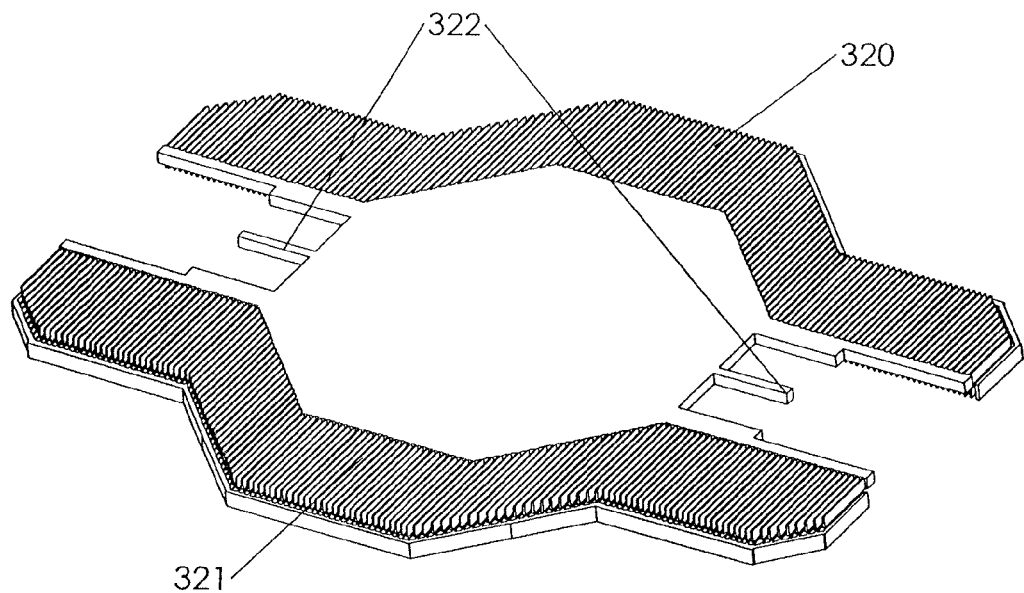
FIG. 29c is a perspective view of a single tilting micromirror device variation using the actuation structures and fabrication method.

FIG. 29c shows another single larger titling mirror; FIG. 29c shows the two comb finger pairs 320 and 321, which are consisting of the comb fingers on the mirror edges and comb fingers on the wall structures. The mirror will be actuated to tilt around the hinge 322 when any one of comb finger pairs 320 or 321 is energized. A simple straight I beam hinge is used in the device shown in the FIG. 29c, but other hinge shapes, such as a V-shaped hinge, double parallel I beam hinge, composite hinges, etc. can also be used. This simple mirror device has advantage of larger tilting angle at lower actuation voltage.

Figure 29D:
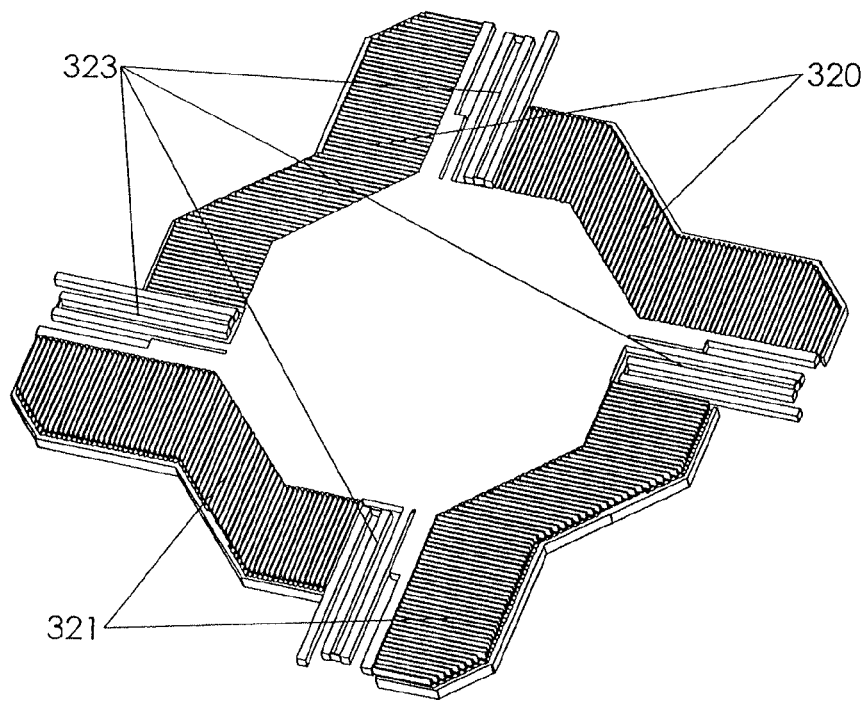
FIG. 29d is a perspective view of a single micromirror device variation using the actuation structures and fabrication method.

FIG. 29d shows another single larger mirror which can be actuated in a direction perpendicular to the mirror surface. The vertical comb drives 320 and 321 formed by the comb finger on the mirror edges and wall structure surrounds the mirror. The structural design and locations of the hinges 323 supports the mirror to ensure that the mirror will be moved in the direction perpendicular to its surface to prevent minor tilting. This type mirror device can be very useful in tunable filters, etc.

In some applications, such as an optical protective switch, it is beneficial to maintain the desired position of the micromirror even when the electrical actuation power is off. In the past, many efforts were tried to achieve the micromirror with latching mechanisms, but there are obstacles that prevented this, such as including stiction effects.

A MEMS thermal actuator has certain advantages, including its simple structure, easy fabrication and a larger actuation force output, as the actuation force from the thermal actuator can overcome the stiction force.

Figure 30A:
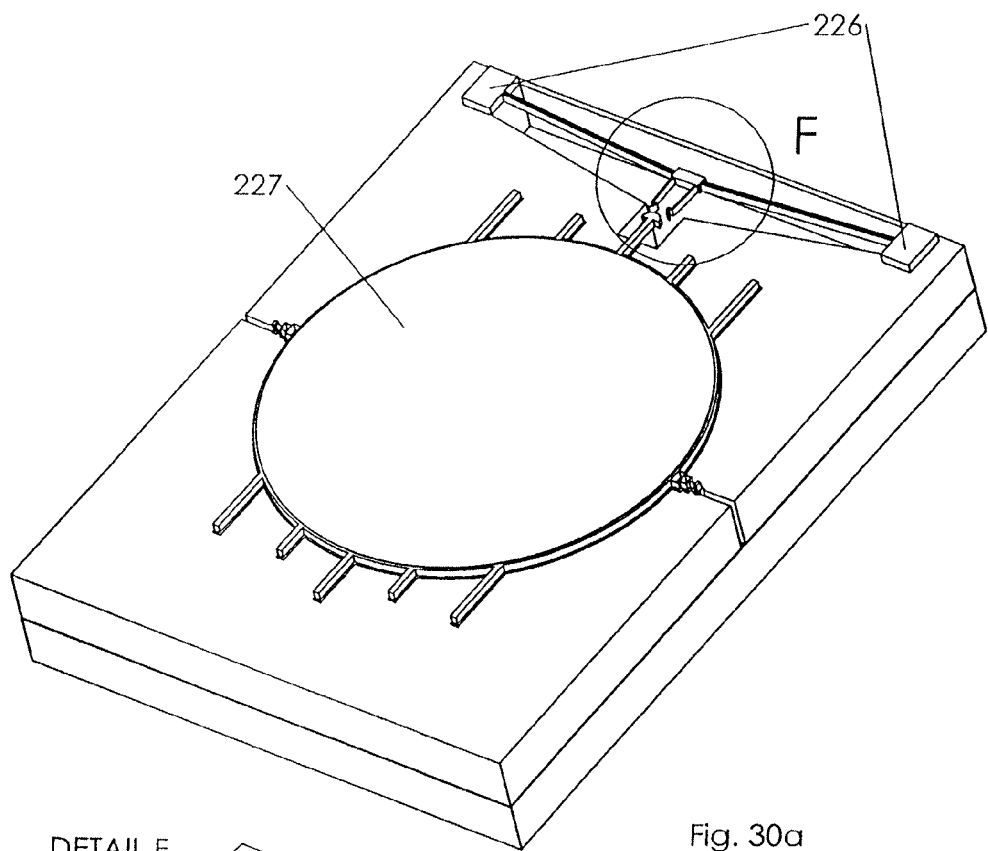
FIG. 30a is a perspective view of a single tilting micromirror device using the actuation structures and fabrication method with a micromirror tilting position latching structure and its thermal actuator after fabrication.
Figure 30B:
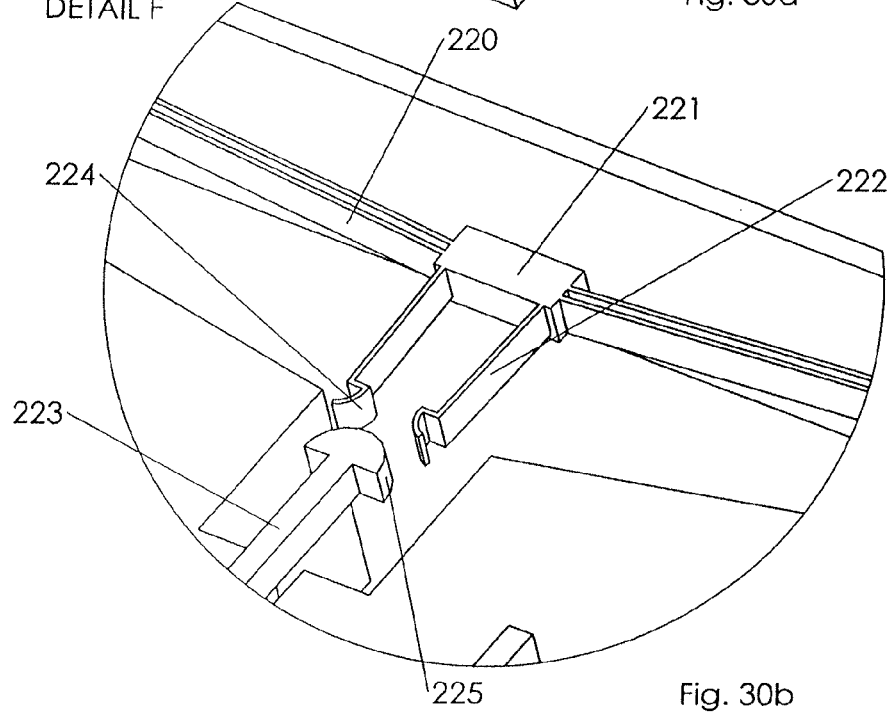
FIG. 30b is an enlarged perspective view of Detail "F" in FIG. 30a of a micromirror tilting position latching structure.

The latching structure and the thermal actuator described herein can be used with any MEMS micromirror and micromirror array device. In order to show the latching structure implementation, FIGS. 30a and 30b show an example with a single larger tilting micromirror with latching structure and a thermal actuator. The same latching and thermal actuator can be implemented in any mirror such as the mirror used in the minor array, mirrors shown in FIGS. 29a, 29b, 29c and 29d to latch these mirror into desired positions.

Referring to FIGS. 30a and 30b, the thermal actuator is made from a single crystal silicon. It has two fixed anchors 226, thin silicon expansion beams 220 and a beam connector 221. The beam 220 can be a single beam, double beam, multiple beams or any combinations of these beam structures. The cross section of the beam 220 shown in FIG. 30 is a double I beam shape, although it will be understood that other cross section shapes can also be used. The beam 220 and beam connector 221 between fixed anchors 226 are above an etched cavity in order to reduce thermal loss and improve actuation efficiency. The shape of beam 220 and beam connector 221 is preferably V shaped, arc shaped, or other shapes that will thermally expand in a predictable direction, and that have large amounts of thermal deformation in that direction. These shapes will help to pre-set the actuation direction of the thermal actuator. When the electrical voltage is applied on the two fixed anchors 226, the electrical current will flow through the silicon expansion beam 220, the temperature of the expansion beams 220 will increase due to the Joule heating effect, resulting in the length of the expansion beams also increasing. Since the two fixed anchors limit the outwards movement of the beams 220 along their length's direction, the beams 220 could only move sideways in the direction determined by its shape. In the case of a V-shaped or arc shaped relationship, the beams will deform in the actuation direction shown in FIG. 31b.

As shown, a long beam 223 is connected to the mirror 227 and located on the outside of the mirror 227. A latching structure 225 is formed close to the tip of the beam 223. The shape of the latching structure 255 can be any shape, such as arrow shape, that is capable of locking against another latching structure or surface. The part of sidewall of latching structure in the example is smooth cylinder surface. Other surface shapes with smooth tilting surfaces can also be used, but the preferred designs offer easy latching process.

As shown, one or two beams 222 are connected to the beam connector 221, such that they have latching structures 224 on their tips. Two beams 222 are shown in FIG. 30. The shape of beam 222 can be other shape such as serpentine shape to have more flexibility for easy of engaging into the latching position. The locking structure 224 can also be located within the connector 221 without using beam 222. The part of sidewalls of latching structure (224) in the example is smooth cylinder surface. Other surface shapes, such as smooth tilting surfaces, can also be used as long as they can offer easy latching process.

Figure 31A:
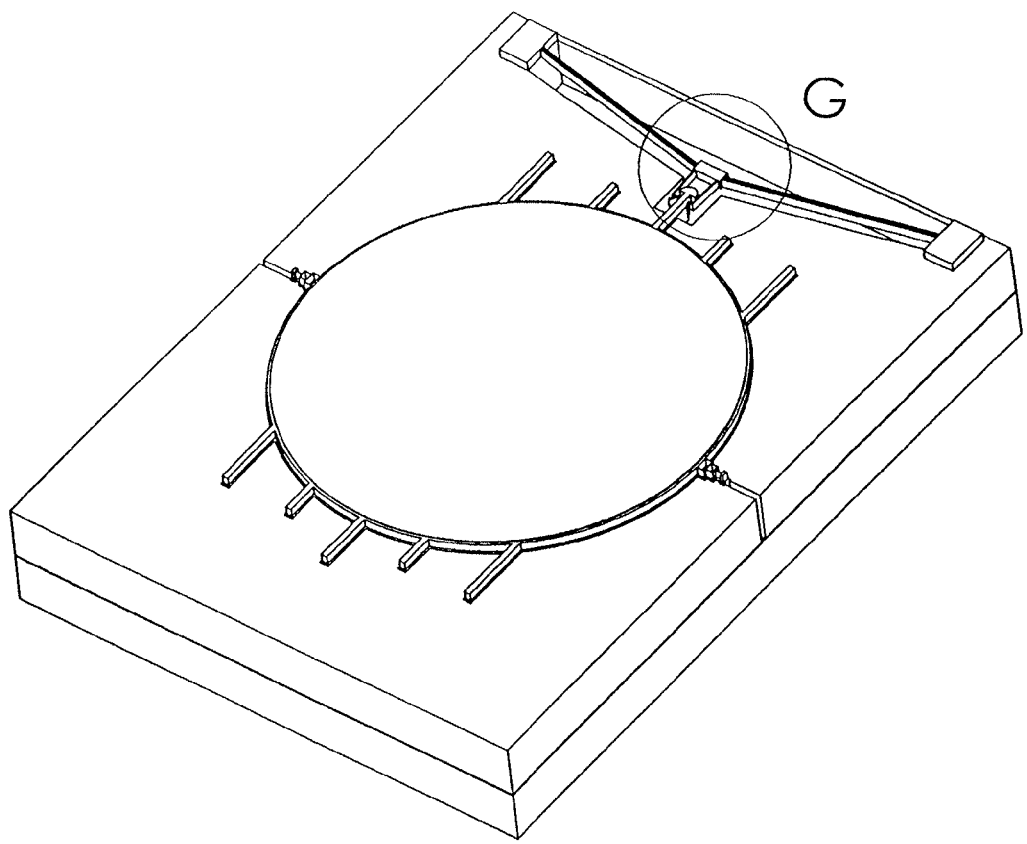
FIG. 31a is a perspective view of a single tilting micromirror device using the actuation structures and fabrication method with a micromirror tilting position latching structure and its thermal actuator after thermal actuation.

When the thermal actuator is actuated, the beams 222 will be pushed forwards until the cylinder surface of their latching structure 224 contacts to the cylinder surface of their latching structure 225. Since the thermal actuator can generate very strong actuation forces, the actuation force will be sufficiently strong that it can force the deformation of the beams 222 and overcome the stiction force between latching structures 224 and 225. The latching structures 224 therefore will move forwards and slide along the cylinder sidewall surface of the latching structure 225. Once the latching structures 224 pass over the latching structure 225, the beams 222 will return from their deformed shapes shown in FIG. 31a.

Figure 32A:
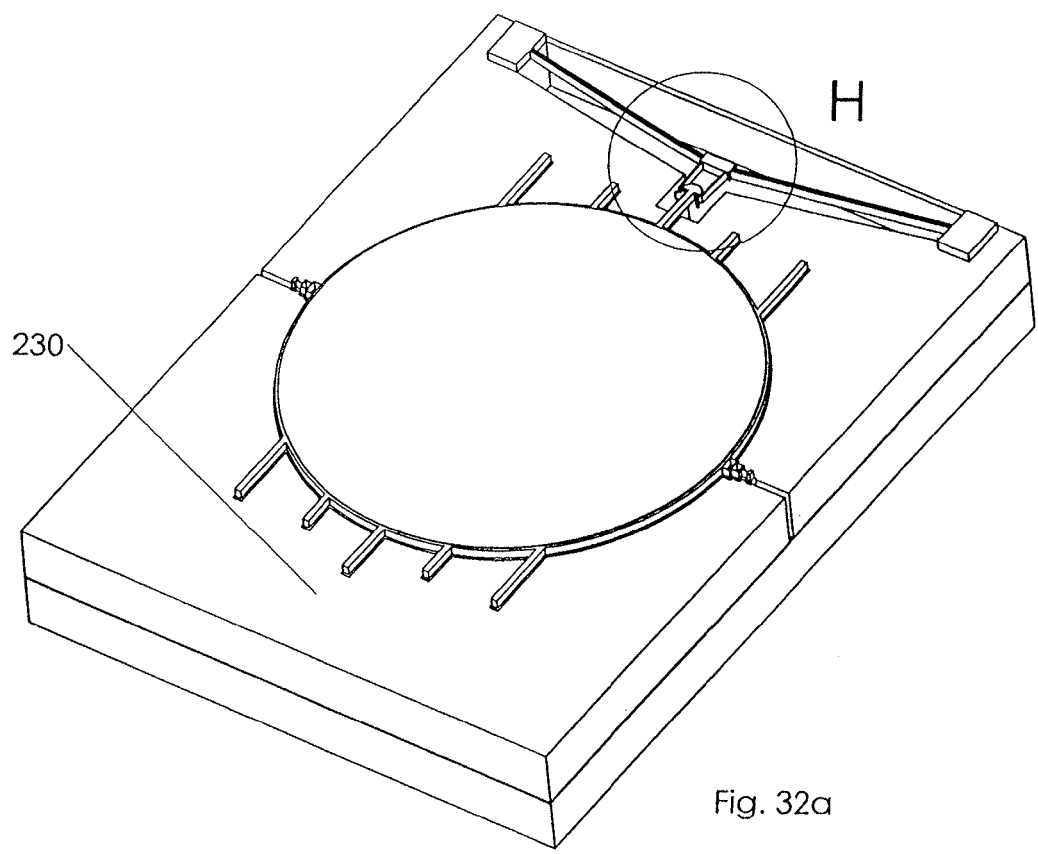
FIG. 32a is a perspective view of a single tilting micromirror device using the actuation structures and fabrication method with a micromirror tilting position latching structure and its thermal actuator in the latching state.
Figure 32B:
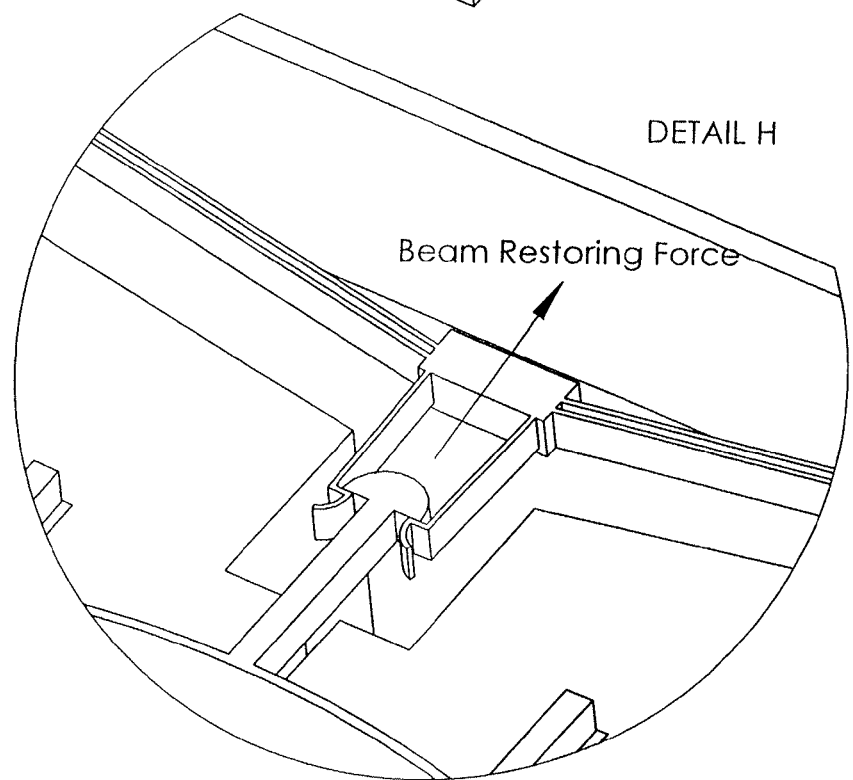
FIG. 32b is an enlarged perspective view of Detail "H" in FIG. 32a of a micromirror tilting position latching structure in the latching state.

If the electrical power for the thermal actuator is off, the mechanical restoring force of the beams 220 will pull the beams 222 and their latching structures 224 backwards until the latching structure 224 contacts with the latching structure 225, as shown in FIGS. 32a and 32b. At that moment, the mechanical restoring force of the silicon beams 220 will lock the mirror in certain position through mechanical contact force and friction force between the locking structures 224 and 225.

Figure 31B:
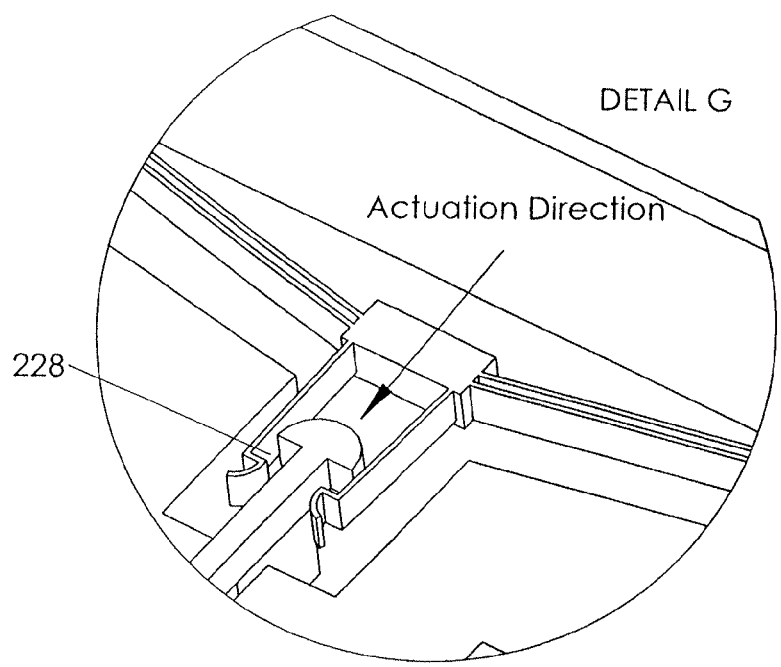
FIG. 31b is an enlarged perspective view of Detail "G" in FIG. 31a of a micromirror tilting position latching structure after thermal actuation.

If it is desired to change the tilting and latched position of the mirror, electrical power can be applied to the thermal actuator until the thermal expansion of the silicon beams 220 overcomes the stiction force between latching structures 224 and 225, as well as mechanical restoring force of the silicon beams 220, and the beams 222 and the locking structures 224 will move to create a separation gap 228 as shown in FIG. 31b between latching structures 224 and 225. The mirror then can freely tilt to the desired position with the help of its electrostatic actuators. Once the desired mirror position is established, the electrical power of the thermal actuation is turned off, the mechanical restoring force of the silicon beams 220 will lock the mirror at the desired mirror tilting position as shown in FIGS. 32a and 32b, even after the electrical power for the mirror tilting actuator has been turned off.

Figure 33A:
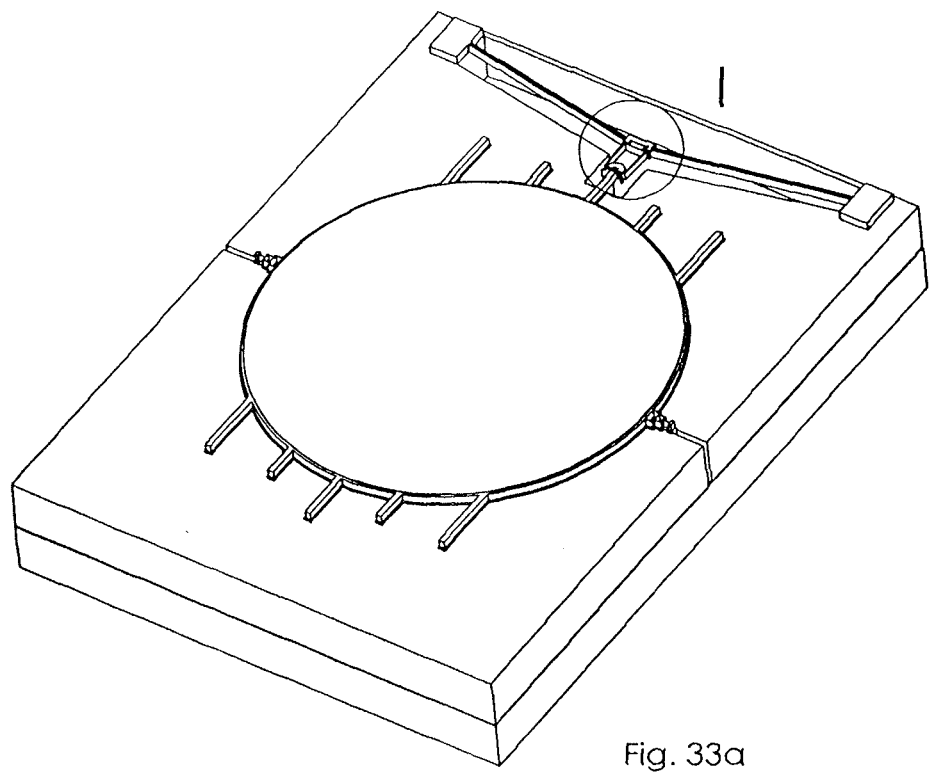
FIG. 33a is a perspective view of a single tilting micromirror device using the actuation structures and fabrication method with a micromirror tilting position latching structure and its thermal actuator in the latching state, with trenching and refilling regions used to prevent electrical interference.
Figure 33B:
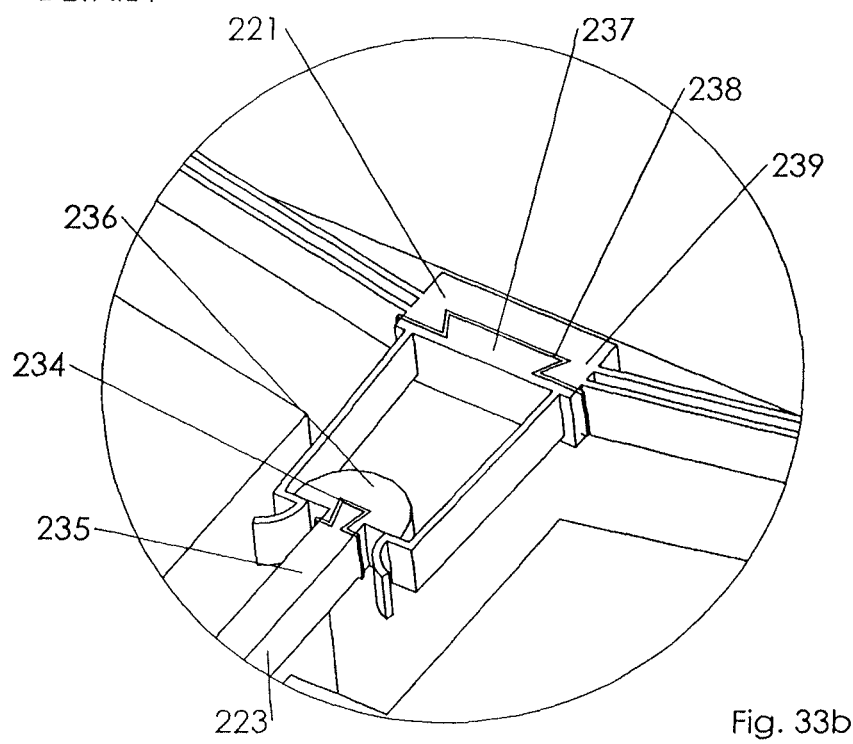
FIG. 33b is an enlarged perspective view of Detail "I" in FIG. 33a of a micromirror tilting position latching structure in the latching state, with trenching and refilling regions used to prevent electrical interference.

In order to prevent electrical interference between the mirror tilting actuator and thermal actuator, referring to FIGS. 33a and 33b, a trenching and dielectric material refilling region can used to electrically isolate both actuators. The dovetail shape trenching and dielectric material refilling regions 238 and 234 are on the beam connector 221 and locking beam 223 respectively. The regions 237 and 239 are electrical isolated, as are regions 236 and 235. The materials and fabrication methods of the trenching and dielectric material refilling region have been described previously. The trenching and refilling region shape can also be any shape, examples of which are shown in FIG. 7.

Since the actuation force of the thermal actuator is too strong for certain designs, sometimes the strong actuation and mechanical restoring force from the thermal actuator can push or pull the mirror away from its desired center balanced position. Therefore, a pair of the thermal actuators may be required to balance the adverse effects of the thermal actuator to the mirror and its hinges. In the FIG. 32a, another thermal actuator with its latching structure could be built in the position of the 230. In some circumstances, more thermal actuators with their locking structures may be provided around the mirror to optimize the balanced latching performance.

Figure 34:
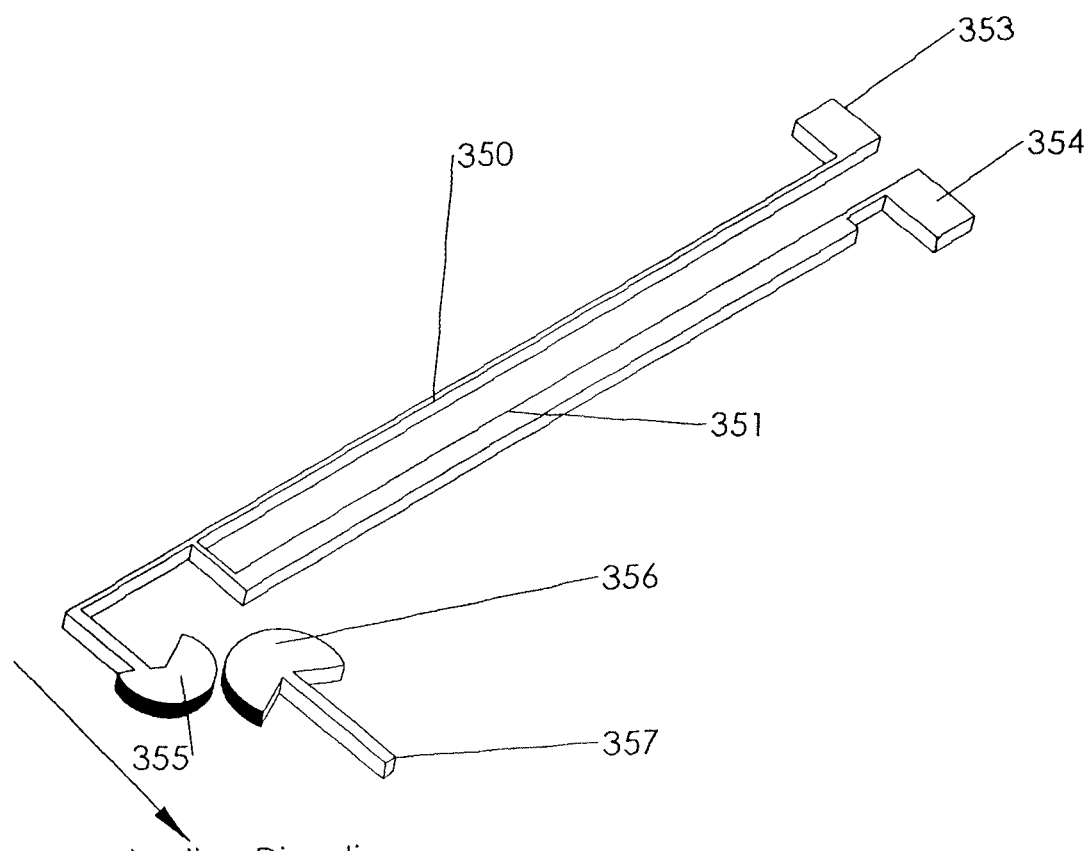
FIG. 34 is an enlarged perspective view of a thermal actuator variation for latching the micromirror at its desired tilting position.

It will be understood that many types of MEMS thermal actuators may be used. An example of an alternative thermal actuator is shown in FIG. 34. The thermal actuator is made of an electrically conductive material, such as doped single crystal silicon, and has two fixed anchors 353 and 354, thin expansion beam 350, thick beam 351, and latching structure 355. The latching structure 356 is connected to the mirror through the beam 357. When the electrical voltage is applied on the two fixed anchors 353 and 354, the electrical current will flow through the thin and thick beams 350 and 351, and the temperature of both beams will rise due to the Joule heating effects. The temperature of the thin beams 350 will be higher than that of the thick beam 351 since the thin beam has a larger electrical resistance, therefore the thermal expansion of the thin beam is larger than that of the thick beam. Also, because the two fixed anchors limit the outward movement of both beams along their length's direction, the beams 350 could only push the latching structure 355 towards the latching structure 356 into the final engaged latching position.

All the thermal actuators described herein can be used in the tilting mirrors piston movement mirrors, mirror arrays, etc. described previously.

The tilting micromirror and piston movement micromirror with locking structures and thermal actuator (FIGS. 29a, 29b, 29c, 29d, 30a, 30b, 31a, 31 b, 32a, 32b, 33a, 33b and 34) can be fabricated using the process flow described herein such as the process shown in FIG. 26a-26k, 27a-27k.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

While the device described above is susceptible of embodiments in many different forms, the drawings and description give details of preferred embodiments with the understanding that the present disclosure is to be considered as an exemplification of the principles of the device and is not intended to limit the broad aspects of the device to the embodiments illustrated. The figures are not necessarily drawn to scale and relative sizes of various elements in the structures may be different than in an actual device.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A MEMS optical device, comprising:
    an optical element mounted on a support structure by a resilient structure, the resilient structure comprising a serpentine structure connected between the optical element and the support structure, the resilient structure permitting movement along an axis that is perpendicular to a plane defined by the support structure and resisting movement in any direction perpendicular to the axis;
    an electrostatic combdrive actuator having a first part mounted on the support structure, and a second part mounted on the optical element, the first part and the second part providing an actuating force to the optical element to move the optical element along the axis in a constant orientation relative to the plane.

2. The MEMS optical device of claim 1, wherein the electrostatic combdrive actuator comprises more than one first and second parts spaced evenly about an outer perimeter of the optical element.

3. The MEMS optical device of claim 2, wherein the more than one first and second parts are spaced in a manner that is circularly symmetrical about the axis along which the optical element moves.

4. The MEMS device of claim 1, wherein the resilient structure comprises more than one resilient structure spaced evenly about an outer perimeter of the optical device.

5. The MEMS optical device of claim 4, wherein each resilient structure comprises a beam structure connected between the optical element and the support structure.

6. The MEMS optical device of claim 1, wherein the support structure is formed from a first layer of material, the first part of the electrostatic combdrive is formed from a second layer of material, and the second part of the electrostatic combdrive and the resilient structure are formed from a third layer of material.

7. The MEMS optical device of claim 1, wherein the serpentine structure comprises a plurality of beams connected to adjacent beams at alternating ends.

8. The MEMS optical device of claim 1, wherein the optical element is an optically reflective element.

9. The MEMS optical device of claim 1, wherein the optical element is an optically transmissive element.

10. The MEMS optical device of claim 1, wherein the MEMS optical device and a source of light form a tunable filter.

11. The MEMS optical device of claim 1, wherein the optical element comprises a support layer and an optical material layer carried by the support layer.

12. The MEMS optical device of claim 11, wherein the support structure is formed from a first layer of material, the first part of the electrostatic combdrive is formed from a second layer of material, and support layer of the optical element, the second part of the electrostatic combdrive and the resilient structure are formed from a third layer of material.

13. A MEMS optical device, comprising:
    an optical element mounted on a support structure by a resilient structure, the resilient structure comprising a serpentine structure connected between the optical element and the support structure, the resilient structure permitting movement along an axis that is perpendicular to a plane defined by the support structure and resisting movement in any direction perpendicular to the axis, the optical element maintaining a constant orientation relative to the plane during movement along the axis, and wherein the optical element is optically reflective.

14. The MEMS optical device of claim 13, wherein the optical element is actuated by an electrostatic combdrive actuator.

15. The MEMS optical device of claim 14, wherein the electrostatic combdrive actuator comprises a plurality of fixed combs carried by the support structure and movable combs carried by the optical element, the plurality of fixed and movable combs being spaced circularly symmetrically about the axis along which the optical element moves.

16. The MEMS optical device of claim 13, wherein the optical element is reflective.

17. The MEMS optical device of claim 13, wherein the optical element is transmissive.

18. A MEMS optical device, comprising:
    an optically transmissive element mounted on a support structure by a resilient structure, the resilient structure permitting movement along an axis that is perpendicular to the support structure and resisting movement in any direction perpendicular to the axis;
    an electrostatic combdrive actuator having a first part mounted on the support structure, and a second part mounted on the optically transmissive element, the first part and the second part providing an actuating force to the optical element to move the optically transmissive element along the axis.

19. The MEMS optical device of claim 18, wherein the more than one first and second parts are spaced in a manner that is circularly symmetrical about the axis along which the optical element moves.

20. The MEMS optical device of claim 18, wherein each resilient structure comprises a serpentine structure connected between the optical element and the support structure.

21. A MEMS optical device, comprising:
    an optical element mounted on a support structure by a plurality of resilient structures, the resilient structures being spaced circularly symmetrically about the optical element, each resilient structure comprising a serpentine structure connected between the optical element and the support structure, the resilient structures permitting movement along an axis that is perpendicular to a plane defined by the support structure and resisting movement in any direction perpendicular to the axis, the optical element maintaining a constant orientation relative to the plane during movement along the axis.

22. The MEMS optical device of claim 21, wherein the optical element is transmissive.

23. The MEMS optical device of claim 21, wherein the optical element is optically reflective.

* * * * *